US009847999B2

(12) United States Patent
Van Os et al.

(10) Patent No.: US 9,847,999 B2
(45) Date of Patent: Dec. 19, 2017

(54) USER INTERFACE FOR A DEVICE REQUESTING REMOTE AUTHORIZATION

(71) Applicant: Apple Inc., Cupertino, CA (US)

(72) Inventors: Marcel Van Os, San Francisco, CA (US); Peter D. Anton, San Francisco, CA (US); George R. Dicker, Sunnyvale, CA (US); Donald W. Pitschel, San Francisco, CA (US); Nicholas J. Shearer, San Francisco, CA (US); Oluwatomiwa B. Alabi, San Francisco, CA (US); Anton K. Diederich, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/269,801

(22) Filed: Sep. 19, 2016

(65) Prior Publication Data

US 2017/0339151 A1 Nov. 23, 2017

Related U.S. Application Data

(60) Provisional application No. 62/338,994, filed on May 19, 2016, provisional application No. 62/347,852, filed on Jun. 9, 2016.

(51) Int. Cl.
*H04L 29/06* (2006.01)
*H04L 29/08* (2006.01)
*H04W 88/02* (2009.01)

(52) U.S. Cl.
CPC ............ *H04L 63/10* (2013.01); *H04L 67/141* (2013.01); *H04W 88/02* (2013.01)

(58) Field of Classification Search
None
See application file for complete search history.

(56) References Cited

U.S. PATENT DOCUMENTS

| 4,353,056 A | 10/1982 | Tsikos |
| 5,325,442 A | 6/1994 | Knapp |

(Continued)

FOREIGN PATENT DOCUMENTS

| AU | 2015100708 A4 | 7/2015 |
| AU | 2015100709 A4 | 7/2015 |

(Continued)

OTHER PUBLICATIONS

Office Action received for Danish Patent Application No. PA201670628, dated Jun. 6, 2017, 3 pages.

(Continued)

*Primary Examiner* — Kaveh Abrishamkar
(74) *Attorney, Agent, or Firm* — Dentons US LLP

(57) ABSTRACT

The present disclosure generally relates to techniques for managing a remote authorization to proceed with an action, such as creating a secure network connection. In some examples, a requesting device receives selection of one or more options. The requesting device transmits a request to proceed with an action to an authenticating device. The authenticating device concurrently displays an indication of the request to proceed with the action, information about the selected one or more options, and an indication of the requesting device. The authenticating device receives authorization to proceed with the action and transmits a response to the requesting device regarding the request to proceed with the action.

26 Claims, 52 Drawing Sheets

(56) References Cited

U.S. PATENT DOCUMENTS

| | | |
|---|---|---|
| 5,420,936 A | 5/1995 | Fitzpatrick et al. |
| 5,615,384 A | 3/1997 | Allard et al. |
| 5,799,098 A | 8/1998 | Ort et al. |
| 5,828,773 A | 10/1998 | Setlak et al. |
| 5,838,306 A | 11/1998 | O'Connor et al. |
| 5,852,670 A | 12/1998 | Setlak et al. |
| 5,857,028 A | 1/1999 | Frieling |
| 5,917,913 A | 6/1999 | Wang |
| 5,933,134 A | 8/1999 | Shieh |
| 5,943,043 A | 8/1999 | Furuhata et al. |
| 5,952,998 A | 9/1999 | Clancy et al. |
| 5,963,679 A | 10/1999 | Setlak |
| 5,974,150 A | 10/1999 | Kaish et al. |
| 6,028,950 A | 2/2000 | Merjanian |
| 6,037,882 A | 3/2000 | Levy |
| 6,141,436 A | 10/2000 | Srey et al. |
| 6,151,208 A | 11/2000 | Bartlett |
| 6,151,593 A | 11/2000 | Cho et al. |
| 6,181,328 B1 | 1/2001 | Shieh et al. |
| 6,193,153 B1 | 2/2001 | Lambert |
| 6,219,793 B1 | 4/2001 | Li et al. |
| 6,256,022 B1 | 7/2001 | Manaresi et al. |
| 6,282,304 B1 | 8/2001 | Novikov et al. |
| 6,282,656 B1 | 8/2001 | Wang |
| 6,289,114 B1 | 9/2001 | Mainguet |
| 6,292,173 B1 | 9/2001 | Rambaldi et al. |
| 6,317,835 B1 | 11/2001 | Bilger et al. |
| 6,327,376 B1 | 12/2001 | Harkin |
| 6,337,919 B1 | 1/2002 | Dunton |
| 6,421,453 B1 | 7/2002 | Kanevsky et al. |
| 6,484,260 B1 | 11/2002 | Scott et al. |
| 6,487,662 B1 | 11/2002 | Kharon et al. |
| 6,498,861 B1 | 12/2002 | Hamid et al. |
| 6,515,988 B1 | 2/2003 | Eldridge et al. |
| 6,560,612 B1 | 5/2003 | Yamada et al. |
| 6,573,883 B1 | 6/2003 | Bartlett |
| 6,603,462 B2 | 8/2003 | Matusis |
| 6,618,806 B1 | 9/2003 | Brown et al. |
| 6,639,584 B1 | 10/2003 | Li |
| 6,709,333 B1 | 3/2004 | Bradford et al. |
| 6,720,860 B1 | 4/2004 | Narayanaswami |
| 6,795,569 B1 | 9/2004 | Setlak |
| 6,879,710 B1 | 4/2005 | Hinoue et al. |
| 6,941,001 B1 | 9/2005 | Bolle et al. |
| 6,980,081 B2 | 12/2005 | Anderson |
| 7,030,860 B1 | 4/2006 | Hsu et al. |
| 7,057,607 B2 | 6/2006 | Mayoraz et al. |
| 7,124,300 B1 | 10/2006 | Lemke |
| 7,155,411 B1 | 12/2006 | Blinn et al. |
| 7,190,816 B2 | 3/2007 | Mitsuyu et al. |
| 7,239,728 B1 | 7/2007 | Choi et al. |
| 7,305,350 B1 | 12/2007 | Bruecken |
| 7,346,778 B1 | 3/2008 | Guiter et al. |
| 7,346,779 B2 | 3/2008 | Leeper |
| 7,414,613 B2 | 8/2008 | Simelius |
| 7,420,546 B2 | 9/2008 | Abdallah et al. |
| 7,454,192 B1 | 11/2008 | Zhu |
| 7,525,537 B2 | 4/2009 | Abdallah et al. |
| 7,630,522 B2 | 12/2009 | Popp et al. |
| 7,633,076 B2 | 12/2009 | Huppi et al. |
| 7,676,748 B1 | 3/2010 | Barrus et al. |
| 7,688,314 B2 | 3/2010 | Abdallah et al. |
| 7,697,729 B2 | 4/2010 | Howell et al. |
| 7,705,737 B2 | 4/2010 | Senga |
| 7,730,401 B2 | 6/2010 | Gillespie et al. |
| 7,734,930 B2 | 6/2010 | Kirovski et al. |
| 7,738,916 B2 | 6/2010 | Fukuda |
| 7,860,536 B2 | 12/2010 | Jobs et al. |
| RE42,038 E | 1/2011 | Abdallah et al. |
| 7,921,297 B2 | 4/2011 | Ortiz et al. |
| RE42,574 E | 7/2011 | Cockayne |
| 8,006,299 B2 | 8/2011 | Suominen |
| 8,018,440 B2 | 9/2011 | Townsend et al. |
| 8,060,571 B2 * | 11/2011 | Rao ............... H04L 65/601 348/553 |
| 8,077,157 B2 | 12/2011 | Sengupta et al. |
| 8,095,634 B2 | 1/2012 | Rao |
| 8,145,912 B2 | 3/2012 | McLean |
| 8,195,507 B2 | 6/2012 | Postrel |
| 8,195,576 B1 | 6/2012 | Grigg et al. |
| 8,311,514 B2 | 11/2012 | Bandyopadhyay et al. |
| 8,336,086 B2 | 12/2012 | Seo |
| 8,341,557 B2 | 12/2012 | Pisula et al. |
| 8,392,259 B2 | 3/2013 | MacGillivray et al. |
| 8,395,658 B2 | 3/2013 | Corson |
| 8,438,400 B2 | 5/2013 | Hoghaug et al. |
| 8,453,940 B2 | 6/2013 | Diamond |
| 8,571,937 B2 | 10/2013 | Rose et al. |
| 8,613,070 B1 | 12/2013 | Borzycki et al. |
| 8,638,385 B2 | 1/2014 | Bhogal |
| 8,718,556 B2 | 5/2014 | Lee et al. |
| 8,763,896 B2 | 7/2014 | Kushevsky et al. |
| 8,782,775 B2 | 7/2014 | Fadell et al. |
| 8,788,838 B1 | 7/2014 | Fadell et al. |
| 8,880,055 B1 | 11/2014 | Clement et al. |
| 8,892,474 B1 | 11/2014 | Inskeep et al. |
| 8,931,703 B1 | 1/2015 | Mullen et al. |
| 8,942,420 B2 | 1/2015 | Kim et al. |
| 8,943,580 B2 | 1/2015 | Fadell et al. |
| 9,038,167 B2 | 5/2015 | Fadell et al. |
| 9,134,896 B2 | 9/2015 | Fadell et al. |
| 9,179,298 B2 | 11/2015 | Jung et al. |
| 9,250,795 B2 | 2/2016 | Fadell et al. |
| 9,269,083 B1 | 2/2016 | Jarajapu et al. |
| 9,304,624 B2 | 4/2016 | Fadell et al. |
| 9,324,067 B2 | 4/2016 | Van Os et al. |
| 9,329,771 B2 | 5/2016 | Fadell et al. |
| 9,342,674 B2 | 5/2016 | Abdallah et al. |
| 9,355,393 B2 | 5/2016 | Purves et al. |
| 9,483,763 B2 | 11/2016 | Van Os et al. |
| 9,495,531 B2 | 11/2016 | Fadell et al. |
| 9,519,771 B2 | 12/2016 | Fadell et al. |
| 9,600,709 B2 | 3/2017 | Russo |
| 2001/0031072 A1 | 10/2001 | Dobashi et al. |
| 2001/0039497 A1 | 11/2001 | Hubbard |
| 2001/0044906 A1 | 11/2001 | Kanevsky et al. |
| 2001/0047488 A1 | 11/2001 | Verplaetse et al. |
| 2002/0023215 A1 | 2/2002 | Wang et al. |
| 2002/0029169 A1 | 3/2002 | Oki et al. |
| 2002/0095588 A1 | 7/2002 | Shigematsu et al. |
| 2002/0141586 A1 | 10/2002 | Margalit et al. |
| 2002/0190960 A1 | 12/2002 | Kuo et al. |
| 2002/0191029 A1 | 12/2002 | Gillespie et al. |
| 2003/0046557 A1 | 3/2003 | Miller et al. |
| 2003/0048173 A1 | 3/2003 | Shigematsu et al. |
| 2003/0055977 A1 | 3/2003 | Miller |
| 2003/0061157 A1 | 3/2003 | Hirka et al. |
| 2003/0079057 A1 | 4/2003 | Ruskin et al. |
| 2003/0115490 A1 | 6/2003 | Russo et al. |
| 2003/0118217 A1 | 6/2003 | Kondo et al. |
| 2003/0120934 A1 | 6/2003 | Ortiz |
| 2003/0132974 A1 | 7/2003 | Bodin |
| 2003/0138136 A1 | 7/2003 | Umezaki et al. |
| 2003/0142227 A1 | 7/2003 | Van Zee |
| 2003/0163710 A1 | 8/2003 | Ortiz et al. |
| 2003/0181201 A1 | 9/2003 | Bomze et al. |
| 2003/0188183 A1 | 10/2003 | Lee et al. |
| 2003/0195935 A1 | 10/2003 | Leeper |
| 2003/0200184 A1 | 10/2003 | Dominguez et al. |
| 2003/0210127 A1 | 11/2003 | Anderson |
| 2004/0030934 A1 | 2/2004 | Mizoguchi et al. |
| 2004/0076310 A1 | 4/2004 | Hersch et al. |
| 2004/0085300 A1 | 5/2004 | Matusis |
| 2004/0085351 A1 | 5/2004 | Tokkonen |
| 2004/0088564 A1 | 5/2004 | Norman |
| 2004/0104268 A1 | 6/2004 | Bailey |
| 2004/0113819 A1 | 6/2004 | Gauthey et al. |
| 2004/0131237 A1 | 7/2004 | MacHida |
| 2004/0135801 A1 | 7/2004 | Thompson et al. |
| 2004/0169722 A1 | 9/2004 | Pena |
| 2004/0172562 A1 | 9/2004 | Berger et al. |
| 2004/0196400 A1 | 10/2004 | Stavely et al. |
| 2004/0229560 A1 | 11/2004 | Maloney |
| 2004/0230843 A1 | 11/2004 | Jansen |

(56) References Cited

U.S. PATENT DOCUMENTS

| | | |
|---|---|---|
| 2004/0239648 A1 | 12/2004 | Abdallah et al. |
| 2004/0250138 A1 | 12/2004 | Schneider |
| 2004/0254891 A1 | 12/2004 | Blinn et al. |
| 2004/0260955 A1 | 12/2004 | Mantyla |
| 2005/0024341 A1 | 2/2005 | Gillespie et al. |
| 2005/0040962 A1 | 2/2005 | Funkhouser et al. |
| 2005/0041841 A1 | 2/2005 | Yoo et al. |
| 2005/0060554 A1 | 3/2005 | O'Donoghue |
| 2005/0071635 A1 | 3/2005 | Furuyama |
| 2005/0078855 A1 | 4/2005 | Chandler et al. |
| 2005/0079896 A1 | 4/2005 | Kokko et al. |
| 2005/0093834 A1 | 5/2005 | Abdallah et al. |
| 2005/0097171 A1 | 5/2005 | Hikichi |
| 2005/0097608 A1 | 5/2005 | Penke et al. |
| 2005/0100198 A1 | 5/2005 | Nakano et al. |
| 2005/0111708 A1 | 5/2005 | Chou |
| 2005/0113071 A1 | 5/2005 | Nagata |
| 2005/0114686 A1 | 5/2005 | Ball et al. |
| 2005/0169503 A1 | 8/2005 | Howell et al. |
| 2005/0174325 A1 | 8/2005 | Setlak |
| 2005/0187873 A1 | 8/2005 | Labrou et al. |
| 2005/0206501 A1 | 9/2005 | Farhat |
| 2005/0221798 A1 | 10/2005 | Sengupta et al. |
| 2005/0226472 A1 | 10/2005 | Komura |
| 2005/0253814 A1 | 11/2005 | Ghassabian |
| 2005/0253817 A1 | 11/2005 | Rytivaara et al. |
| 2005/0254086 A1 | 11/2005 | Shouno |
| 2006/0000900 A1 | 1/2006 | Fernandes et al. |
| 2006/0021003 A1 | 1/2006 | Fisher et al. |
| 2006/0032908 A1 | 2/2006 | Sines |
| 2006/0064313 A1 | 3/2006 | Steinbarth et al. |
| 2006/0064372 A1 | 3/2006 | Gupta |
| 2006/0075250 A1 | 4/2006 | Liao |
| 2006/0078176 A1 | 4/2006 | Abiko et al. |
| 2006/0080525 A1 | 4/2006 | Ritter et al. |
| 2006/0093183 A1 | 5/2006 | Hosoi |
| 2006/0093192 A1 | 5/2006 | Bechtel |
| 2006/0115130 A1 | 6/2006 | Kozlay |
| 2006/0116555 A1 | 6/2006 | Pavlidis et al. |
| 2006/0136087 A1 | 6/2006 | Higashiura |
| 2006/0136734 A1 | 6/2006 | Telek et al. |
| 2006/0156028 A1 | 7/2006 | Aoyama et al. |
| 2006/0165060 A1 | 7/2006 | Dua |
| 2006/0179404 A1 | 8/2006 | Yolleck et al. |
| 2006/0185005 A1 | 8/2006 | Graves et al. |
| 2006/0206709 A1 | 9/2006 | Labrou et al. |
| 2006/0214910 A1 | 9/2006 | Mizuno et al. |
| 2006/0224645 A1 | 10/2006 | Kadi |
| 2006/0239517 A1 | 10/2006 | Creasey et al. |
| 2006/0274920 A1 | 12/2006 | Tochikubo et al. |
| 2006/0285663 A1 | 12/2006 | Rathus et al. |
| 2006/0288234 A1 | 12/2006 | Azar et al. |
| 2007/0008066 A1 | 1/2007 | Fukuda |
| 2007/0014439 A1 | 1/2007 | Ando |
| 2007/0016958 A1 | 1/2007 | Bodepudi et al. |
| 2007/0021194 A1 | 1/2007 | Aida |
| 2007/0061126 A1 | 3/2007 | Russo et al. |
| 2007/0061889 A1 | 3/2007 | Sainaney |
| 2007/0067642 A1 | 3/2007 | Singhal |
| 2007/0089164 A1 | 4/2007 | Gao et al. |
| 2007/0096765 A1 | 5/2007 | Kagan |
| 2007/0106942 A1 | 5/2007 | Sanaka et al. |
| 2007/0109274 A1 | 5/2007 | Reynolds |
| 2007/0110287 A1 | 5/2007 | Kim et al. |
| 2007/0115933 A1 | 5/2007 | Muhamed et al. |
| 2007/0131759 A1 | 6/2007 | Cox et al. |
| 2007/0150842 A1 | 6/2007 | Chaudhri et al. |
| 2007/0189583 A1 | 8/2007 | Shimada et al. |
| 2007/0194113 A1 | 8/2007 | Esplin et al. |
| 2007/0204037 A1 | 8/2007 | Kunz et al. |
| 2007/0208743 A1 | 9/2007 | Sainaney |
| 2007/0220273 A1 | 9/2007 | Campisi |
| 2007/0226778 A1 | 9/2007 | Pietruszka |
| 2007/0236330 A1 | 10/2007 | Cho et al. |
| 2007/0236475 A1 | 10/2007 | Wherry |
| 2007/0239921 A1 | 10/2007 | Toorians et al. |
| 2007/0250573 A1 | 10/2007 | Rothschild |
| 2007/0253604 A1 | 11/2007 | Inoue et al. |
| 2007/0254712 A1 | 11/2007 | Chitti, Sr. |
| 2007/0259716 A1 | 11/2007 | Mattice et al. |
| 2007/0260558 A1 | 11/2007 | Look |
| 2007/0277224 A1 | 11/2007 | Osborn et al. |
| 2007/0280515 A1 | 12/2007 | Goto |
| 2008/0001703 A1 | 1/2008 | Goto |
| 2008/0027947 A1 | 1/2008 | Pritchett et al. |
| 2008/0032801 A1 | 2/2008 | Brunet De Courssou |
| 2008/0040265 A1 | 2/2008 | Rackley et al. |
| 2008/0040786 A1 | 2/2008 | Chang |
| 2008/0041936 A1 | 2/2008 | Vawter |
| 2008/0042983 A1 | 2/2008 | Kim et al. |
| 2008/0048878 A1 | 2/2008 | Boillot |
| 2008/0049984 A1 | 2/2008 | Poo et al. |
| 2008/0052181 A1 | 2/2008 | Devitt-Carolan et al. |
| 2008/0069412 A1 | 3/2008 | Champagne et al. |
| 2008/0072045 A1 | 3/2008 | Mizrah |
| 2008/0092245 A1 | 4/2008 | Alward et al. |
| 2008/0120707 A1 | 5/2008 | Ramia |
| 2008/0133931 A1 | 6/2008 | Kosaka |
| 2008/0160974 A1 | 7/2008 | Vartiainen et al. |
| 2008/0165255 A1 | 7/2008 | Christie et al. |
| 2008/0178283 A1 | 7/2008 | Pratt et al. |
| 2008/0208762 A1* | 8/2008 | Arthur .............. G06Q 20/027 705/79 |
| 2008/0244440 A1 | 10/2008 | Bailey et al. |
| 2008/0250481 A1 | 10/2008 | Beck et al. |
| 2008/0282202 A1 | 11/2008 | Sunday |
| 2008/0292074 A1 | 11/2008 | Boni et al. |
| 2008/0292144 A1 | 11/2008 | Kim |
| 2008/0309632 A1 | 12/2008 | Westerman et al. |
| 2008/0313257 A1 | 12/2008 | Allen et al. |
| 2008/0314971 A1 | 12/2008 | Faith et al. |
| 2008/0317292 A1 | 12/2008 | Baker et al. |
| 2009/0005165 A1 | 1/2009 | Arezina et al. |
| 2009/0006292 A1 | 1/2009 | Block |
| 2009/0006991 A1 | 1/2009 | Lindberg et al. |
| 2009/0030793 A1 | 1/2009 | Fordyce, III |
| 2009/0037326 A1 | 2/2009 | Chitti et al. |
| 2009/0037742 A1 | 2/2009 | Narayanaswami |
| 2009/0057396 A1 | 3/2009 | Barbour et al. |
| 2009/0061837 A1 | 3/2009 | Chaudhri et al. |
| 2009/0064055 A1 | 3/2009 | Chaudhri et al. |
| 2009/0067685 A1 | 3/2009 | Boshra et al. |
| 2009/0074255 A1 | 3/2009 | Holm |
| 2009/0083850 A1 | 3/2009 | Fadell et al. |
| 2009/0100383 A1 | 4/2009 | Sunday et al. |
| 2009/0135678 A1 | 5/2009 | Godat |
| 2009/0140960 A1 | 6/2009 | Mahowald |
| 2009/0164878 A1 | 6/2009 | Cottrille |
| 2009/0173784 A1 | 7/2009 | Yang |
| 2009/0176565 A1 | 7/2009 | Kelly |
| 2009/0182674 A1 | 7/2009 | Patel et al. |
| 2009/0195469 A1 | 8/2009 | Lim et al. |
| 2009/0201257 A1 | 8/2009 | Saitoh et al. |
| 2009/0210308 A1 | 8/2009 | Toomer et al. |
| 2009/0224874 A1 | 9/2009 | Dewar et al. |
| 2009/0244015 A1 | 10/2009 | Sengupta et al. |
| 2009/0258667 A1 | 10/2009 | Suzuki et al. |
| 2009/0307139 A1 | 12/2009 | Mardikar et al. |
| 2009/0327744 A1 | 12/2009 | Hatano |
| 2009/0328162 A1 | 12/2009 | Kokumai et al. |
| 2010/0008545 A1 | 1/2010 | Ueki et al. |
| 2010/0023449 A1 | 1/2010 | Skowronek et al. |
| 2010/0026453 A1 | 2/2010 | Yamamoto et al. |
| 2010/0034432 A1 | 2/2010 | Ono et al. |
| 2010/0042517 A1 | 2/2010 | Paintin et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0114731 A1 | 5/2010 | Kingston et al. |
| 2010/0146384 A1 | 6/2010 | Peev et al. |
| 2010/0153265 A1 | 6/2010 | Hershfield et al. |
| 2010/0158327 A1 | 6/2010 | Kangas et al. |
| 2010/0159995 A1 | 6/2010 | Stallings et al. |

(56) References Cited

U.S. PATENT DOCUMENTS

| | | |
|---|---|---|
| 2010/0161434 A1 | 6/2010 | Herwig et al. |
| 2010/0164684 A1 | 7/2010 | Sasa et al. |
| 2010/0164864 A1 | 7/2010 | Chou |
| 2010/0182125 A1 | 7/2010 | Abdallah et al. |
| 2010/0223145 A1 | 9/2010 | Dragt |
| 2010/0237991 A1 | 9/2010 | Prabhu et al. |
| 2010/0267362 A1 | 10/2010 | Smith et al. |
| 2010/0272250 A1 | 10/2010 | Yap et al. |
| 2010/0273461 A1 | 10/2010 | Choi |
| 2010/0302016 A1 | 12/2010 | Zaborowski |
| 2010/0306107 A1 | 12/2010 | Nahari |
| 2010/0313263 A1 | 12/2010 | Uchida et al. |
| 2011/0013813 A1 | 1/2011 | Yamamoto et al. |
| 2011/0041102 A1 | 2/2011 | Kim |
| 2011/0065384 A1 | 3/2011 | Cader et al. |
| 2011/0078025 A1 | 3/2011 | Shrivastav |
| 2011/0088086 A1 | 4/2011 | Swink et al. |
| 2011/0099079 A1 | 4/2011 | White |
| 2011/0106671 A1 | 5/2011 | Minnis et al. |
| 2011/0159959 A1 | 6/2011 | Mallinson et al. |
| 2011/0175703 A1 | 7/2011 | Benkley, III |
| 2011/0179386 A1 | 7/2011 | Shaffer et al. |
| 2011/0184820 A1 | 7/2011 | Mon et al. |
| 2011/0214158 A1 | 9/2011 | Pasquero et al. |
| 2011/0218849 A1 | 9/2011 | Rutigliano et al. |
| 2011/0225057 A1 | 9/2011 | Webb et al. |
| 2011/0251892 A1 | 10/2011 | Laracey |
| 2011/0281568 A1 | 11/2011 | Le Clech |
| 2011/0286640 A1 | 11/2011 | Kwon et al. |
| 2011/0300829 A1 | 12/2011 | Nurmi et al. |
| 2011/0314398 A1 | 12/2011 | Yano |
| 2012/0009896 A1 | 1/2012 | Bandyopadhyay et al. |
| 2012/0024947 A1 | 2/2012 | Naelon |
| 2012/0028609 A1 | 2/2012 | Hruska |
| 2012/0036029 A1 | 2/2012 | Esplin et al. |
| 2012/0036556 A1 | 2/2012 | Lebeau et al. |
| 2012/0072546 A1 | 3/2012 | Etchegoyen |
| 2012/0078751 A1 | 3/2012 | MacPhail et al. |
| 2012/0096069 A1 | 4/2012 | Chan |
| 2012/0096076 A1 | 4/2012 | Chan |
| 2012/0096386 A1 | 4/2012 | Baumann et al. |
| 2012/0101881 A1 | 4/2012 | Taylor et al. |
| 2012/0101887 A1 | 4/2012 | Harvey et al. |
| 2012/0123937 A1 | 5/2012 | Spodak |
| 2012/0129496 A1 | 5/2012 | Park et al. |
| 2012/0139698 A1 | 6/2012 | Tsui et al. |
| 2012/0143694 A1 | 6/2012 | Zargahi et al. |
| 2012/0185397 A1 | 7/2012 | Levovitz |
| 2012/0191603 A1 | 7/2012 | Nuzzi |
| 2012/0197740 A1 | 8/2012 | Grigg et al. |
| 2012/0215647 A1 | 8/2012 | Powell et al. |
| 2012/0221464 A1 | 8/2012 | Pasquero et al. |
| 2012/0223890 A1 | 9/2012 | Borovsky et al. |
| 2012/0238363 A1 | 9/2012 | Watanabe et al. |
| 2012/0245985 A1 | 9/2012 | Cho et al. |
| 2012/0283871 A1 | 11/2012 | Chai et al. |
| 2012/0284185 A1 | 11/2012 | Mettler et al. |
| 2012/0284673 A1 | 11/2012 | Lamb et al. |
| 2012/0290449 A1 | 11/2012 | Mullen et al. |
| 2012/0290472 A1 | 11/2012 | Mullen et al. |
| 2012/0290657 A1 | 11/2012 | Parks et al. |
| 2012/0290943 A1 | 11/2012 | Toney et al. |
| 2012/0293438 A1 | 11/2012 | Chaudhri et al. |
| 2012/0310760 A1 | 12/2012 | Phillips et al. |
| 2012/0317023 A1 | 12/2012 | Moon et al. |
| 2013/0005487 A1 | 1/2013 | Frazzini et al. |
| 2013/0006746 A1 | 1/2013 | Moore |
| 2013/0031217 A1* | 1/2013 | Rajapakse ............ H04L 65/4076 709/219 |
| 2013/0046893 A1 | 2/2013 | Hauser et al. |
| 2013/0047034 A1 | 2/2013 | Salomon et al. |
| 2013/0054697 A1 | 2/2013 | Cha |
| 2013/0063364 A1 | 3/2013 | Moore |
| 2013/0067545 A1 | 3/2013 | Hanes |
| 2013/0080272 A1 | 3/2013 | Ronca et al. |
| 2013/0080275 A1 | 3/2013 | Ronca et al. |
| 2013/0080525 A1 | 3/2013 | Aoki et al. |
| 2013/0082819 A1 | 4/2013 | Cotterill |
| 2013/0085931 A1 | 4/2013 | Runyan |
| 2013/0103519 A1 | 4/2013 | Kountotsis et al. |
| 2013/0110719 A1 | 5/2013 | Carter et al. |
| 2013/0115932 A1 | 5/2013 | Williams et al. |
| 2013/0120254 A1 | 5/2013 | Mun et al. |
| 2013/0124319 A1 | 5/2013 | Hodge et al. |
| 2013/0145303 A1 | 6/2013 | Prakash et al. |
| 2013/0145448 A1 | 6/2013 | Newell |
| 2013/0173699 A1 | 7/2013 | Parks et al. |
| 2013/0179304 A1 | 7/2013 | Swist |
| 2013/0189953 A1 | 7/2013 | Mathews |
| 2013/0189963 A1 | 7/2013 | Epp et al. |
| 2013/0191911 A1 | 7/2013 | Dellinger et al. |
| 2013/0198112 A1 | 8/2013 | Bhat |
| 2013/0200146 A1 | 8/2013 | Moghadam |
| 2013/0212212 A1 | 8/2013 | Addepalli et al. |
| 2013/0212655 A1 | 8/2013 | Hoyos et al. |
| 2013/0218721 A1 | 8/2013 | Borhan et al. |
| 2013/0232073 A1 | 9/2013 | Sheets et al. |
| 2013/0238455 A1 | 9/2013 | Laracey |
| 2013/0239202 A1 | 9/2013 | Adams et al. |
| 2013/0244615 A1 | 9/2013 | Miller |
| 2013/0246202 A1 | 9/2013 | Tobin |
| 2013/0279768 A1 | 10/2013 | Boshra |
| 2013/0282533 A1 | 10/2013 | Foran-Owens et al. |
| 2013/0297414 A1 | 11/2013 | Goldfarb et al. |
| 2013/0298024 A1 | 11/2013 | Rhee et al. |
| 2013/0304651 A1 | 11/2013 | Smith et al. |
| 2013/0318249 A1 | 11/2013 | McDonough et al. |
| 2013/0325967 A1 | 12/2013 | Parks et al. |
| 2013/0326563 A1 | 12/2013 | Mulcahy et al. |
| 2013/0332358 A1 | 12/2013 | Zhao |
| 2013/0346273 A1 | 12/2013 | Stockton et al. |
| 2014/0003597 A1 | 1/2014 | Lazaridis et al. |
| 2014/0006285 A1 | 1/2014 | Chi et al. |
| 2014/0025513 A1 | 1/2014 | Cooke et al. |
| 2014/0025520 A1 | 1/2014 | Mardikar et al. |
| 2014/0032706 A1 | 1/2014 | Kuscher et al. |
| 2014/0036099 A1 | 2/2014 | Balassanian |
| 2014/0047020 A1 | 2/2014 | Matus et al. |
| 2014/0047382 A1 | 2/2014 | Kim |
| 2014/0052553 A1 | 2/2014 | Uzo |
| 2014/0058860 A1 | 2/2014 | Roh et al. |
| 2014/0058935 A1 | 2/2014 | Mijares |
| 2014/0058941 A1 | 2/2014 | Moon et al. |
| 2014/0064155 A1 | 3/2014 | Evans |
| 2014/0068751 A1 | 3/2014 | Last |
| 2014/0074569 A1 | 3/2014 | Francis et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0082136 A1 | 3/2014 | Garcia Puga et al. |
| 2014/0094124 A1 | 4/2014 | Dave et al. |
| 2014/0099886 A1 | 4/2014 | Monroe |
| 2014/0112555 A1 | 4/2014 | Fadell et al. |
| 2014/0115695 A1 | 4/2014 | Fadell et al. |
| 2014/0122331 A1 | 5/2014 | Vaish et al. |
| 2014/0129441 A1 | 5/2014 | Blanco et al. |
| 2014/0134947 A1 | 5/2014 | Stouder-Studenmund |
| 2014/0140587 A1 | 5/2014 | Ballard et al. |
| 2014/0143145 A1 | 5/2014 | Kortina et al. |
| 2014/0149198 A1 | 5/2014 | Kim et al. |
| 2014/0149884 A1 | 5/2014 | Flynn et al. |
| 2014/0155031 A1 | 6/2014 | Lee et al. |
| 2014/0156531 A1 | 6/2014 | Poon et al. |
| 2014/0157390 A1 | 6/2014 | Lurey et al. |
| 2014/0164241 A1 | 6/2014 | Neuwirth |
| 2014/0165012 A1 | 6/2014 | Shen et al. |
| 2014/0173447 A1 | 6/2014 | Das |
| 2014/0187856 A1 | 7/2014 | Holoien et al. |
| 2014/0188673 A1 | 7/2014 | Graham et al. |
| 2014/0197234 A1 | 7/2014 | Hammad |
| 2014/0244495 A1 | 8/2014 | Davis et al. |
| 2014/0279442 A1 | 9/2014 | Luoma et al. |
| 2014/0279474 A1 | 9/2014 | Evans et al. |
| 2014/0279556 A1 | 9/2014 | Priebatsch et al. |

(56) References Cited

U.S. PATENT DOCUMENTS

| | | |
|---|---|---|
| 2014/0282240 A1 | 9/2014 | Flynn, III |
| 2014/0282987 A1 | 9/2014 | Narendra et al. |
| 2014/0292396 A1 | 10/2014 | Bruwer et al. |
| 2014/0304809 A1 | 10/2014 | Fadell et al. |
| 2014/0325447 A1 | 10/2014 | Jin et al. |
| 2014/0337207 A1 | 11/2014 | Zhang et al. |
| 2014/0344082 A1 | 11/2014 | Soundararajan |
| 2014/0359140 A1 | 12/2014 | Shankarraman |
| 2014/0372309 A1 | 12/2014 | Shirey et al. |
| 2014/0375577 A1 | 12/2014 | Yeh et al. |
| 2014/0380187 A1 | 12/2014 | Gardenfors et al. |
| 2014/0380465 A1 | 12/2014 | Fadell et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0012435 A1 | 1/2015 | Ramavarjula et al. |
| 2015/0014141 A1 | 1/2015 | Rao et al. |
| 2015/0039494 A1 | 2/2015 | Sinton et al. |
| 2015/0051846 A1 | 2/2015 | Masuya |
| 2015/0056957 A1 | 2/2015 | Mardikar et al. |
| 2015/0058146 A1 | 2/2015 | Gaddam et al. |
| 2015/0066758 A1 | 3/2015 | Denardis et al. |
| 2015/0074615 A1 | 3/2015 | Han et al. |
| 2015/0077362 A1 | 3/2015 | Seo |
| 2015/0095174 A1 | 4/2015 | Dua |
| 2015/0095175 A1* | 4/2015 | Dua ................... G06Q 20/20 705/21 |
| 2015/0120545 A1 | 4/2015 | Fiore et al. |
| 2015/0121405 A1 | 4/2015 | Ekselius et al. |
| 2015/0127539 A1 | 5/2015 | Ye et al. |
| 2015/0146945 A1 | 5/2015 | Han et al. |
| 2015/0163188 A1 | 6/2015 | Faaborg et al. |
| 2015/0178548 A1 | 6/2015 | Abdallah et al. |
| 2015/0186871 A1 | 7/2015 | Laracey |
| 2015/0193069 A1 | 7/2015 | Di Censo et al. |
| 2015/0195133 A1 | 7/2015 | Sheets et al. |
| 2015/0215128 A1 | 7/2015 | Pal |
| 2015/0229750 A1 | 8/2015 | Zhou et al. |
| 2015/0242837 A1 | 8/2015 | Yarbrough et al. |
| 2015/0254661 A1 | 9/2015 | Lanc |
| 2015/0257004 A1 | 9/2015 | Shanmugam et al. |
| 2015/0295921 A1 | 10/2015 | Cao |
| 2015/0339466 A1 | 11/2015 | Gao et al. |
| 2015/0347010 A1 | 12/2015 | Yang et al. |
| 2015/0348002 A1 | 12/2015 | Van Os et al. |
| 2015/0348009 A1 | 12/2015 | Brown et al. |
| 2015/0350296 A1 | 12/2015 | Yang et al. |
| 2015/0350297 A1 | 12/2015 | Yang et al. |
| 2016/0005024 A1 | 1/2016 | Harrell |
| 2016/0012417 A1 | 1/2016 | Mizon |
| 2016/0012465 A1 | 1/2016 | Sharp |
| 2016/0021003 A1 | 1/2016 | Pan |
| 2016/0034887 A1 | 2/2016 | Lee |
| 2016/0086176 A1 | 3/2016 | Silva Pinto et al. |
| 2016/0092665 A1 | 3/2016 | Cowan et al. |
| 2016/0132864 A1 | 5/2016 | Barrese et al. |
| 2016/0134488 A1 | 5/2016 | Straub et al. |
| 2016/0154956 A1 | 6/2016 | Fadell et al. |
| 2016/0180305 A1 | 6/2016 | Dresser et al. |
| 2016/0224966 A1 | 8/2016 | Van Os et al. |
| 2016/0224973 A1 | 8/2016 | Van Os et al. |
| 2016/0232516 A1 | 8/2016 | Dayan et al. |
| 2016/0253665 A1 | 9/2016 | Van Os et al. |
| 2016/0259656 A1 | 9/2016 | Sumner et al. |
| 2016/0267779 A1* | 9/2016 | Kuang ................... G08C 25/00 |
| 2016/0358133 A1 | 12/2016 | Van Os et al. |
| 2016/0358134 A1 | 12/2016 | Van Os et al. |
| 2016/0358167 A1 | 12/2016 | Van Os et al. |
| 2016/0358168 A1 | 12/2016 | Van Os et al. |
| 2016/0358180 A1 | 12/2016 | Van Os et al. |
| 2016/0358199 A1 | 12/2016 | Van Os et al. |
| 2016/0359831 A1 | 12/2016 | Berlin et al. |
| 2017/0032375 A1 | 2/2017 | Van Os et al. |
| 2017/0169204 A1 | 6/2017 | Fadell et al. |
| 2017/0192730 A1 | 7/2017 | Yang et al. |
| 2017/0199997 A1 | 7/2017 | Fadell et al. |

FOREIGN PATENT DOCUMENTS

| | | |
|---|---|---|
| AU | 2016100796 A4 | 6/2016 |
| CA | 2876587 A1 | 2/2014 |
| CN | 1220433 A | 6/1999 |
| CN | 1525723 A | 9/2004 |
| CN | 1685357 A | 10/2005 |
| CN | 1742252 A | 3/2006 |
| CN | 1801708 A | 7/2006 |
| CN | 1836397 A | 9/2006 |
| CN | 101035335 A | 9/2007 |
| CN | 101409743 A | 4/2009 |
| CN | 102262506 A | 11/2011 |
| CN | 102707994 A | 10/2012 |
| CN | 102750086 A | 10/2012 |
| CN | 103250138 A | 8/2013 |
| CN | 103582873 A | 2/2014 |
| CN | 104038256 A | 9/2014 |
| DE | 10153591 A1 | 5/2003 |
| EP | 593386 A2 | 4/1994 |
| EP | 923018 A2 | 6/1999 |
| EP | 1043698 A2 | 10/2000 |
| EP | 1215575 A2 | 6/2002 |
| EP | 1257111 A1 | 11/2002 |
| EP | 1357458 A2 | 10/2003 |
| EP | 1422589 A1 | 5/2004 |
| EP | 1626330 A1 | 2/2006 |
| EP | 1645989 A2 | 4/2006 |
| EP | 1736908 A2 | 12/2006 |
| EP | 1760584 A1 | 3/2007 |
| EP | 2247087 A1 | 11/2010 |
| EP | 2654275 A1 | 10/2013 |
| EP | 2701107 A1 | 2/2014 |
| EP | 2725473 A1 | 4/2014 |
| EP | 2725537 A1 | 4/2014 |
| EP | 2770708 A1 | 8/2014 |
| EP | 2801924 A1 | 11/2014 |
| GB | 2184576 A | 6/1987 |
| GB | 2312040 A | 10/1997 |
| GB | 2313460 A | 11/1997 |
| GB | 2360618 A | 9/2001 |
| GB | 2466038 A | 6/2010 |
| GB | 2505476 A | 3/2014 |
| JP | 4158434 A | 6/1992 |
| JP | 7-146942 A | 6/1995 |
| JP | 7-234837 A | 9/1995 |
| JP | 9-128208 A | 5/1997 |
| JP | 9-221950 A | 8/1997 |
| JP | 10-11216 A | 1/1998 |
| JP | 10-63424 A | 3/1998 |
| JP | 10-63427 A | 3/1998 |
| JP | 10-69346 A | 3/1998 |
| JP | 11-185016 A | 7/1999 |
| JP | 2000-90052 A | 3/2000 |
| JP | 2000-200092 A | 7/2000 |
| JP | 2000-293253 A | 10/2000 |
| JP | 2000-315118 A | 11/2000 |
| JP | 2000-339097 A | 12/2000 |
| JP | 2001-14051 A | 1/2001 |
| JP | 2001-92554 A | 4/2001 |
| JP | 2001-510579 A | 7/2001 |
| JP | 2002-149171 A | 5/2002 |
| JP | 2002-159052 A | 5/2002 |
| JP | 2002-515145 A | 5/2002 |
| JP | 2002-207525 A | 7/2002 |
| JP | 2002-525718 A | 8/2002 |
| JP | 2002-352234 A | 12/2002 |
| JP | 2002-358162 A | 12/2002 |
| JP | 2003-67343 A | 3/2003 |
| JP | 2003-143290 A | 5/2003 |
| JP | 2003-298689 A | 10/2003 |
| JP | 2003-346059 A | 12/2003 |
| JP | 2004-86866 A | 3/2004 |
| JP | 2004-252736 A | 9/2004 |
| JP | 2004-532477 A | 10/2004 |

(56) References Cited

FOREIGN PATENT DOCUMENTS

| | | |
|---|---|---|
| JP | 2004-313459 A | 11/2004 |
| JP | 2004-334788 A | 11/2004 |
| JP | 2004-348600 A | 12/2004 |
| JP | 2004-348601 A | 12/2004 |
| JP | 2005-4490 A | 1/2005 |
| JP | 2005-71225 A | 3/2005 |
| JP | 2005-122700 A | 5/2005 |
| JP | 2005-521961 A | 7/2005 |
| JP | 2005-523505 A | 8/2005 |
| JP | 2006-12080 A | 1/2006 |
| JP | 2006-85559 A | 3/2006 |
| JP | 2006-115043 A | 4/2006 |
| JP | 2006-172180 A | 6/2006 |
| JP | 2006-202278 A | 8/2006 |
| JP | 2006-215705 A | 8/2006 |
| JP | 2007-71008 A | 3/2007 |
| JP | 2007-148801 A | 6/2007 |
| JP | 2008-250601 A | 10/2008 |
| JP | 2009-15543 A | 1/2009 |
| JP | 2009-296577 A | 12/2009 |
| JP | 2010-245940 A | 10/2010 |
| JP | 2012-508930 A | 4/2012 |
| JP | 2012-168966 A | 9/2012 |
| JP | 2012-194661 A | 10/2012 |
| JP | 2014-503861 A | 2/2014 |
| JP | 2014-44719 A | 3/2014 |
| JP | 2015-520456 A | 7/2015 |
| KR | 2002-0087665 A | 11/2002 |
| KR | 10-2004- 0049502 A | 6/2004 |
| KR | 10-0652624 B1 | 12/2006 |
| KR | 10-2007- 0026808 A | 3/2007 |
| KR | 10-2008- 0064395 A | 7/2008 |
| KR | 10-2011- 0056561 A | 5/2011 |
| KR | 10-2013- 0063019 A | 6/2013 |
| KR | 10-2013- 0075783 A | 7/2013 |
| KR | 10-2013- 0082190 A | 7/2013 |
| TW | 200529636 A | 9/2005 |
| TW | 200601176 A | 1/2006 |
| TW | 200642408 A | 12/2006 |
| TW | 200919255 A | 5/2009 |
| TW | 201137722 A | 11/2011 |
| TW | 201316247 A | 4/2013 |
| TW | 201324310 A | 6/2013 |
| TW | 201409345 A | 3/2014 |
| TW | 201415345 A | 4/2014 |
| TW | 201416959 A | 5/2014 |
| WO | 1997/41528 A1 | 11/1997 |
| WO | 1998/58346 A | 12/1998 |
| WO | 99/44114 A1 | 9/1999 |
| WO | 2000/16244 A1 | 3/2000 |
| WO | 01/63386 A1 | 8/2001 |
| WO | 2001/59558 A1 | 8/2001 |
| WO | 2001/80017 A1 | 10/2001 |
| WO | 2003/083793 A2 | 10/2003 |
| WO | 2004/029862 A1 | 4/2004 |
| WO | 2004/109454 A2 | 12/2004 |
| WO | 2005/008568 A1 | 1/2005 |
| WO | 2005/29636 A2 | 3/2005 |
| WO | 2005/053225 A1 | 6/2005 |
| WO | 2005/106774 A2 | 11/2005 |
| WO | 2005/109829 A1 | 11/2005 |
| WO | 2006/051462 A1 | 5/2006 |
| WO | 2007/000012 A1 | 1/2007 |
| WO | 2007/060102 A1 | 5/2007 |
| WO | 2007/070014 A1 | 6/2007 |
| WO | 2007/072447 A2 | 6/2007 |
| WO | 2007/076210 A1 | 7/2007 |
| WO | 2007/102110 A2 | 9/2007 |
| WO | 2008/008101 A2 | 1/2008 |
| WO | 2010/039337 A2 | 4/2010 |
| WO | 2010/056484 A2 | 5/2010 |
| WO | 2010/128442 A2 | 11/2010 |
| WO | 2012/028773 A1 | 3/2012 |
| WO | 2012/051052 A1 | 4/2012 |
| WO | 2012/083113 A2 | 6/2012 |
| WO | 2012/126078 A1 | 9/2012 |
| WO | 2013/000150 A1 | 1/2013 |
| WO | 2013/023224 A2 | 2/2013 |
| WO | 2013/096943 A1 | 6/2013 |
| WO | 2013/097895 A1 | 7/2013 |
| WO | 2013/132144 A1 | 9/2013 |
| WO | 2013/135270 A1 | 9/2013 |
| WO | 2013/169842 A2 | 11/2013 |
| WO | 2013/173838 A2 | 11/2013 |
| WO | 2013/177548 A1 | 11/2013 |
| WO | 2014/074407 A1 | 5/2014 |
| WO | 2014/078965 A1 | 5/2014 |
| WO | 2014/147297 A1 | 9/2014 |
| WO | 2014/197279 A1 | 12/2014 |
| WO | 2015/009581 A1 | 1/2015 |
| WO | 2015/030912 A1 | 3/2015 |
| WO | 2015/051361 A1 | 4/2015 |

OTHER PUBLICATIONS

Advisory Action received for U.S. Appl. No. 12/207,374, dated Feb. 25, 2013, 3 pages.
Advisory Action received for U.S. Appl. No. 12/207,374, dated May 15, 2014, 3 pages.
Advisory Action received for U.S. Appl. No. 14/311,214, dated Feb. 10, 2015, 4 pages.
Advisory Action received for U.S. Appl. No. 14/503,296, dated Oct. 02, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 141869,877, dated Jan. 5, 2017, 3 pages.
Advisory Action received for U.S. Appl. No. 14/870,793, dated Apr. 13, 2017, 3 pages.
Advisory Action received for U.S. Appl. No. 15/137,944, dated May 11, 2017, 6 pages.
Chan, Christine, "Handoff Your Browser to Your iPhone or iPad! Plus a Chance to Win a Copy!", Apr. 12, 2011, 2 pages.
Corrected Notice of Allowance received for U.S. Appl. No. 15/017,436, dated Sep. 2, 2016, 5 pages.
Decision from Intellectual Property Tribunal received for Korean Patent Application No. 10-2011-7023152, dated Feb. 17, 2015, 22 pages. (7 pages of English Translation and 15 pages of Official Copy).
Decision to Refusal received for Japanese Patent Application No. 2013-145795, dated Mar. 4, 2016, 8 pages (4 pages of English Translation and 4 pages of Official Copy).
Decision to Grant received for European Patent Application No. 04753978.8, dated Apr. 16, 2015, 2 pages.
Decision to Grant received for the European Patent Application No. 12181538.5, dated Jul. 2, 2015, 1 page.
Decision to Refuse received for European Patent Application No. 08834386.8, dated Apr. 8, 2013, 8 pages.
European Search Report received for European Patent Application No. 04753978.8, dated Feb. 22, 2010, 3 pages.
Evaluation Report for Utility Model Patent received for Chinese Patent Application No. 201620051290.7, dated Sep. 19, 2016, 11 pages (6 pages of English translation and 5 pages of Official Copy).
Examination Report received for Australian Patent Application No. 2015202397, dated Feb. 29, 2016, 4 pages.
Examiner Interview Summary received for U.S. Appl. No. 12/732,946, dated Jan. 26, 2015, 4 pages.
Examiner's Pre-Review Report received for Japanese Patent Application No. 2013-098406, dated Oct. 8, 2015, 7 pages (4 pages of English Translation and 3 pages of Official Copy).
Extended European Search Report (includes Partial European Search Report and European Search Opinion) received for European Patent Application No. 13171145.9, dated Feb. 5, 2014, 6 pages.
Extended European Search Report (includes Partial European Search Report and European Search Opinion) received for European Patent Application No. 15168475.0, dated Oct. 21, 2015, 6 pages.

(56) References Cited

OTHER PUBLICATIONS

Extended European Search Report received for European Patent Application No. 12181538.5, dated Oct. 23, 2012, 6 pages.
Extended European Search Report received for European Patent Application No. 14853215.3, dated Sep. 13, 2016, 9 pages.
Extended European Search Report received for European Patent Application No. 16177139.9, dated Nov. 4, 2016, 7 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Final Office Action received for Korean Patent Application No. 10-2014-7004772, dated Oct. 21, 2014, 5 pages (2 pages of English Translation and 3 pages of official copy).
Final Office Action received for U.S. Appl. No. 14/503,327, dated May 18, 2017, 10 pages.
Final Office Action received for U.S. Appl. No. 10/997,291, dated Jan. 2, 2008, 5 pages.
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Final Office Action received for U.S. Appl. No. 12/732,946, dated Oct. 9, 2014, 34 pages.
Final Office Action received for U.S. Appl. No. 13/243,045, dated Aug. 5, 2015, 10 pages.
Final Office Action received for U.S. Appl. No. 14/142,669, dated Jun. 12, 2015, 14 pages.
Final Office Action received for U.S. Appl. No. 14/311,214, dated Jan. 8, 2015, 12 pages.
Final Office Action received for U.S. Appl. No. 14/311,214, dated Sep. 24, 2015, 15 pages.
Final Office Action received for U.S. Appl. No. 14/479,088, dated Mar. 11, 2015, 10 pages.
Final Office Action received for U.S. Appl. No. 14/480,183, dated Jun. 28, 2017, 14 pages.
Final Office Action received for U.S. Appl. No. 14/503,296, dated Jul. 2, 2015, 7 pages.
Final Office Action received for U.S. Appl. No. 14/612,214, dated Dec. 7, 2015, 13 pages.
Final Office Action received for U.S. Appl. No. 14/640,020, dated Jul. 16, 2015, 26 pages.
Final Office Action received for U.S. Appl. No. 14/641,289, dated Jul. 1, 2016, 32 pages.
Final Office Action received for U.S. Appl. No. 14/719,217, dated Feb. 23, 2017, 37 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action received for U.S. Appl. No. 14/869,831, dated Aug. 2, 2016, 14 pages.
Final Office Action received for U.S. Appl. No. 14/869,831, dated May 19, 2017, 20 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 15/137,944, dated Feb. 27, 2017, 10 pages.
Final Office Action received for U.S. Appl. No. 14/870,694, dated Apr. 7, 2017, 16 pages.
Frakes, Dan, "How to Get Started with Airplay", Macworld, May 27, 2013, 8 pages.
G Pad, "LG's Latest Uls That Shine More Lightly on the G-Pad", Online available at: http://bungq.com/1014, Nov. 19, 2013, 38 pages (2 pages of English Translation and 36 pages of Official Copy).
IDEX, "IDEX Fingerprint Sensor Mobile Glass Display", online available at <https://www.youtube.com/watch?v=X1dAIP5sFzw>, Apr. 11, 2013, 2 pages.
Intention to Grant received for European Patent Application No. 04753978.8, dated Dec. 4, 2014, 5 pages.
Intention to Grant received for European Patent Application No. 12181538.5, dated Feb. 20, 2015, 8 pages.
International Preliminary Report on Patentability received for PCT Patent Application No. PCT/US2004/017270, dated Jul. 23, 2013, 3 pages.
International Preliminary Report on Patentability received for PCT Patent Application No. PCT/US2008/075738, dated Jan. 28, 2010, 15 pages.
International Preliminary Report on Patentability received for PCT Patent Application No. PCT/US2014/054800, dated Mar. 31, 2016, 27 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Search Report and Written Opinion received for PCT Application No. PCT/US2015/019309, dated Jun. 25, 2015, 15 pages.
International Search Report and Written Opinion received for PCT Application No. PCT/US2015/033326, dated Aug. 10, 2015, 13 pages.
International Search Report and Written Opinion received for PCT Patent Application No. PCT/US16/34175, dated Oct. 7, 2016, 17 pages.
International Search Report and Written Opinion received for PCT Patent Application No. PCT/US2004/017270, dated Dec. 1, 2004, 6 pages.
International Search Report and Written Opinion received for PCT Patent Application No. PCT/US2008/075738, dated Jul. 2, 2009, 14 pages.
International Search Report and Written Opinion received for PCT Patent Application No. PCT/US2014/054800, dated Jan. 29, 2015, 33 pages.
International Search Report and Written Opinion received for PCT Patent Application No. PCT/US2015/019306, dated Jun. 17, 2015, 15 pages.

(56) References Cited

OTHER PUBLICATIONS

International Search Report and Written Opinion received for PCT Patent Application No. PCT/US2015/019317, dated Aug. 25, 2015, 24 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/031748, dated Jun. 21, 2017, 2 pages.
Invitation to Pay Additional Fees received for PCT Patent Application No. PCT/US16/34175, dated Aug. 11, 2016, 3 pages.
Invitation to Pay Additional Fees received for PCT Patent Application No. PCT/US2014/054800, dated Oct. 31, 2014, 2 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2016/033751, dated Jul. 22, 2016, 2 pages.
IOS Security, "White Paper", Available online at <https://web.archive.org/web/20150526223200/http://www.apple.com/business/docs/iOS_Security_Guide.pdf>, Apr. 2015, 55 pages.
Iphoneblog, "iOS 5.0.1 Security Flaw—Bypass the Passcode—Access Camera Roll", Youtube, available at <https://www.youtube.com/watch?v=qd0Fwgaymb0> iOS 5.0.1 Security Flaw-Bypass the Passcode—Access Camera Roll, Feb. 24, 2012, 2 pages.
Kimura, Ryoji, "Keynote presentation practice guide for iPad & iPhone", K.K. Rutles, first edition, Feb. 29, 2012, 3 pages.
Kinect Gesture Commands—Kinect Voice Commands, Xbox Wire, Aug. 25, 2015, 2 pages.
Naver Blog, "How to Use Smart Wallet and Registered Card", Online Available at <http://feena74.blog.me/140185758401>, Mar. 29, 2013, 11 pages (Official Copy Only) (See Communication under 37 CFR § 1.98(a) (3)).
Non Final Office Action received for U.S. Appl. No. 14/503,327, dated Sep. 12, 2016, 10 pages.
Non Final Office Action received for U.S. Appl. No. 14/869,715, dated Jan. 29, 2016, 62 pages.
Non Final Office Action received for U.S. Appl. No. 12/207,374, dated Apr. 15, 2011, 13 pages.
Non Final Office Action received for U.S. Appl. No. 12/207,374, dated May 24, 2012, 20 pages.
Non Final Office Action received for U.S. Appl. No. 14/311,214, dated Apr. 10, 2015, 12 pages.
Non Final Office Action received for U.S. Appl. No. 14/503,296, dated Jan. 30, 2015, 16 pages.
Non Final Office Action received for U.S. Appl. No. 14/641,289, dated Jul. 16, 2015, 31 pages.
Non Final Office Action received for U.S. Appl. No. 14/869,877, dated Jan. 29, 2016, 18 pages.
Non Final Office Action received for U.S. Appl. No. 14/869,877, dated Jun. 16, 2017, 17 pages.
Non Final Office Action received for U.S. Appl. No. 14/870,793, dated Apr. 19, 2016, 17 pages.
Non Final Office Action received for U.S. Appl. No. 14/503,364, dated Feb. 3, 2016, 16 pages.
Non Final Office Action received for U.S. Appl. No. 14/869,831, dated Jan. 29, 2016, 18 pages.
Non-Final Office Action received for U.S. Appl. No. 10/858,290, dated Nov. 24, 2004, 10 pages.
Non-Final Office Action received for U.S. Appl. No. 10/997,291, dated Jul. 28, 2005, 6 pages.
Non-Final Office Action received for U.S. Appl. No. 12/201,568, dated Oct. 2, 2008, 6 pages.
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, 17 pages.
Non-Final Office Action received for U.S. Appl. No. 12/207,374, dated Jun. 7, 2013, 22 pages.
Non-Final Office Action received for U.S. Appl. No. 12/430,702, dated Jun. 24, 2009, 6 pages.
Non-Final Office Action received for U.S. Appl. No. 12/732,946, dated Oct. 17, 2013, 25 pages.
Non-Final Office Action received for U.S. Appl. No. 13/243,045, dated Mar. 17, 2015, 9 pages.
Non-Final Office Action received for U.S. Appl. No. 13/243,326, dated Feb. 14, 2013, 13 pages.
Non-Final Office Action received for U.S. Appl. No. 14/142,669, dated Oct. 28, 2015, 14 pages.
Non-Final Office Action received for U.S. Appl. No. 14/142,669, dated Sep. 12, 2014, 11 pages.
Non-Final Office Action received for U.S. Appl. No. 14/311,214, dated Sep. 18, 2014, 10 pages.
Non-Final Office Action received for U.S. Appl. No. 14/479,088, dated Jul. 6, 2015, 19 pages.
Non-Final Office Action received for U.S. Appl. No. 14/479,088, dated Nov. 18, 2014, 8 pages.
Non-Final Office Action received for U.S. Appl. No. 14/480,183, dated Oct. 18, 2016, 12 pages.
Non-Final Office Action received for U.S. Appl. No. 14/503,296, dated Oct. 5, 2016, 11 pages.
Non-Final Office Action received for U.S. Appl. No. 14/503,381, dated May 13, 2015, 13 pages.
Non-Final Office Action received for U.S. Appl. No. 14/612,214, dated Jul. 29, 2015, 12 pages.
Non-Final Office Action received for U.S. Appl. No. 14/640,020, dated Apr. 29, 2015, 18 pages.
Non-Final Office Action received for U.S. Appl. No. 14/641,289, dated Mar. 11, 2016, 26 pages.
Non-Final Office Action received for U.S. Appl. No. 14/641,298, dated Mar. 6, 2017, 26 pages.
Non-Final Office Action received for U.S. Appl. No. 14/719,217, dated Jul. 28, 2016, 28 pages.
Non-Final Office Action received for U.S. Appl. No. 14/869,715, dated Oct. 11, 2016, 37 pages.
Non-Final Office Action received for U.S. Appl. No. 14/870,726, dated Sep. 16, 2016, 12 pages.
Non-Final Office Action Received for U.S. Appl. No. 14/871,635, dated May 5, 2017, 23 pages.
Non-Final Office Action Received for U.S. Appl. No. 14/871,654, dated May 4, 2017, 23 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/470,752, dated Jul. 28, 2017, 11 pages.
Non-Final Office Action received for U.S. Appl. No. 14/870,694, dated Sep. 23, 2016, 13 pages.
Notice of Acceptance received for Australian Patent Application No. 2008305338, dated Oct. 27, 2011, 1 page.
Notice of Acceptance received for Australian Patent Application No. 2015201884, dated Oct. 4, 2016, 3 pages.

(56) References Cited

OTHER PUBLICATIONS

Notice of Allowance received for Australian Patent Application No. 2015202397, dated Feb. 15, 2017, 3 pages.
Notice of Allowance received for Canadian Patent Application No. 2,527,829, dated Feb. 1, 2016, 1 page.
Notice of Allowance received for Chinese Patent Application No. 200880108306.1, dated Oct. 28, 2014, 2 pages (Official Copy only) (See Communication under 37 CFR § 1.98(a) (3)).
Notice of Allowance received for Chinese Patent Application No. 201520357381.9, dated Jul. 29, 2015, 4 pages (2 pages of English Translation and 2 pages of Official Copy).
Notice of Allowance received for Chinese Patent Application No. 201520358683.8, issued on Mar. 10, 2016, 5 pages (3 pages of English Translation and 2 pages of Official Copy).
Notice of Allowance received for Chinese Patent Application No. 201520364847.8, dated Nov. 5, 2015, 9 pages (7 pages of English Translation and 2 pages of Official Copy).
Notice of Allowance received for Chinese Patent Application No. 201620051290.7, dated Jun. 22, 2016, 2 pages (Official Copy only) (See Communication under 37 CFR § 1.98(a) (3)).
Notice of Allowance received for Chinese Patent Application No. 201620480708.6, dated Apr. 20, 2017, 3 pages (2 pages of English translation and 1 page of Official Copy).
Notice of Allowance received for Chinese Patent Application No. 201620480846.4, dated Apr. 20, 2017, 3 pages (2 pages of English Translation and 1 page of Official Copy).
Notice of Allowance received for Japanese Patent Application No. 2006-533547, dated May 15, 2015, 2 pages (Official Copy only) (See Communication under 37 CFR § 1.98(a) (3)).
Notice of Allowance received for Japanese Patent Application No. 2013-098406, dated Jan. 23, 2017., 18 Pages. (Official Copy only) (See Communication under 37 CFR § 1.98(a) (3)).
Notice of Allowance received for Japanese Patent Application No. 2015-083696, dated Jan. 6, 2017, 3 pages (Official Copy Only) (See Communication under 37 CFR § 1.98(a) (3)).
Notice of Allowance received for Japanese Patent Application No. 2015-095183, dated Apr. 21, 2017, 3 pages (Official Copy Only) (See Communication under 37 CFR § 1.98(a) (3)).
Notice of Allowance received for Japanese Patent Application No. 2016-224508, dated Jun. 20, 2017, 3 pages (Official Copy only) (See Communication under 37 CFR § 1.98(a) (3)).
Notice of Allowance received for Japanese Patent Application No. 2017-013383, dated Mar. 31, 2017, 3 pages (Official Copy Only) (See Communication under 37 CFR § 1.98(a) (3)).
Notice of Allowance received for Korean Patent Application No. 10-20107008899, dated Feb. 12, 2016, 3 pages (1 page of English Translation and 2 pages of official copy).
Notice of Allowance received for Korean Patent Application No. 10-20147004771, dated Oct. 29, 2015, 3 pages (1 page of English Translation and 2 pages of Official Copy).
Notice of Allowance received for Korean Patent Application No. 10-20147004772, dated Feb. 12, 2016, 4 pages (1 page of English Translation and 3 pages of Official Copy).
Notice of Allowance received for Korean Patent Application No. 10-20147004773, dated Jan. 7, 2016, 3 pages (1 page English Translation and 2 pages of Official Copy).
Notice of Allowance received for Korean Patent Application No. 10-20147025441, issued on Feb. 26, 2016, 3 pages (1 page English Translation and 2 pages of Official Copy).
Notice of Allowance received for Korean Patent Application No. 10-20157004548, issued on Feb. 26, 2016, 3 pages (1 page English Translation and 2 pages of Official Copy).
Notice of Allowance received for Taiwan Patent Application No. 097134592, dated Aug. 12, 2014, 3 pages (Official Copy only) (See Communication under 37 CFR § 1.98(a) (3)).
Notice of Allowance received for Taiwan Patent Application No. 101107082, dated Oct. 22, 2014, 2 pages (Official Copy only) (See Communication under 37 CFR § 1.98(a) (3)).
Notice of Allowance received for Taiwanese Patent Application No. 103131074, dated Nov. 17, 2015, 3 pages (Official Copy only) (See Communication under 37 CFR § 1.98(a) (3)).
Notice of Allowance received for Taiwanese Patent Application No. 104108223, dated Jan. 10, 2017, 3 pages (Official Copy Only) (See Communication under 37 CFR § 1.98(a) (3)).
Notice of Allowance Received for Taiwanese Patent Application No. 104117041, dated Feb. 24, 2017, 3 pages. (Official Copy Only) (See Communication under 37 CFR § 1.98(a) (3)).
Notice of Allowance received for U.S. Appl. No. 14/142,661, dated Aug. 3, 2015, 10 pages.
Notice of Allowance received for U.S. Appl. No. 14/479,088, dated Nov. 12, 2015, 7 pages.
Notice of Allowance received for U.S. Appl. No. 10/997,291, dated Jun. 27, 2008, 16 pages.
Notice of Allowance received for U.S. Appl. No. 12/201,568, dated Dec. 17, 2008, 6 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Notice of Allowance received for U.S. Appl. No. 12/430,702, dated Nov. 16, 2009, 6 pages.
Notice of Allowance received for U.S. Appl. No. 12/604,814, dated Apr. 26, 2010, 4 pages.
Notice of Allowance received for No. 12/604,814, dated Aug. 5, 2010, 4 pages.
Notice of Allowance received for No. 12/604,814, dated Nov. 12, 2010, 4 pages.
Notice of Allowance received for No. 13/243,326, dated Sep. 23, 2013, 11 pages.
Notice of Allowance received for No. 14/142,657, dated Jan. 8, 2015, 5 pages.
Notice of Allowance received for No. 14/142,657, dated Jul. 23, 2015, 2 pages.
Notice of Allowance received for No. 14/142,657, dated Jun. 29, 2015, 7 pages.
Notice of Allowance received for No. 14/142,657, dated Sep. 10, 2014, 9 pages.
Notice of Allowance received for U.S. Appl. No. 14/142,661, dated Sep. 28, 2015, 9 pages.
Notice of Allowance received for U.S. Appl. No. 14/142,669, dated Aug. 25, 2016, 2 pages.
Notice of Allowance received for U.S. Appl. No. 14/142,669, dated Jun. 14, 2016, 5 pages.
Notice of Allowance received for U.S. Appl. No. 14/142,669, dated Sep. 21, 2016, 2 pages.
Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Notice of Allowance received for U.S. Appl. No. 14/311,214, dated Jan. 21, 2016, 7 pages.
Notice of Allowance received for U.S. Appl. No. 14/479,088, dated Dec. 23, 2015, 5 pages.
Notice of Allowance received for U.S. Appl. No. 14/479,088, dated Jan. 11, 2016, 2 pages.
Notice of Allowance received for U.S. Appl. No. 14/479,088, dated Mar. 9, 2016, 2 pages.
Notice of Allowance received for U.S. Appl. No. 14/503,364, dated Jun. 16, 2016, 11 pages.
Notice of Allowance received for U.S. Appl. No. 14/640,020, dated Dec. 15, 2015, 7 pages.
Notice of Allowance received for U.S. Appl. No. 14/661,796, dated Jul. 7, 2015, 10 pages.

(56) References Cited

OTHER PUBLICATIONS

Notice of Allowance received for U.S. Appl. No. 14/661,796, dated Jul. 23, 2015, 2 pages.
Notice of Allowance received for U.S. Appl. No. 14/873,023, dated Jan. 14, 2016, 2 pages.
Notice of allowance received for U.S. Appl. No. 15/017,436, dated May 27, 2016, 17 pages.
Notice of Allowance received for U.S. Appl. No. 14/142,661, dated Dec. 3, 2015, 2 pages.
Notice of Allowance received for U.S. Appl. No. 14/873,023, dated Dec. 23, 2015, 10 pages.
Notice of Allowance received for U.S. Appl. No. 14/503,381, dated Dec. 16, 2015, 8 pages.
Notice of Final Rejection received for Korean Patent Application No. 10-20147004773, dated Jun. 12, 2015, 6 pages (3 pages English Translation and 3 pages of Official Copy).
Notice of Preliminary Rejection received for Korean Patent Application No. 102014-7025441, dated Jun. 12, 2015, 9 pages (4 pages of English Translation and 5 pages of Official Copy).
Notice of Preliminary Rejection received for Korean Patent Application No. 102015-7004548, dated Jun. 12, 2015, 8 pages (4 pages of English Translation and 4 pages of Official Copy).
Notice of Preliminary Rejection received from Korean Patent Application No. 102015-7010262, dated Jun. 12, 2015, 5 pages (2 pages of English Translation and 3 pages of Official Copy only).
Office Action received for Australian Patent Application No. 2015201884, dated Oct. 12, 2015, 4 pages.
Office Action received for Australian Patent Application No. 2008305338, dated Mar. 21, 2011, 3 pages.
Office Action received for Australian Patent Application No. 2008305338, dated Oct. 19, 2010, 3 pages.
Office Action received for Australian Patent Application No. 2012200716, dated Jul. 16, 2014, 4 pages.
Office Action received for Australian Patent Application No. 2012200716, dated Nov. 15, 2013, 3 pages.
Office Action received for Australian Patent Application No. 2014204462, dated May 8, 2015, 4 pages.
Office Action received for Australian Patent Application No. 2014204462, dated Apr. 29, 2016, 3 pages.
Office Action received for Australian Patent Application No. 2014334869, dated Jan. 11, 2017, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2015267671, dated Apr. 5, 2017, 2 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2016201310, dated Feb. 28, 2017, 3 pages.
Office Action received for Australian Patent Application No. 2016203896, dated Mar. 6, 2017, 3 pages.
Office Action received for Australian Patent Application No. 2016203898, dated Feb. 17, 2017, 3 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100328, dated May 16, 2017, 3 pages.
Office Action received for Australian Patent Application No. 2017100553, dated Aug. 4, 2017, 5 pages.
Office Action received for Australian Patent Application No. 2017201064, dated Mar. 9, 2017, 2 pages.
Office Action received for Australian Patent Application No. 2017201068, dated Mar. 10, 2017, 2 pages.
Office Action received for Canadian Patent Application No. 2,527,829, dated Apr. 16, 2014, 3 pages.
Office Action received for Canadian Patent Application No. 2,527,829, dated Apr. 29, 2013, 3 pages.
Office Action received for Canadian Patent Application No. 2,527,829, dated Apr. 29, 2015, 6 pages.
Office Action received for Canadian Patent Application No. 2,527,829, dated Jun. 1, 2011, 3 pages.
Office Action received for Canadian Patent Application No. 2,527,829, dated May 7, 2012, 4 pages.
Office Action received for Chinese Patent Application No. 200880108306.1, dated Aug. 24, 2011, 10 pages (English Translation only).
Office Action received for Chinese Patent Application No. 200880108306.1, dated Mar. 20, 2012, 8 pages (English Translation only).
Office Action received for Chinese Patent Application No. 200880108306.1, dated Mar. 27, 2014, 6 pages (3 pages of English Translation and 3 pages of Official Copy).
Office Action received for Chinese Patent Application No. 201410407626.4, dated Oct. 31, 2016, 10 pages (4 pages of English Translation and 6 pages of Official Copy).
Office Action received for Chinese Patent Application No. 201520358683.8, dated Sep. 2, 2015, 4 pages (2 pages of English Translation and 2 pages of Official Copy).
Office Action received for Chinese Patent Application No. 201620101636.X, dated May 25, 2016, 3 pages (1 page of English Translation and 2 pages of Official Copy).
Office Action received for Chinese Patent Application No. 201620101636.X, dated Oct. 13, 2016, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).
Office Action received for Chinese Patent Application No. 201620480708.6, dated Sep. 14, 2016, 3 pages (1 page of English Translation and 2 pages of Official Copy).
Office Action received for Chinese Patent Application No. 201620480846.4, dated Jan. 9, 2017, 3 pages (1 page of English Translation and 2 pages of Official Copy).
Office Action received for Chinese Patent Application No. 201620480846.4, dated Sep. 14, 2016, 3 pages (1 page of English Translation and 2 pages of Official Copy).

(56) References Cited

OTHER PUBLICATIONS

Office Action received for Chinese Patent Application No. 201620509362.8, dated Feb. 10, 2017, 2 pages (Official Copy only) (See Communication under 37 CFR § 1.98(a) (3)).
Office Action received for Chinese Patent Application No. 201620509362.8, dated Oct. 21, 2016, 3 pages (1 page of English Translation and 2 pages of Official Copy).
Office Action received for Chinese Patent Application No. 201620509515.9, dated Nov. 9, 2016, 2 page (1 page of English Translation and 1 page of Official Copy).
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670628, dated Oct. 26, 2016, 7 pages.
Office Action Received for Danish Patent Application No. PA201670709, dated Jul. 21, 2017, 4 pages.
Office Action Received for Danish Patent Application No. PA201670709, dated Nov. 30, 2016, 10 pages.
Office Action received for Danish Patent Application No. PA201670710, dated Dec. 8, 2016, 10 pages.
Office Action received for Danish Patent Application No. PA201670749, dated Jan. 30, 2017, 11 pages.
Office Action received for Danish Patent Application No. PA201670751, dated Jan. 13, 2017, 9 pages.
Office Action received for Danish Patent Application No. PA201770292, dated Jun. 6, 2017, 7 pages.
Office Action received for Danish Patent Application PA201570256, dated Oct. 10, 2016, 3 pages.
Office Action received for Denmark Patent Application No. 201570256, dated Jul. 7, 2015, 2 pages (English Translation only).
Office Action received for European Patent Application No. 04753978.8, dated Jan. 31, 2013, 6 pages.
Office Action received for European Patent Application No. 04753978.8, dated Mar. 27, 2012, 7 pages.
Office Action received for European Patent Application No. 08834386.8, dated Aug. 23, 2010, 4 pages.
Office Action received for European Patent Application No. 12181538.5, dated Dec. 16, 2013, 4 pages.
Office Action Received for European Patent Application No. 13171145.9, dated Apr. 28, 2016, 5 pages.
Office Action received for European Patent Application No. 15168475.0, dated Dec. 19, 2016, 5 pages.
Office Action received for German Patent Application No. 2020150042678, dated Nov. 4, 2015, 5 pages (3 pages of English Translation and 2 pages of Official Copy).
Office Action received for Hong Kong Patent Application No. 151051633, dated Jun. 5, 2015, 11 pages (Official Copy Only) (See Communication under 37 CFR § 1.98(a) (3)).
Office Action received for Japanese Patent Application No. 2006-533547, dated Aug. 14, 2008, 1 page (English Translation only).
Office Action received for Japanese Patent Application No. 2006-533547, dated Mar. 22, 2011, 2 pages (English Translation Only).
Office Action received for Japanese Patent Application No. 2006-533547, dated Mar. 5, 2012, 13 pages (Official Copy only) (See Communication under 37 CFR § 1.98(a) (3)).
Office Action received for Japanese Patent Application No. 2010-525891, dated Jun. 12, 2012, 11 pages (5 pages of English Translation and 6 pages of Official Copy).
Office Action received for Japanese Patent Application No. 2013-098406, dated Dec. 09, 2013, 12 pages (6 pages of English Translation and 6 pages of Official Copy).
Office Action received for Japanese Patent Application No. 2013-098406, dated Dec. 15, 2014, 12 pages (7 pages of English Translation and 5 pages of Official Copy).
Office Action received for Japanese Patent Application No. 2013-098406, dated Jul. 19, 2016, 10 pages (5 pages of English Translation and 5 pages of Official Copy).
Office Action received for Japanese Patent Application No. 2013-098406, dated May 8, 2015, 14 pages (9 pages of English Translation and 5 pages of Official Copy).
Office Action received for Japanese Patent Application No. 2013-145795, dated Apr. 14, 2017, 18 pages (3 pages of English Translation and 15 pages of Official Copy).
Office Action received for Japanese Patent Application No. 2013-145795, dated Jun. 13, 2014, 6 pages (3 pages of English Translation and 3 pages of Official copy).
Office Action received for Japanese Patent Application No. 2014-242264, dated Feb. 24, 2017, 14 pages (7 pages of English Translation and 7 pages of Official Copy).
Office Action received for Japanese Patent Application No. 2014-242264, dated Jul. 17, 2015, 6 pages (3 pages English Translation and 3 pages of Official Copy).
Office Action received for Japanese Patent Application No. 2014-242264, dated May 9, 2016, 10 pages (5 pages of English Translation and 5 pages of Official Copy).
Office Action received for Japanese Patent Application No. 2015-083696, dated Jun. 17, 2016, 12 pages (7 pages of English Translation and 5 pages of Official Copy).
Office Action received for Japanese Patent Application No. 2015-095183, dated Jun. 3, 2016, 13 pages (6 pages of English Translation and 7 pages of Official copy).
Office Action received for Japanese Patent Application No. 2016-224507, dated Jun. 16, 2017, 16 pages (8 pages of English Translation and 8 pages of Official Copy).
Office Action received for Japanese Patent Application No. 2016-540927, dated Jun. 20, 2017, 12 pages (7 pages of English Translation and 5 pages of Official Copy).
Office Action received for Korean Patent Application No. 10-2017-0022365, dated Jun. 26, 2017, 10 pages (4 pages of English Translation and 6 pages of Official Copy).
Office Action received for Korean Patent Application No. 10-2010-7008899, dated Aug. 17, 2014, 7 pages (3 pages of English Translation and 4 pages of Official copy).
Office Action received for Korean Patent Application No. 10-2010-7008899, dated Feb. 3, 2015, 7 pages (3 pages of English Translation and 4 pages of Official Copy).
Office Action received for Korean Patent Application No. 10-2010-7008899, dated Jan. 28, 2013, 5 pages (2 pages of English Translation and 3 pages of Official Copy).
Office Action received for Korean Patent Application No. 10-2010-7008899, dated Jun. 12, 2015, 4 pages (2 pages of English Translation and 2 pages of Official Copy).
Office Action received for Korean Patent Application No. 10-2010-7008899, dated Mar. 29, 2012, 6 pages (2 pages of English Translation and 4 pages of Official Copy).
Office Action received for Korean Patent Application No. 10-2010-7008899, dated May 30, 2011, 4 pages (2 pages of English Translation and 2 pages of Official copy).
Office Action received for Korean Patent Application No. 10-2011-7023152, dated Apr. 22, 2014, 6 pages (3 pages of English Translation and 3 pages of Official Copy).
Office Action received for Korean Patent Application No. 10-2014-7004771, dated Jun. 12, 2015, 6 pages (3 pages English Translation and 3 pages of Official Copy only).
Office Action received for Korean Patent Application No. 10-2014-7004771, dated Apr. 22, 2014, 5 pages (2 pages of English Translation and 3 pages of Official copy).
Office Action received for Korean Patent Application No. 10-2014-7004771, dated Oct. 21, 2014, 7 pages (3 pages of English Translation and 4 pages of Official copy).

(56) References Cited

OTHER PUBLICATIONS

Office Action received for Korean Patent Application No. 10-2014-7004772, dated Apr. 22, 2014, 8 pages (3 pages of English translation and 5 pages of Official Copy).
Office Action received for Korean Patent Application No. 10-2014-7004773, dated Apr. 22, 2014, 9 pages (4 pages of English Translation and 5 pages of Office Action).
Office Action received for Korean Patent Application No. 10-2014-7004773, dated Oct. 21, 2014, 9 pages (4 pages of English Translation and 5 pages of Official Copy).
Office Action received for Korean Patent Application No. 10-2014-7025441, dated Oct. 21, 2014, 5 pages (2 pages of English Translation and 3 pages of official copy).
Office Action received for Korean Patent Application No. 10-2015-0072162, dated Apr. 20, 2016, 11 pages.
Office Action received for Korean Patent Application No. 10-2015-0072162, dated Feb. 27, 2017, 12 pages (6 pages of English Translation and 6 pages of Official Copy).
Office Action received for Korean Patent Application No. 10-2015-7010262, dated Mar. 8, 2017, 6 pages (3 pages of English Translation and 3 pages of Official Copy).
Office Action received for Korean Patent Application No. 10-2015-7010262, dated May 24, 2016, 10 pages (3 pages of English Translation and 7 pages of Official Copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2017-7015582, dated Jun. 12, 2017, 9 pages (4 pages of English Translation and 5 pages of Official copy).
Office Action received for Korean Patent Application No. 10-2016-7009347, dated Mar. 9, 2017, 15 pages (7 pages of English Translation and 8 pages of Official Copy).
Office Action received for Taiwan Patent Application No. 103136545, dated May 25, 2016, 7 pages (3 pages of English Translation and 4 pages of Official Copy).
Office Action received for Taiwan Patent Application No. 101107082, dated Jul. 7, 2014, 21 pages (7 pages of English Translation and 14 pages of Official Copy).
Office Action received for Taiwan Patent Application No. 103131074, dated Jul. 21, 2015, 16 pages (7 pages of English Translation and 9 pages of Official Copy).
Office Action received for Taiwan Patent Application No. 103136545, dated Nov. 2, 2015, 39 pages (15 pages of English Translation and 24 pages of Official Copy).
Office Action received for Taiwanese Patent Application No. 104108223, dated Apr. 25, 2016, 10 pages (5 pages of English Translation and 5 pages of Official copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action Received for Taiwanese Patent Application No. 104117041, dated Aug. 22, 2016, 6 pages (3 pages of English Translation and 3 pages of Official Copy).
Office Action received for Taiwanese Patent Application No. 104117042, dated Apr. 20, 2017, 18 pages (7 pages of English Translation and 11 pages of Official Copy).
Office Action received for Taiwanese Patent Application No. 104117508, dated Jul. 14, 2017, 9 pages (4 pages of English Translation and 5 pages of Official Copy).
Office Action received for Taiwanese Patent Application No. 104117508, dated Jul. 20, 2016, 19 pages (8 pages of English Translation and 11 pages of Official Copy).
Office Action received for Taiwanese Patent Application No. 104117508, dated Mar. 20, 2017, 22 pages (9 pages of English Translation and 13 pages of Official Copy).
Office Action received from Japanese Patent Application No. 2013-145795, dated May 8, 2015, 12 pages (7 pages of English Translation and 5 pages of Official copy).
PHONE4U, "iPhone 4S Tips 'N' Tricks: Access the Camera from the Lock Screen—Phones 4u." Youtube, available at <https://www.youtube.com/watch?v=C8eDN4Vu2mg>, Dec. 9, 2011, 2 pages.
Plaisant et al., "Touchscreen Toggle Switches: Push or slide? Design Issues and Usability Study", Technical Report CAR-TR-521, CS-TR-2557, Nov. 1990, pp. 1-10.
"Qpair", online available at: http://mongri.net/entry/G-Pad-83-0pair, 22 pages (10 pages of English translation and 12 pages of Official Copy).
Riley et al., "Instruction, Feedback and Biometrics: The User Interface for Fingreprint Authentication System", Interact 2009, Part II, LNCS 5727, IFPI International Federation for Information Processing, 2009, pp. 293-305.
Search Report received for Netherlands Patent Application No. 2014737, dated Oct. 29, 2015, 9 pages.
Shankland, Stephen, "Chrome OS Gets 'OK Google' Voice Search Control", available online at <http://www.cnet.com/news/chrome-os-gets-ok-google-voice-search-control/>, May 21, 2014, 4 pages.
Summons to Attend Oral Proceedings received for European Patent Application No. 04753978.8, datred Jul. 3, 2014, 8 pages.
Summons to Attend Oral Proceedings received for European Patent Application No. 08834386.8, dated Aug. 24, 2012, 4 pages.
Supplemental Notice of Allowance received for U.S. Appl. No. 12/207,370, dated Aug. 8, 2013, 2 pages.
Tanaka, et al., "Innovative Mobile Device of Apple Finally Appeared, Mobile Phone + iPod + Internet Terminal", iPhone, Mac Fan, vol. 15, No. 9, Japan, Mainichi Communications Inc. Innovative Mobile Device of Apple Finally Appeared, Mobile Phone + iPod + Internet Terminal, iPhone, pp. 4-13 (Official Language only) (See Communication under 37 CFR § 1.98(a) (3)).
Third Party Observations received for European Patent Application No. 15168475.0, dated Jul. 19, 2016, 4 pages.
Videoreborn, "Motorola Atrix 4G: Wet Fingerprint Scanner Better Than iPhone 5S Finger Print Scanner!", Youtube, available at <https://www.youtube.com/watch?v=MSJIIG93MPg>, Mar. 16, 2011, 2 pages.
International Search Report and Written Opinion received for PCT Patent Application No. PCT/US2016/017032, dated May 4, 2016, 11 pages.
Non-Final Office Action received for U.S. Appl. No. 14/869,974, dated Jul. 28, 2017, 17 pages.
Intention to Grant received for Danish Patent Application No. PA201670628, dated Aug. 28, 2017, 2 pages.
International Search Report and Written Opinion received for PCT Patent Application No. PCT/US2017/032240, dated Sep. 21, 2017, 33 pages.

\* cited by examiner

USER INTERFACE FOR A DEVICE REQUESTING REMOTE AUTHORIZATION

CROSS-REFERENCE TO RELATED APPLICATIONS

This application claims priority to U.S. Provisional Patent No. 62/338,994, titled "REMOTE AUTHORIZATION TO PROCEED WITH AN ACTION," filed May 19, 2016, and U.S. Provisional Patent No. 62/347,852, titled "REMOTE AUTHORIZATION TO PROCEED WITH AN ACTION," filed Jun. 9, 2016, the contents of which are hereby incorporated by reference in their entirety.

FIELD

The present disclosure relates generally to computer user interfaces, and more specifically to techniques for managing a remote authorization to proceed with an action.

BACKGROUND

The use of electronic devices for storing and displaying secure information has increased significantly in recent years, such as in the use of devices for two-factor authentication. For example, a device may store a secure value. By securely storing the value at the device, the device provides the user with a certain level of security. The value is subsequently displayed on a display of the device, and the user may use the displayed value for performing various tasks using the device.

BRIEF SUMMARY

Some techniques for managing a remote authorization to proceed with an action using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present techniques provide electronic devices with faster, more efficient methods and interfaces for managing a remote authorization to proceed with an action. Such methods and interfaces optionally complement or replace other methods for managing a remote authorization to proceed with an action. Such methods and interfaces reduce the cognitive burden on a user and produce a more efficient human-machine interface. For battery-operated computing devices, such methods and interfaces conserve power and increase the time between battery charges. In some embodiments of the present technique, the technique permits a user to take advantage of the hardware capabilities of a first device while using (or performing tasks on) a second device (e.g., where the second device does not have the same hardware capabilities of the first device). In some embodiments of the present technique, the present technique enables a parent to remotely authorize an action using a first device, where the action was requested (or initiated) by the parent's child using a second device (e.g., regardless of the hardware capabilities of the second device). In some embodiments of the present technique, the techniques helps to maintain a certain level of security by avoiding the need to distribute secure data to systems that do not meet certain security standards (e.g., avoiding the need to generate or store secure information on a system that does not have a secure element).

In accordance with some embodiments, a method is described. The method comprises: receiving, at a requesting device with a display, selection of one or more options; receiving, at the requesting device, selection of an option to proceed with an action associated with the selected one or more options; transmitting, by the requesting device, a request to proceed with the action, wherein the request includes information about the selected one or more options; receiving, by an authenticating device with a display, the request to proceed with the action; concurrently displaying, on the display of the authenticating device: an indication of the request to proceed with the action, the information about the selected one or more options, and an indication of the requesting device; displaying, on the display of the authenticating device, a request for authorization to proceed with the action; receiving, at the authenticating device, an input that is responsive to the request for authorization to proceed with the action; transmitting, by the authenticating device, a response to the request to proceed with the action, the response to the request to proceed with the action based on the input that is responsive to the request for authorization to proceed with the action; receiving, by the requesting device, the response to the request to proceed with the action; in accordance with a determination, at the requesting device, that the response to the request to proceed with the action indicates that the authorization at the authenticating device was successful, displaying, on the display of the requesting device, an indication that the authorization was successful; and in accordance with a determination, at the requesting device, that the response to the request to proceed with the action indicates that the authorization at the authenticating device was not successful, displaying, on the display of the requesting device, an indication that the authorization was not successful.

In accordance with some embodiments, a method performed at a requesting device with a display is described. The method comprises: receiving selection of one or more options associated with an action; receiving selection of an option to proceed with the action associated with the selected one or more options; transmitting, by the requesting device to an authenticating device, a request to proceed with the action, wherein the request includes information about the selected one or more options, the information about the selected one or more options for display by the authenticating device; receiving, from the authenticating device, a response to the request to proceed with the action, wherein the response to the request to proceed with the action is indicative of an input at the authenticating device; and in accordance with a determination that the response to the request to proceed with the action indicates that an authorization at the authenticating device was successful, displaying, on the display of the requesting device, an indication that the authorization was successful.

In accordance with some embodiments, a requesting device is described. The requesting device includes: a display; one or more processors; and memory storing one or more programs, wherein the one or more programs are configured to be executed by the one or more processors, the one or more programs including instructions for: receiving selection of one or more options associated with an action; receiving selection of an option to proceed with the action associated with the selected one or more options; transmitting, by the requesting device to an authenticating device, a request to proceed with the action, wherein the request includes information about the selected one or more options, the information about the selected one or more options for display by the authenticating device; receiving, from the authenticating device, a response to the request to proceed with the action, wherein the response to the request to proceed with the action is indicative of an input at the authenticating device; and in accordance with a determination that the response to the request to proceed with the action indicates that an authorization at the authenticating device was successful, displaying, on the display of the requesting device, an indication that the authorization was successful.

In accordance with some embodiments, a non-transitory computer-readable storage medium is described. The non-transitory computer-readable storage medium stores one or more programs that are executable by one or more processors of a requesting device with a display, the one or more programs including instructions for: receiving selection of one or more options associated with an action; receiving selection of an option to proceed with the action associated with the selected one or more options; transmitting, by the requesting device to an authenticating device, a request to proceed with the action, wherein the request includes information about the selected one or more options, the information about the selected one or more options for display by the authenticating device; receiving, from the authenticating device, a response to the request to proceed with the action, wherein the response to the request to proceed with the action is indicative of an input at the authenticating device; and in accordance with a determination that the response to the request to proceed with the action indicates that an authorization at the authenticating device was successful, displaying, on the display of the requesting device, an indication that the authorization was successful.

In accordance with some embodiments, a transitory computer-readable storage medium is described. The non-transitory computer-readable storage medium stores one or more programs that are executable by one or more processors of a requesting device with a display, the one or more programs including instructions for: receiving selection of one or more options associated with an action; receiving selection of an option to proceed with the action associated with the selected one or more options; transmitting, by the requesting device to an authenticating device, a request to proceed with the action, wherein the request includes information about the selected one or more options, the information about the selected one or more options for display by the authenticating device; receiving, from the authenticating device, a response to the request to proceed with the action, wherein the response to the request to proceed with the action is indicative of an input at the authenticating device; and in accordance with a determination that the response to the request to proceed with the action indicates that an authorization at the authenticating device was successful, displaying, on the display of the requesting device, an indication that the authorization was successful.

In accordance with some embodiments, a requesting device is described. The requesting device includes: a display; means for receiving selection of one or more options associated with an action; means for receiving selection of an option to proceed with the action associated with the selected one or more options; means for transmitting, by the requesting device to an authenticating device, a request to proceed with the action, wherein the request includes information about the selected one or more options, the information about the selected one or more options for display by the authenticating device; means for receiving, from the authenticating device, a response to the request to proceed with the action, wherein the response to the request to proceed with the action is indicative of an input at the authenticating device; and means for in accordance with a determination that the response to the request to proceed with the action indicates that an authorization at the authenticating device was successful, displaying, on the display of the requesting device, an indication that the authorization was successful.

In accordance with some embodiments, a method performed at an authenticating device with a display is described. The method comprising: receiving, from a requesting device, a request to proceed with an action, wherein the request includes information regarding the action and wherein the requesting device and the authenticating device are both signed into a service using the same account; concurrently displaying, on the display: an indication of the request to proceed with the action, the information regarding the action, and an indication of the requesting device; displaying a request for authorization to proceed with the action; and receiving an input that is responsive to the request for authorization to proceed with the action.

In accordance with some embodiments, an authenticating device is described. The authenticating device includes: a display; one or more processors; and memory storing one or more programs, wherein the one or more programs are configured to be executed by the one or more processors, the one or more programs including instructions for: receiving, from a requesting device, a request to proceed with an action, wherein the request includes information regarding the action and wherein the requesting device and the authenticating device are both signed into a service using the same account; concurrently displaying, on the display: an indication of the request to proceed with the action, the information regarding the action, and an indication of the requesting device; displaying a request for authorization to proceed with the action; and receiving an input that is responsive to the request for authorization to proceed with the action.

In accordance with some embodiments, a non-transitory computer-readable storage medium is described. The non-transitory computer-readable storage medium stores one or more programs that are executable by one or more processors of an authenticating device with a display, the one or more programs including instructions for: receiving, from a requesting device, a request to proceed with an action, wherein the request includes information regarding the action and wherein the requesting device and the authenticating device are both signed into a service using the same account; concurrently displaying, on the display: an indication of the request to proceed with the action, the information regarding the action, and an indication of the requesting device; displaying a request for authorization to proceed with the action; and receiving an input that is responsive to the request for authorization to proceed with the action.

In accordance with some embodiments, a transitory computer-readable storage medium is described. The non-transitory computer-readable storage medium stores one or more programs that are executable by one or more processors of an authenticating device with a display, the one or more programs including instructions for: receiving, from a requesting device, a request to proceed with an action, wherein the request includes information regarding the action and wherein the requesting device and the authenticating device are both signed into a service using the same account; concurrently displaying, on the display: an indication of the request to proceed with the action, the information regarding the action, and an indication of the requesting device; displaying a request for authorization to proceed with the action; and receiving an input that is responsive to the request for authorization to proceed with the action.

In accordance with some embodiments, an authenticating device is described. The authenticating device comprises: a display; means for receiving, from a requesting device, a request to proceed with an action, wherein the request includes information regarding the action and wherein the requesting device and the authenticating device are both signed into a service using the same account; means for concurrently displaying, on the display: an indication of the request to proceed with the action, the information regarding the action, and an indication of the requesting device; means for displaying a request for authorization to proceed with the action; and means for receiving an input that is responsive to the request for authorization to proceed with the action.

In accordance with some embodiments, a requesting device is described. The requesting device comprises a display unit and a processing unit coupled to the display unit. The processing unit configured to: receive selection of one or more options associated with an action; receive selection of an option to proceed with the action associated with the selected one or more options; transmit, by the requesting device to an authenticating device, a request to proceed with the action, wherein the request includes information about the selected one or more options, the information about the selected one or more options for display by the authenticating device; receive, from the authenticating device, a response to the request to proceed with the action, wherein the response to the request to proceed with the action is indicative of an input at the authenticating device; and in accordance with a determination that the response to the request to proceed with the action indicates that an authorization at the authenticating device was successful, enable display, on the display unit of the requesting device, of an indication that the authorization was successful.

In accordance with some embodiments, an authenticating device is described. The authenticating device, comprising a display unit and a processing unit coupled to the display unit. The processing unit configured to: receive, from a requesting device, a request to proceed with an action, wherein the request includes information regarding the action and wherein the requesting device and the authenticating device are both signed into a service using the same account; concurrently enable display, on the display unit, of: an indication of the request to proceed with the action, the information regarding the action, and an indication of the requesting device; enable display of a request for authorization to proceed with the action; and receive an input that is responsive to the request for authorization to proceed with the action.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a remote authorization to proceed with an action, thereby increasing the effectiveness, efficiency, and user satisfaction with such devices. Such methods and interfaces may complement or replace other methods for managing a remote authorization to proceed with an action.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
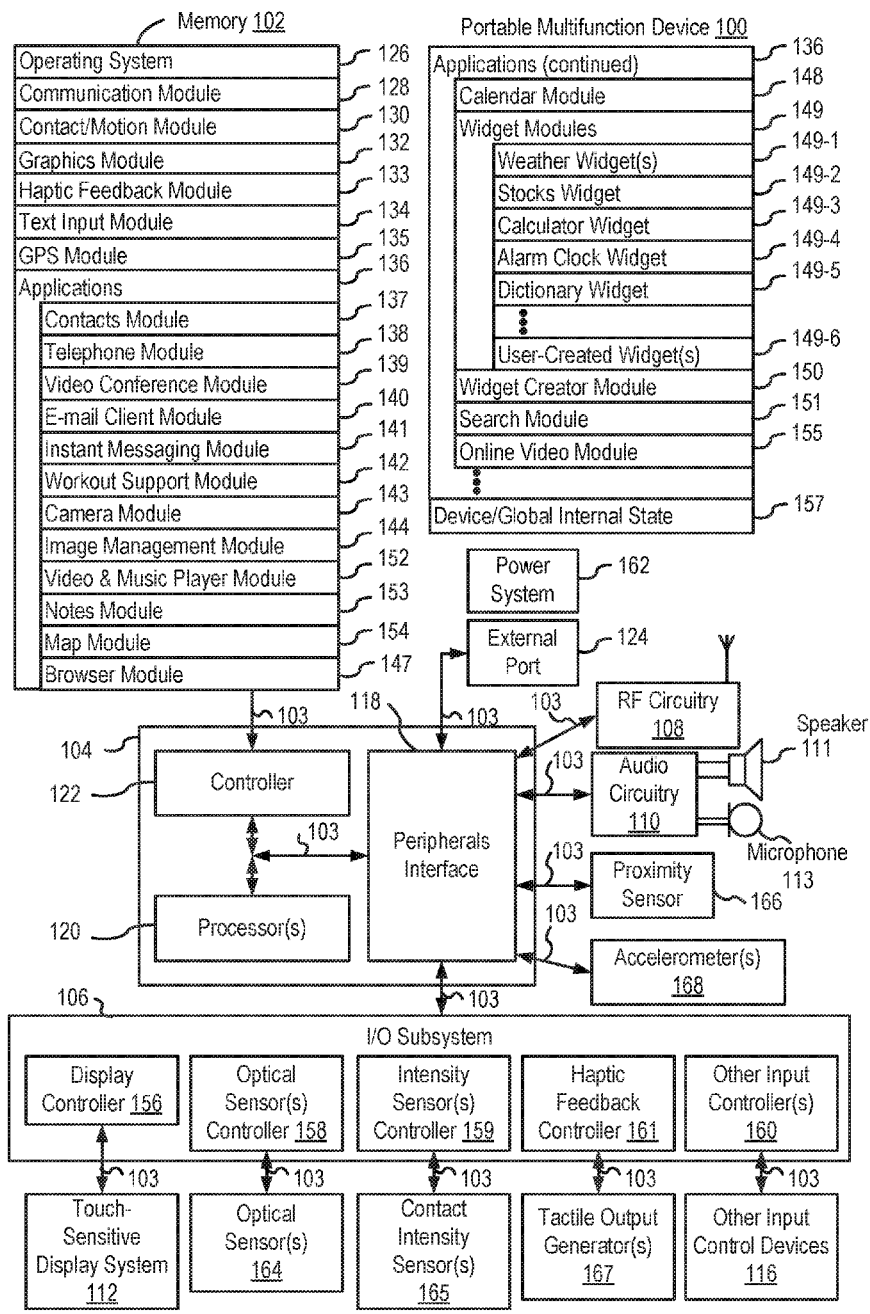
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a remote authorization to proceed with an action. In one example, a user may be using a personal laptop computer that is not capable of generating a secure value, such as a token, for use in performing an action, such as for use in creating a secure network connection between the laptop computer and a remote server. The user's personal smartphone device, however, may be capable of generating the token for use in creating the secure network connection. The user may use their personal smartphone device to remotely authorize proceeding with the action, which may include the personal smartphone device transmitting a token to the remote server or to the personal laptop computer for use in creating the secure network connection. In another example, the user may be using a personal laptop computer that is not capable of generating payment information for use in performing an action, such as for use in a payment transaction. The user's personal smartphone device, however, may be capable of generating payment information for use in the payment transaction. The user may use their personal smartphone device to remotely authorize proceeding with the payment transaction, which may include the personal smartphone device transmitting payment information to the remote server or to the personal laptop computer for use in the payment transaction. Such techniques can reduce the cognitive burden on a user who uses remote authorization to proceed with an action, thereby enhancing productivity. Further, such techniques can reduce processor and battery power otherwise wasted on redundant user inputs.

Below, FIGS. 1A-1B, 2, 3, 4A-4B, 5A-5H, and 6 provide a description of exemplary devices for performing the techniques for managing a remote authorization to proceed with an action. FIG. 6 illustrates exemplary devices connected via one or more communication channels to complete a payment transaction, in accordance with some embodiments. FIGS. 7A-7L illustrate exemplary user interfaces for managing a remote authorization to create a secure network connection. FIGS. 8A-8M illustrate exemplary user interfaces for managing a remote authorization to proceed with a payment transaction. FIGS. 9-11 are flow diagrams illustrating methods of managing a remote authorization to proceed with an action. The user interfaces in FIGS. 7A-7L are used to illustrate the processes described below, including the processes in FIGS. 9-11. The user interfaces in FIGS. 8A-8M are also used to illustrate the processes described below, including the processes in FIGS. 9-11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoW), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
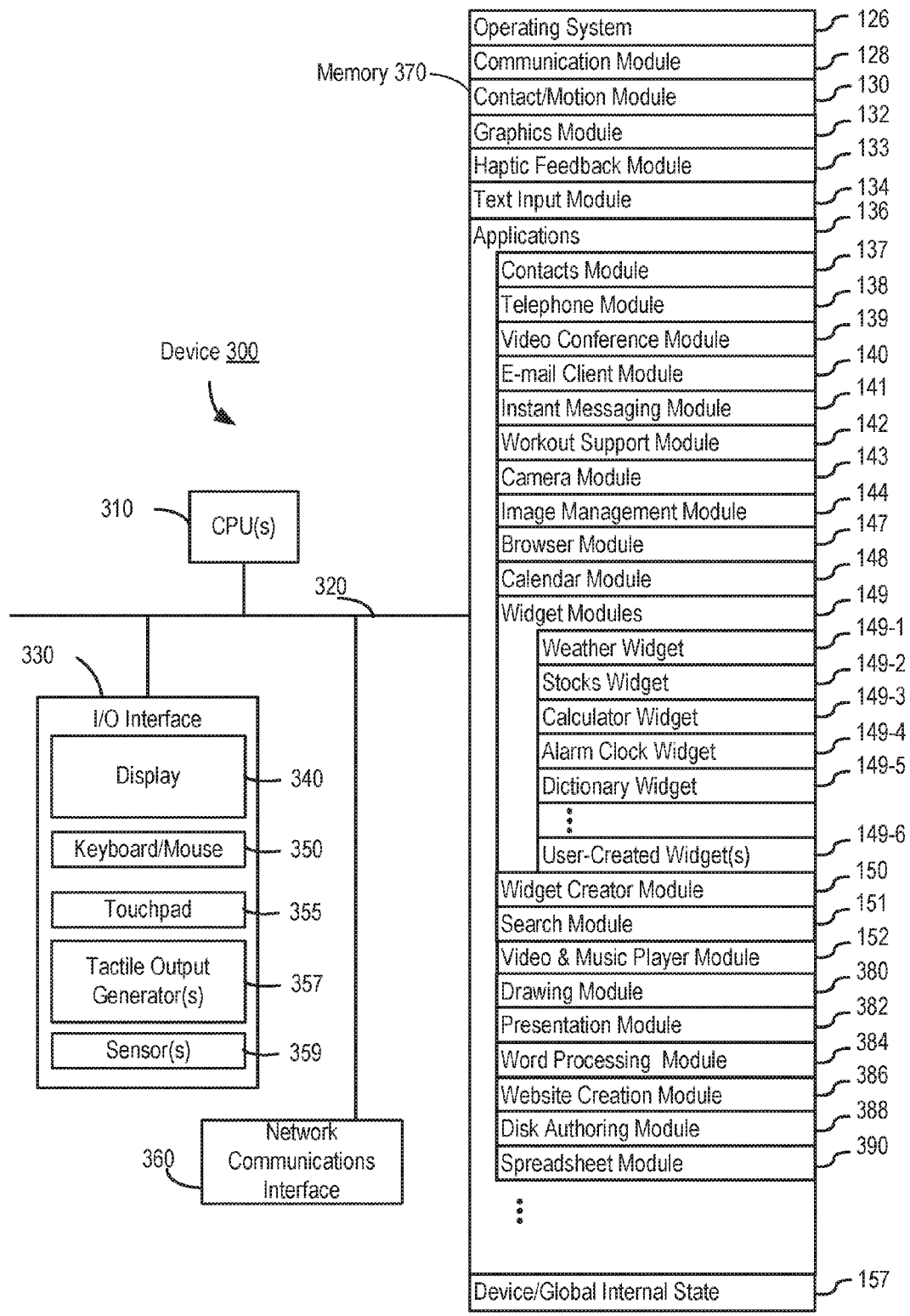
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
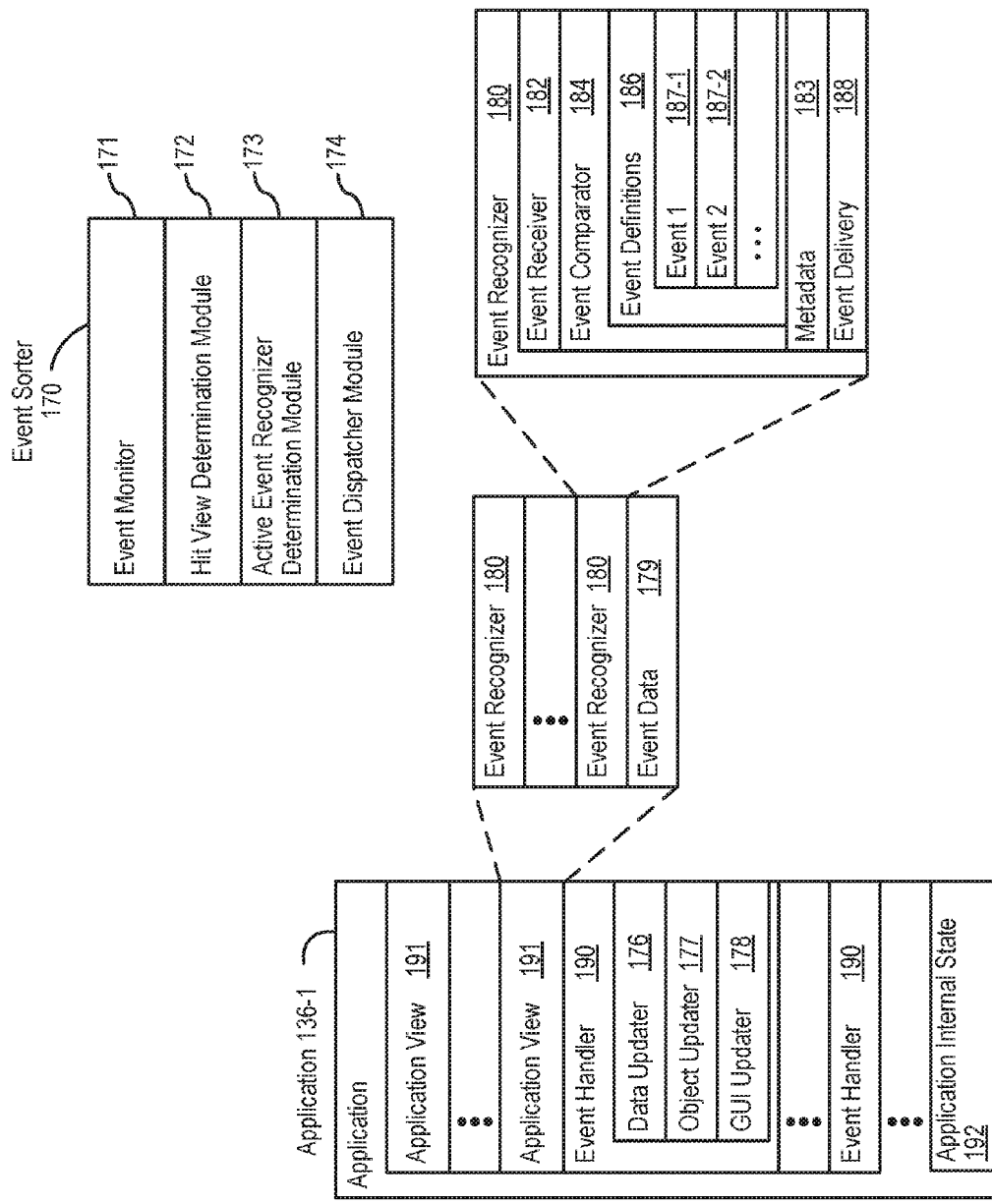
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
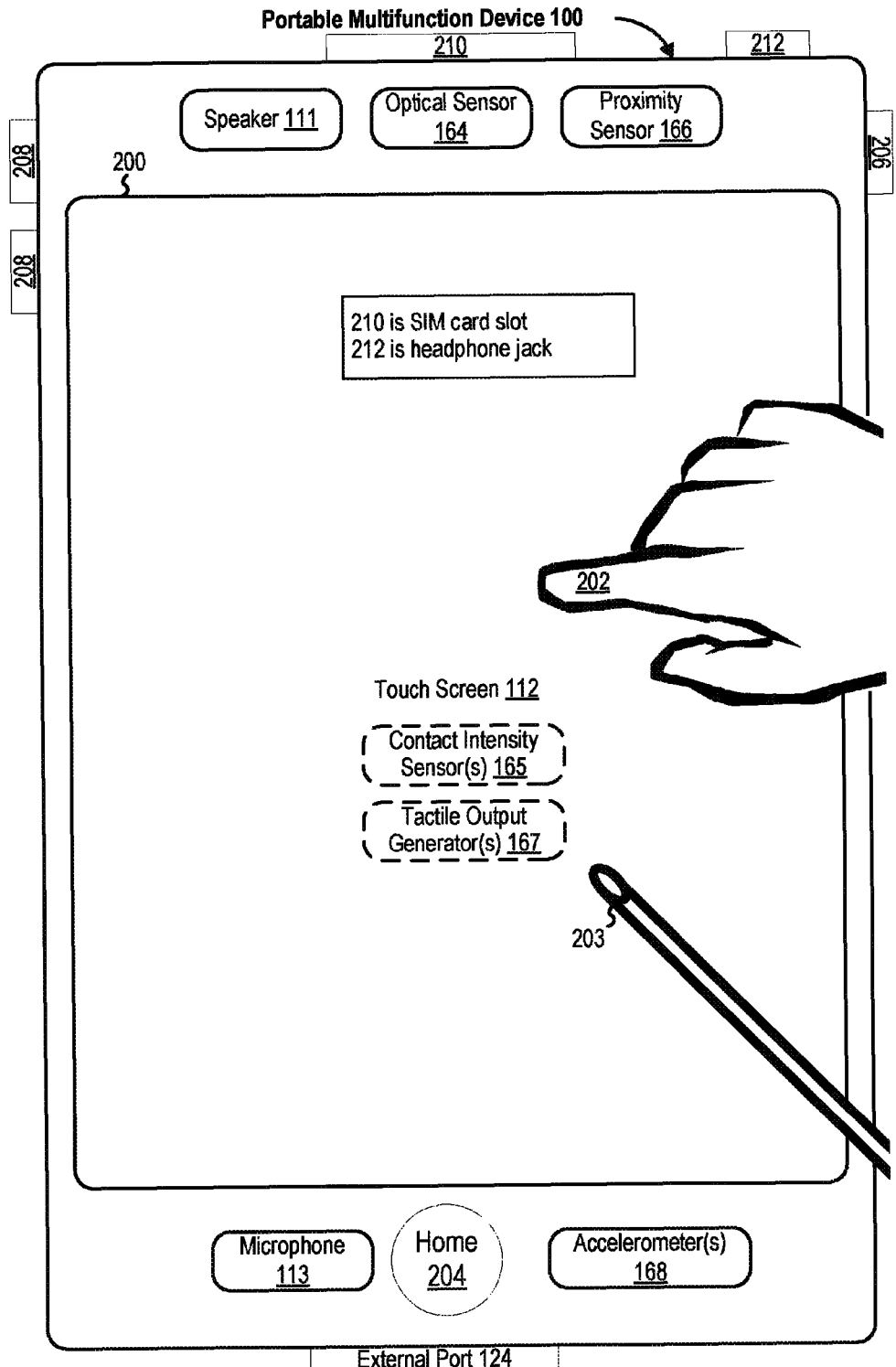
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
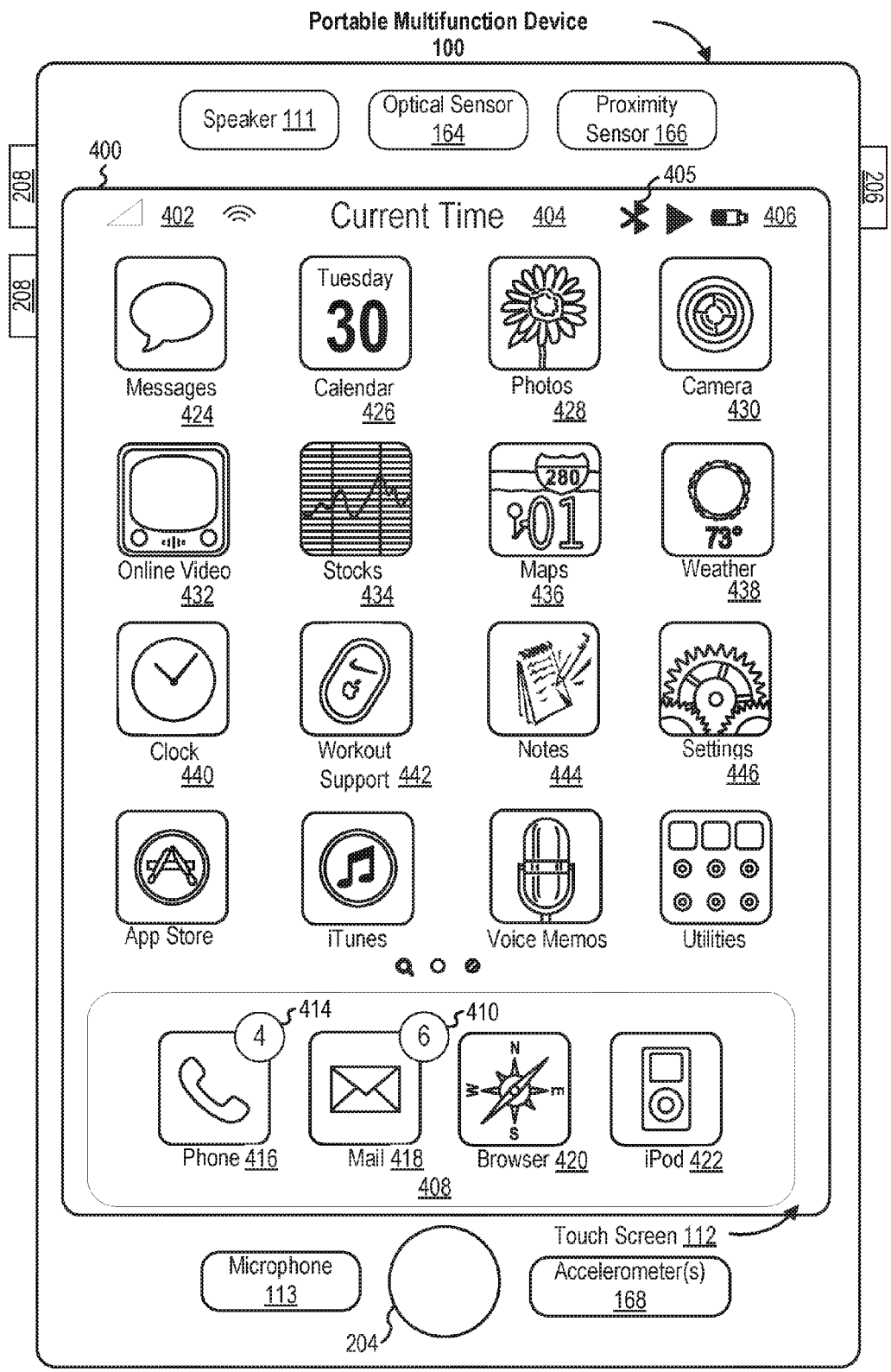
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
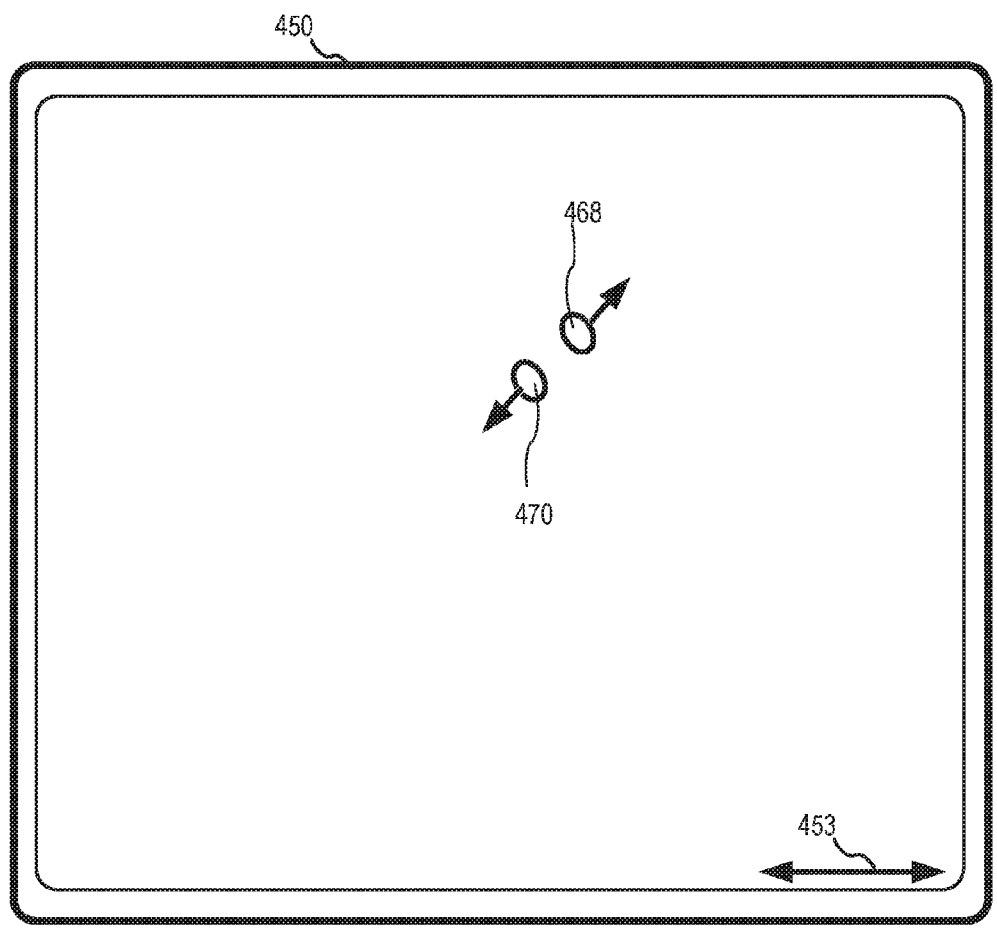
FIG. 4B illustrates an exemplary user interface for a multifunction device with a touch-sensitive surface that is separate from the display in accordance with some embodiments.
Figure 4B:
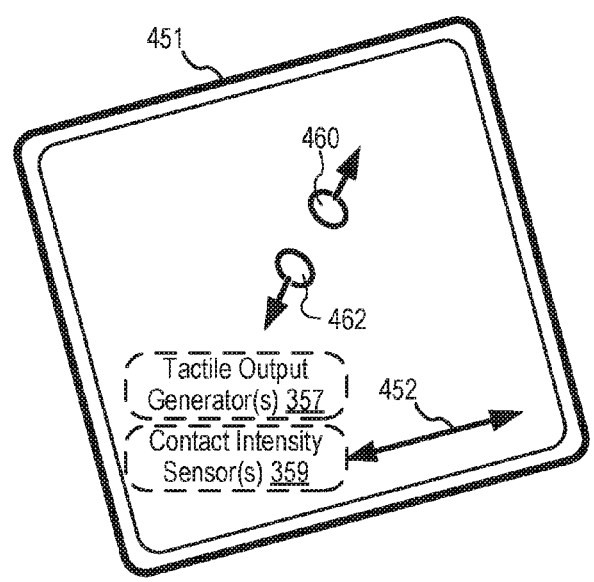

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
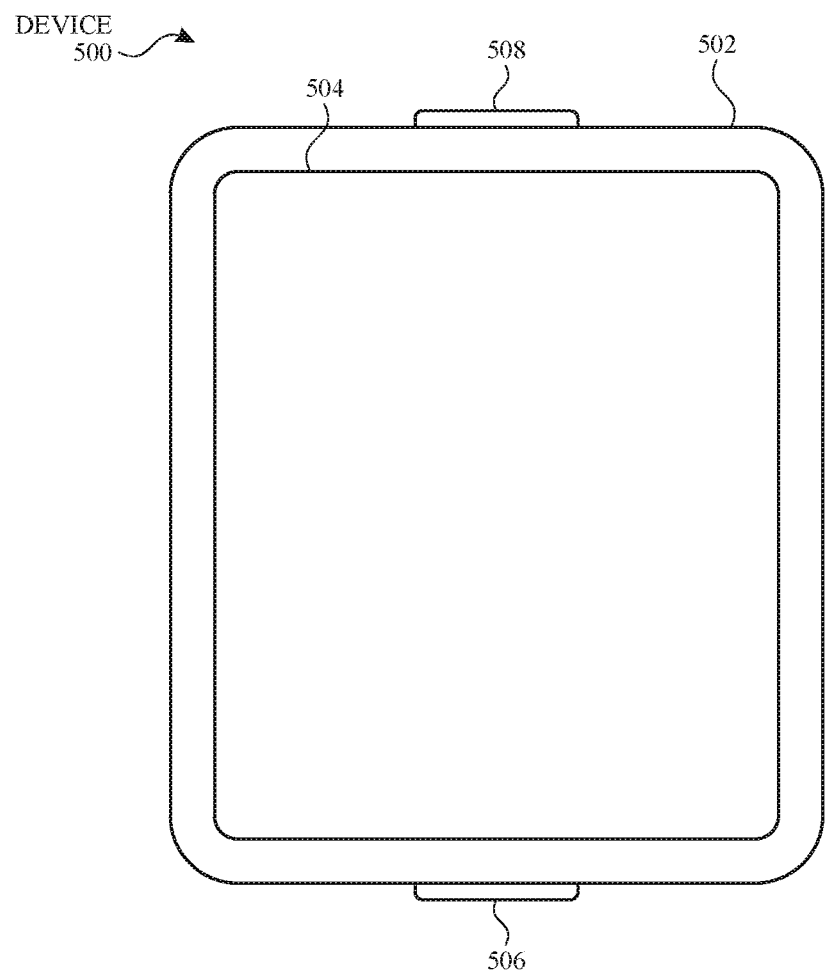
FIG. 5A illustrates a personal electronic device in accordance with some embodiments.
Figure 6:
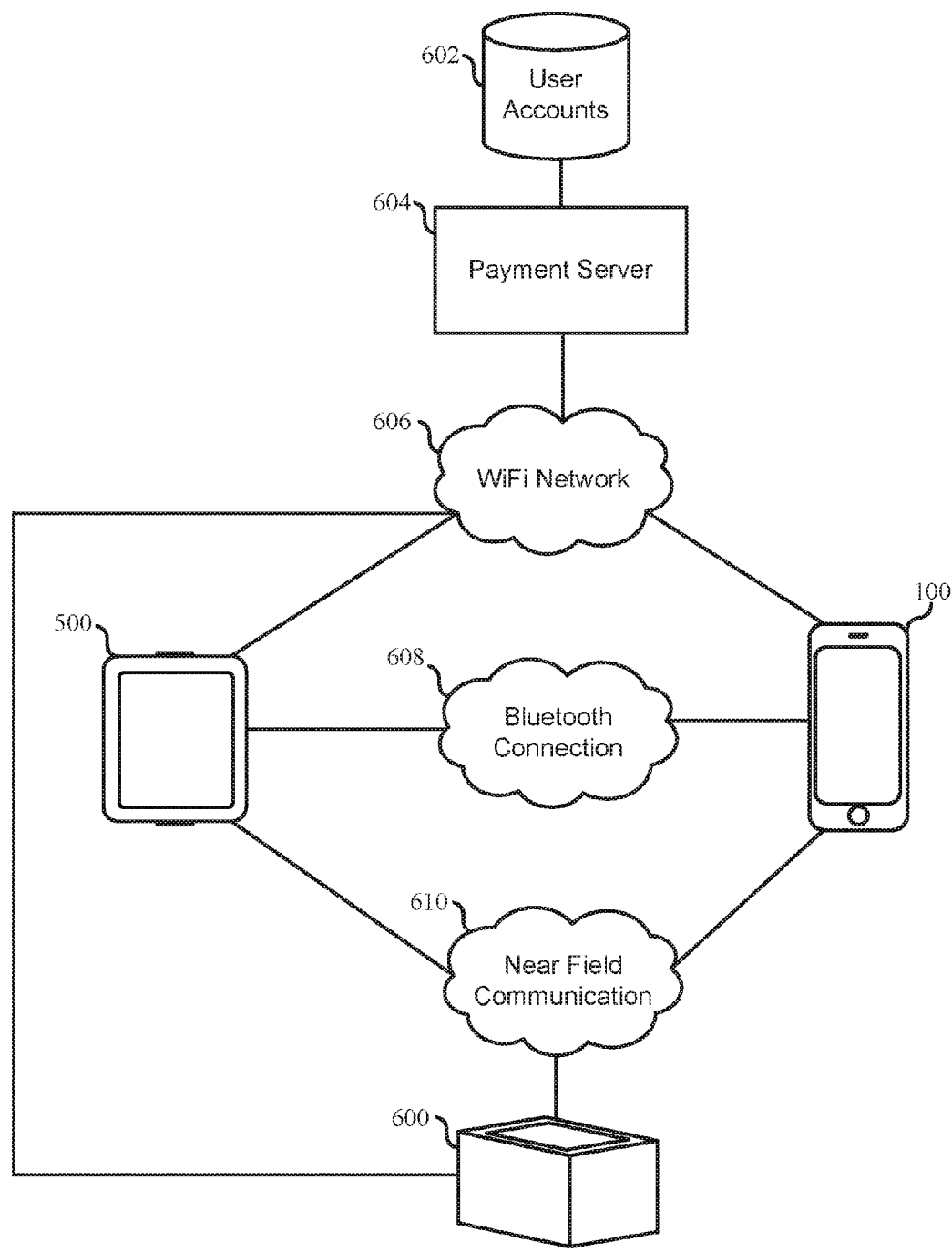
FIG. 6 illustrates exemplary devices connected via one or more communication channels to complete a payment transaction in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
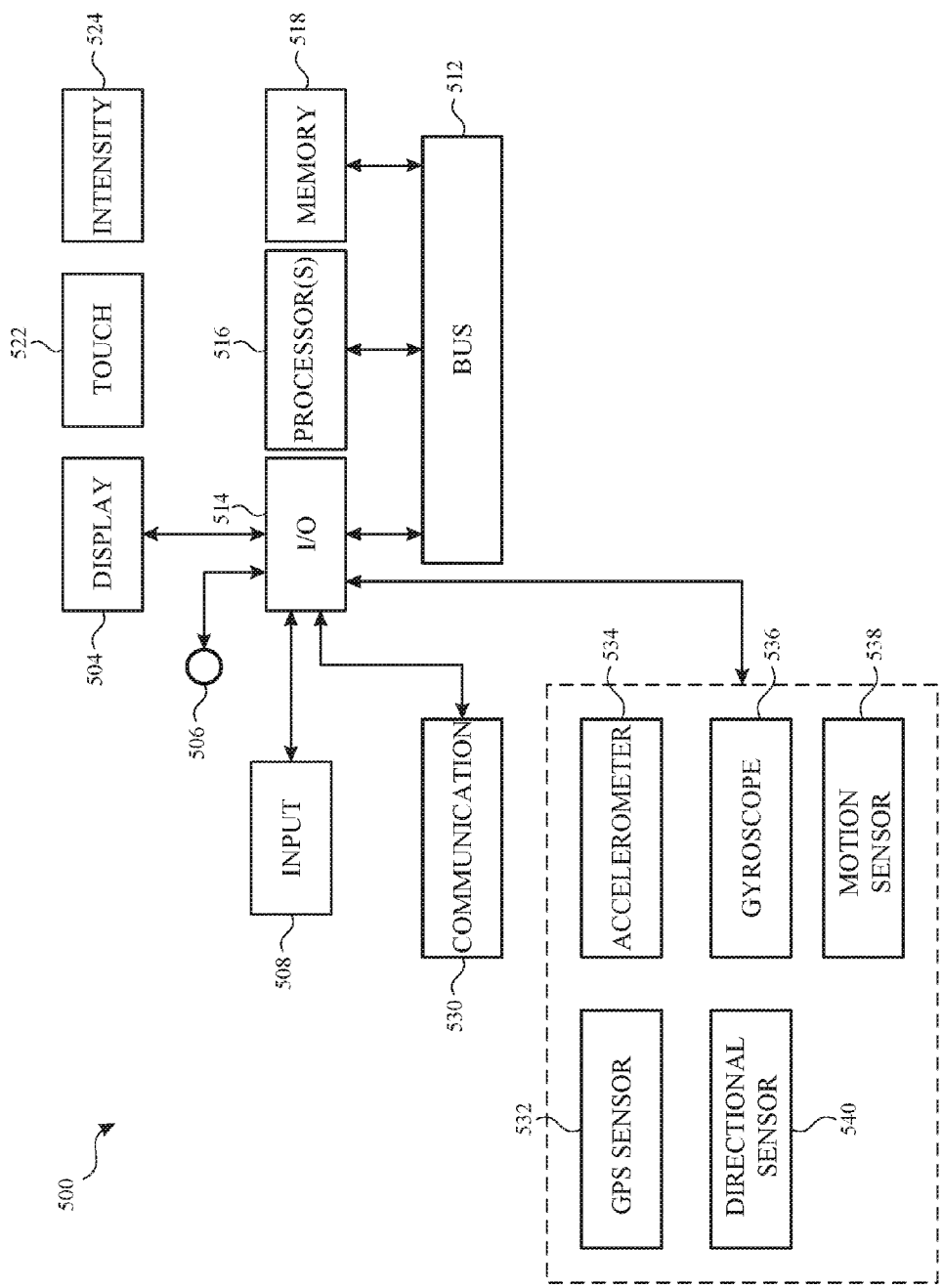
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 900-1100 (FIGS. 9-11). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-B, 3, and 5A-H). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
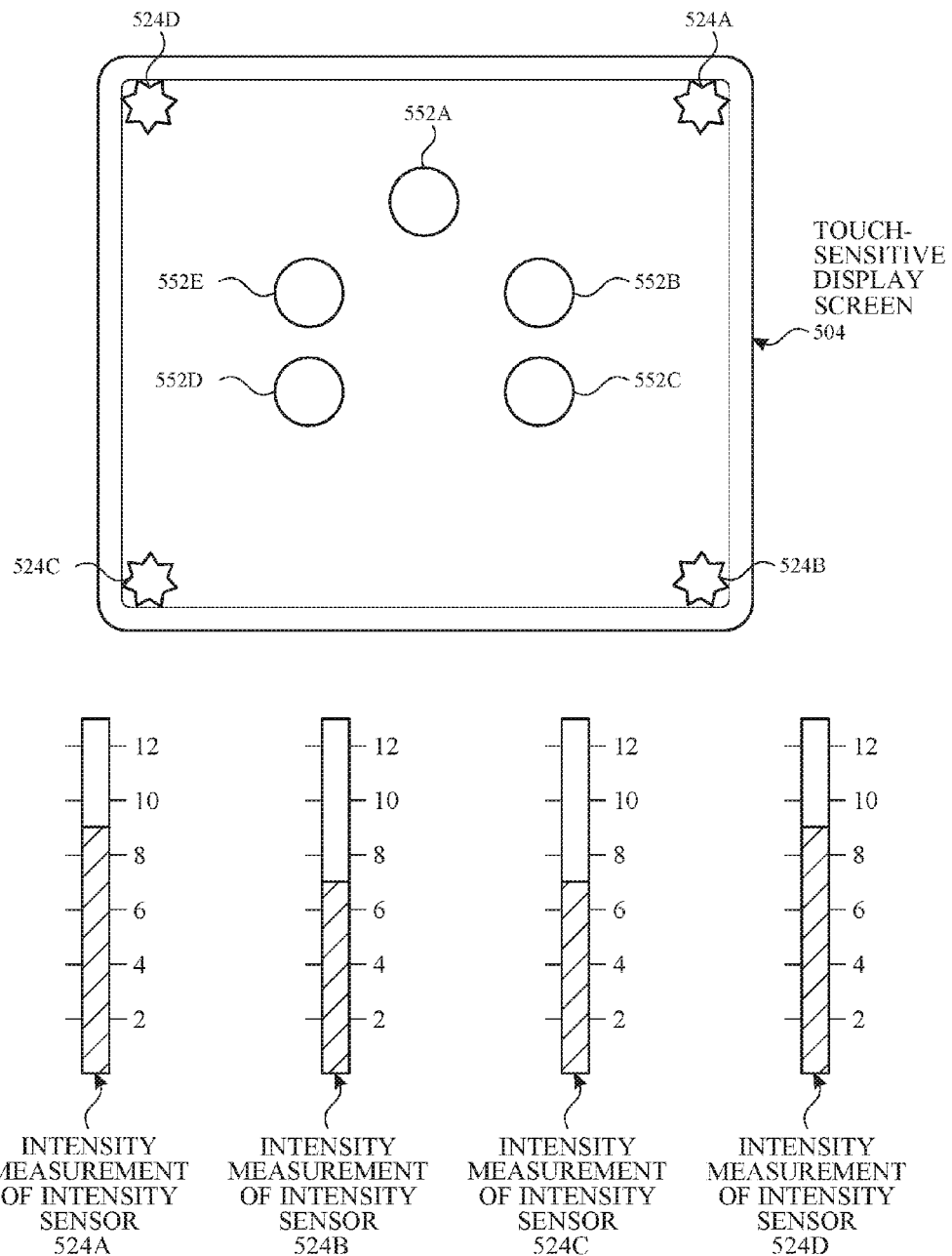
FIGS. 5C-5D illustrate exemplary components of a personal electronic device having a touch-sensitive display and intensity sensors in accordance with some embodiments.
Figure 5D:
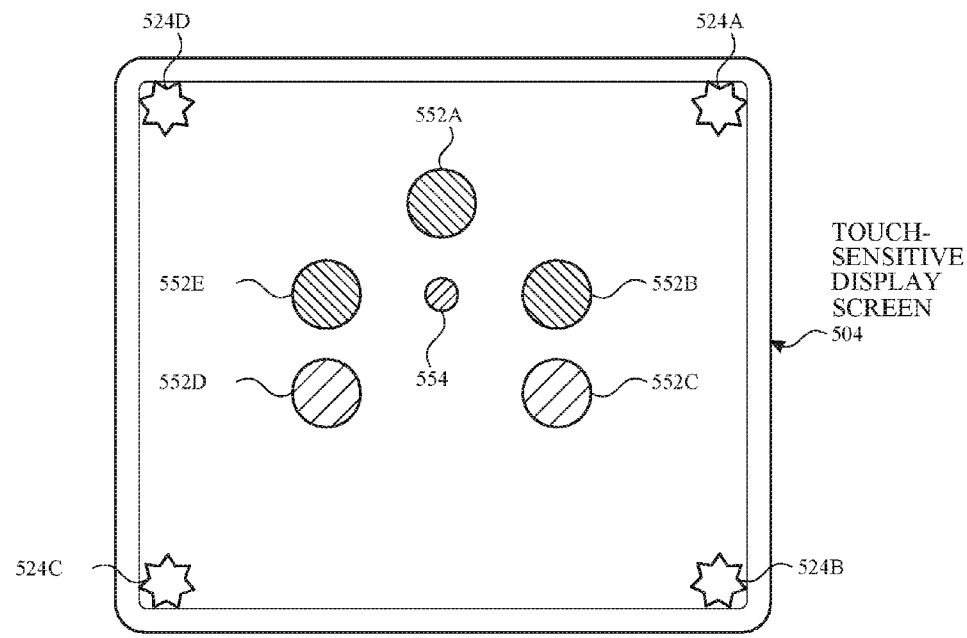
Figure 5D:
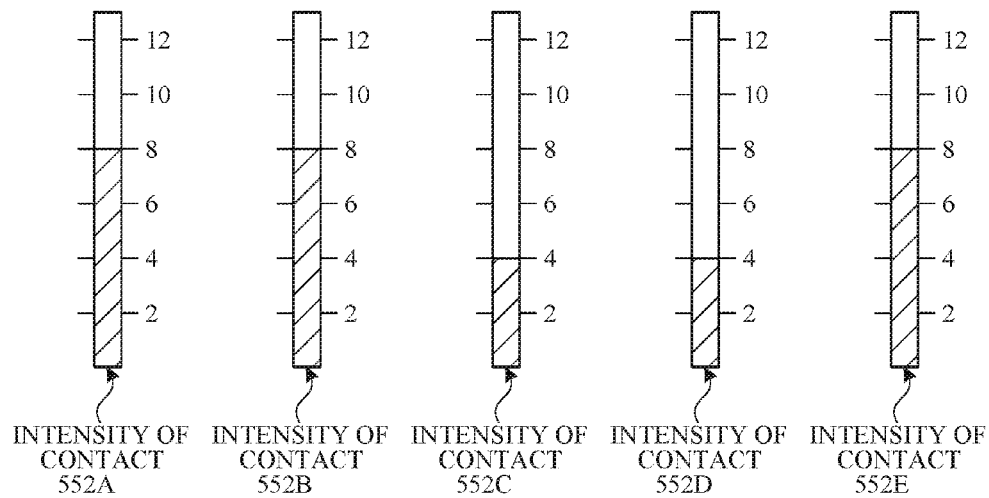

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij = A \cdot (Dj / \Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
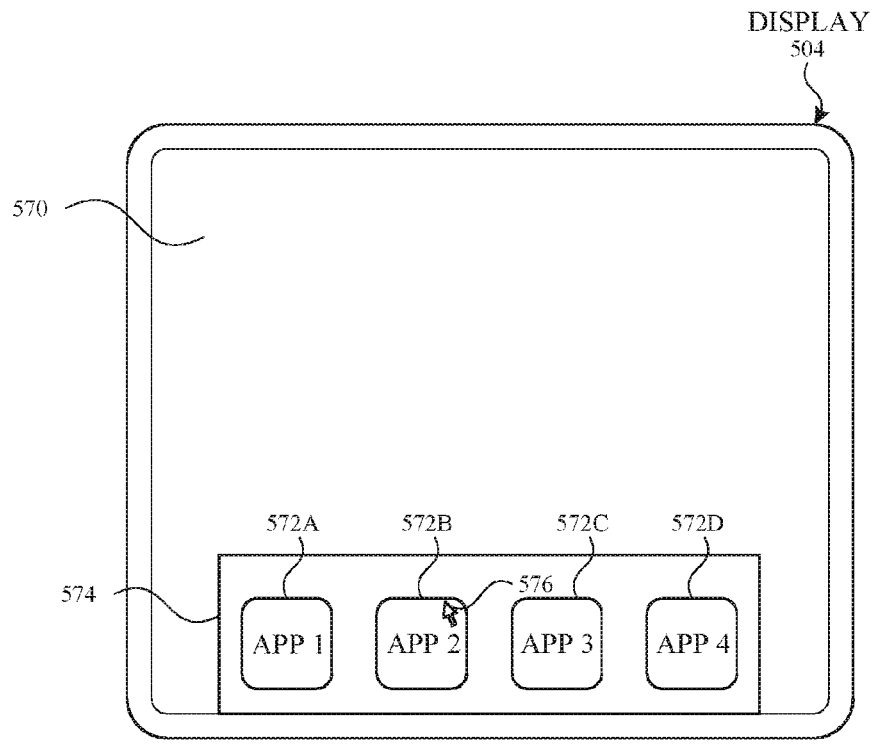
FIGS. 5E-5H illustrate exemplary components and user interfaces of a personal electronic device in accordance with some embodiments.
Figure 5E:
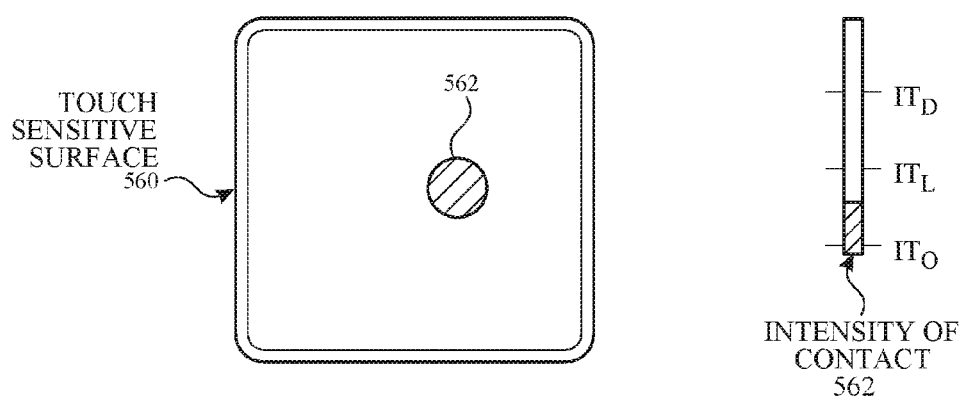
Figure 5F:
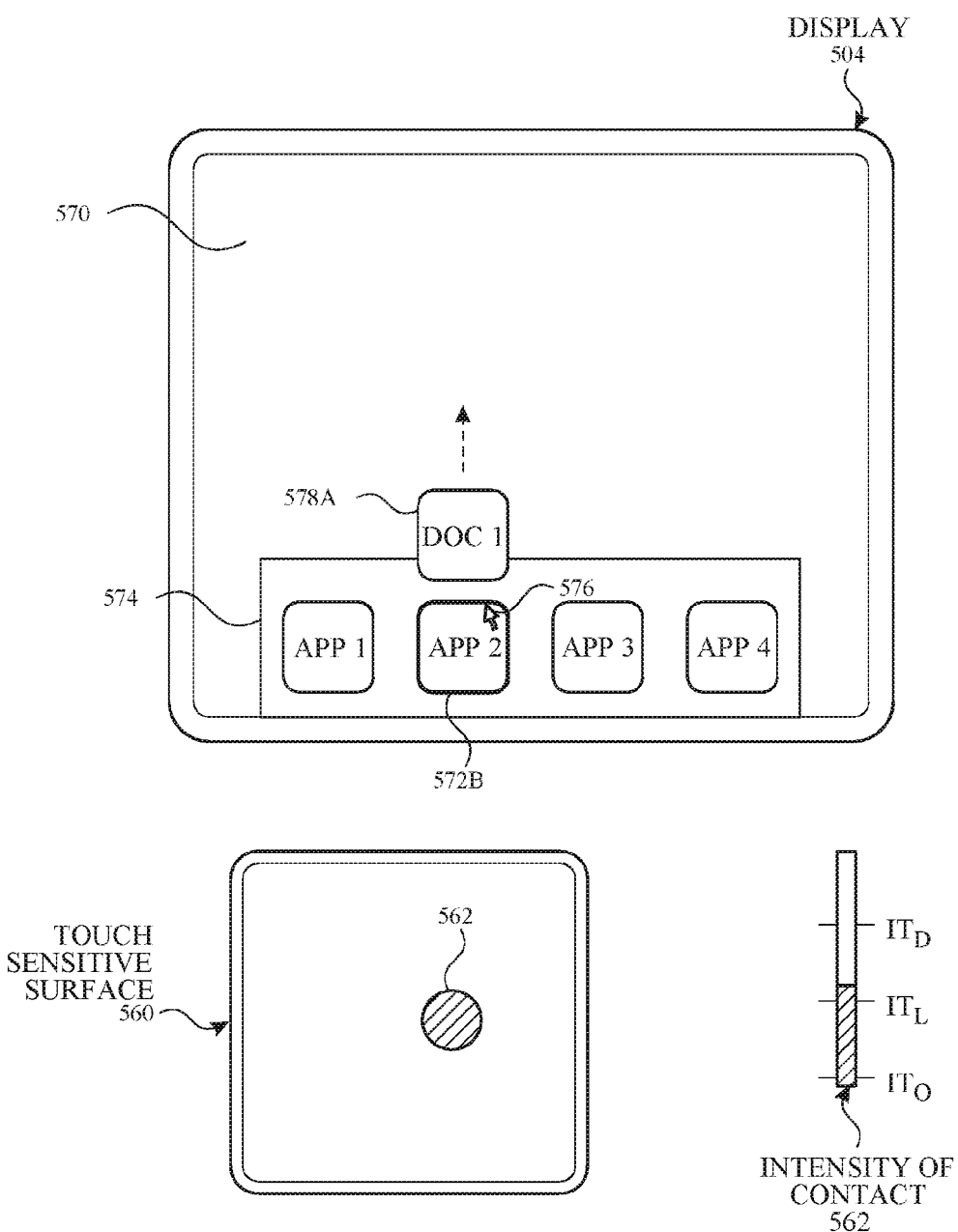
Figure 5G:
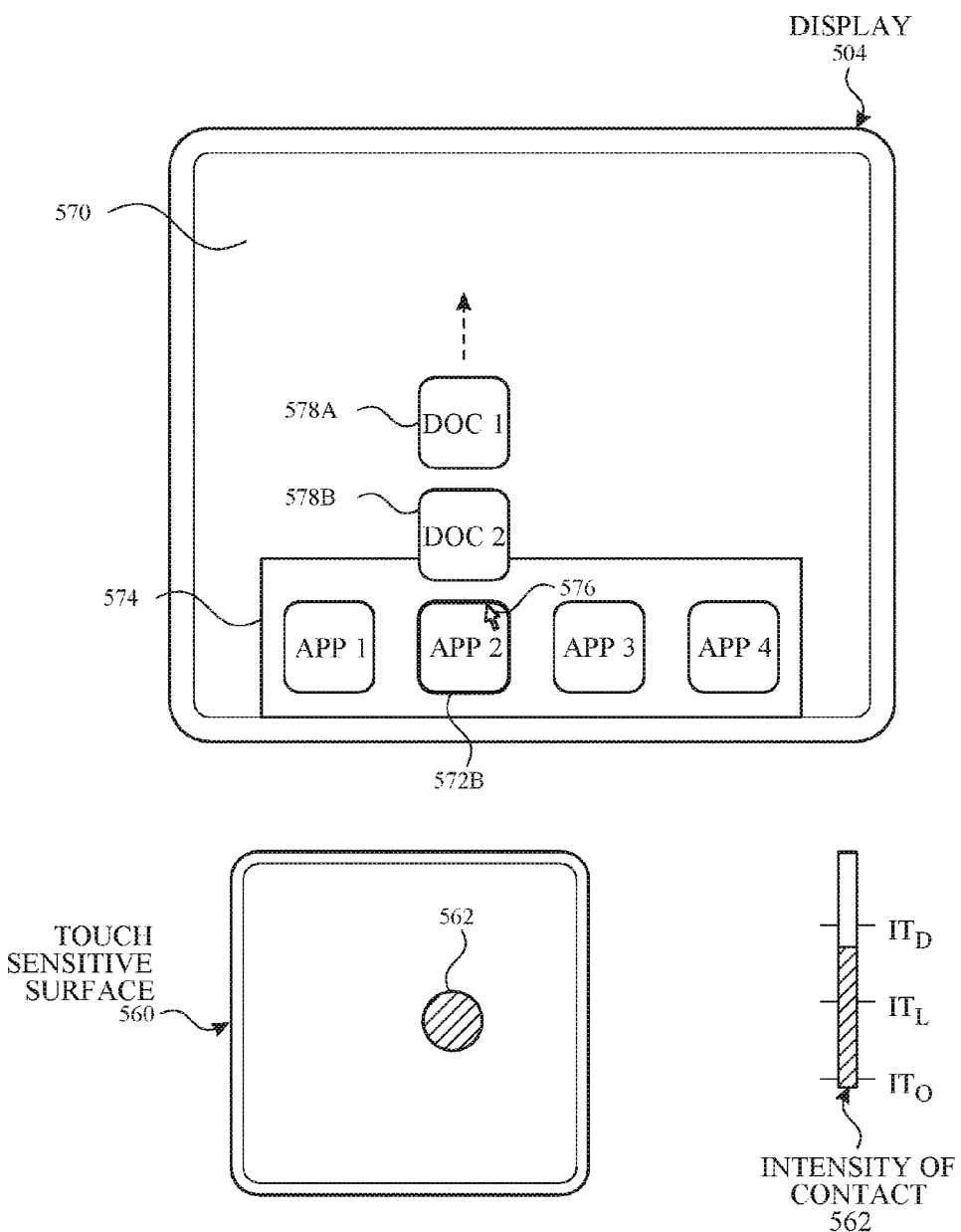
Figure 5H:
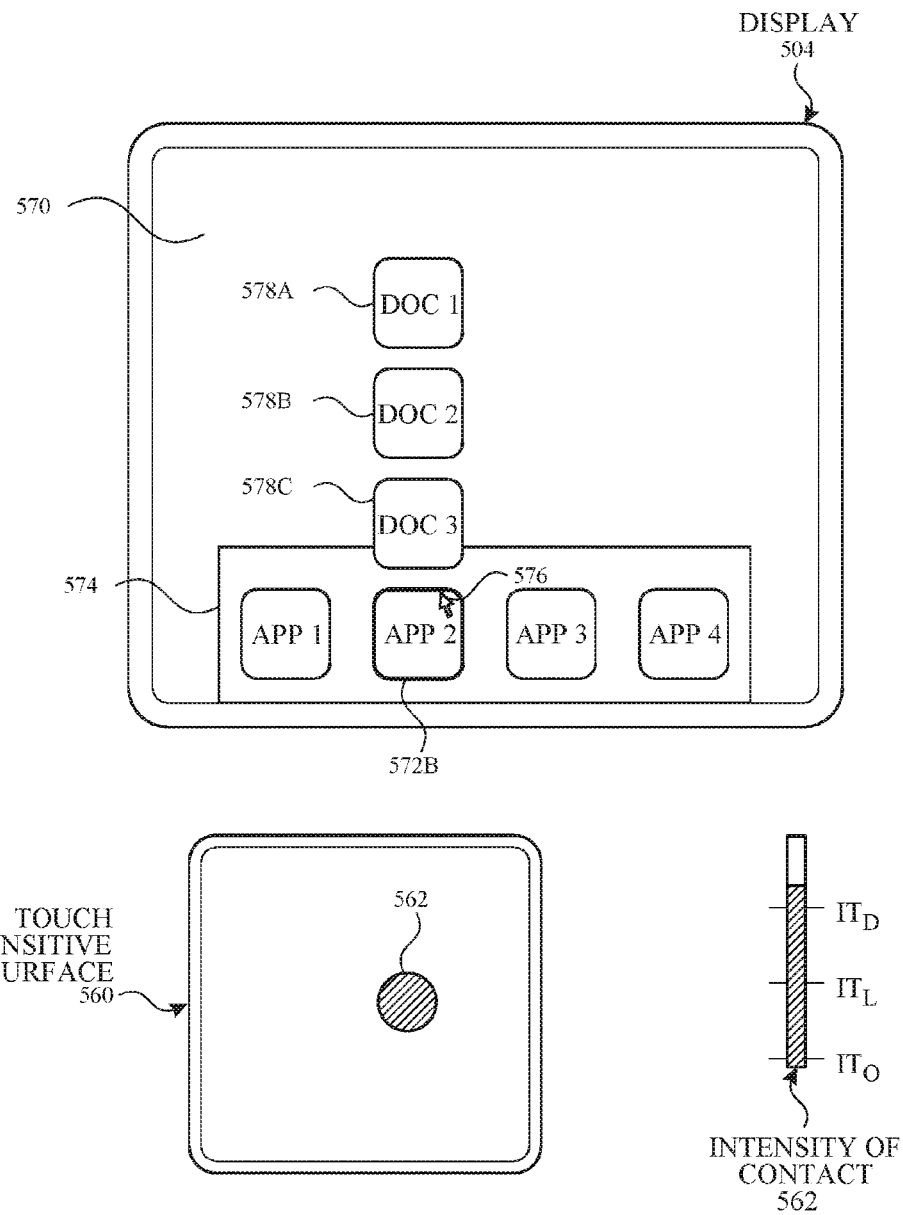

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates exemplary devices connected via one or more communication channels to complete a payment transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500, 700) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some examples, a secure element is a hardware component (e.g., a secure microcontroller chip) configured to securely store data or an algorithm. In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device is on a user's wrist, such as by detecting that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7L illustrate exemplary user interfaces for managing a remote authorization to proceed with an action, in accordance with some embodiments. The user interfaces in these figures are used to illustrate the processes described below, including the processes in FIGS. 9-11.

Figure 7A:
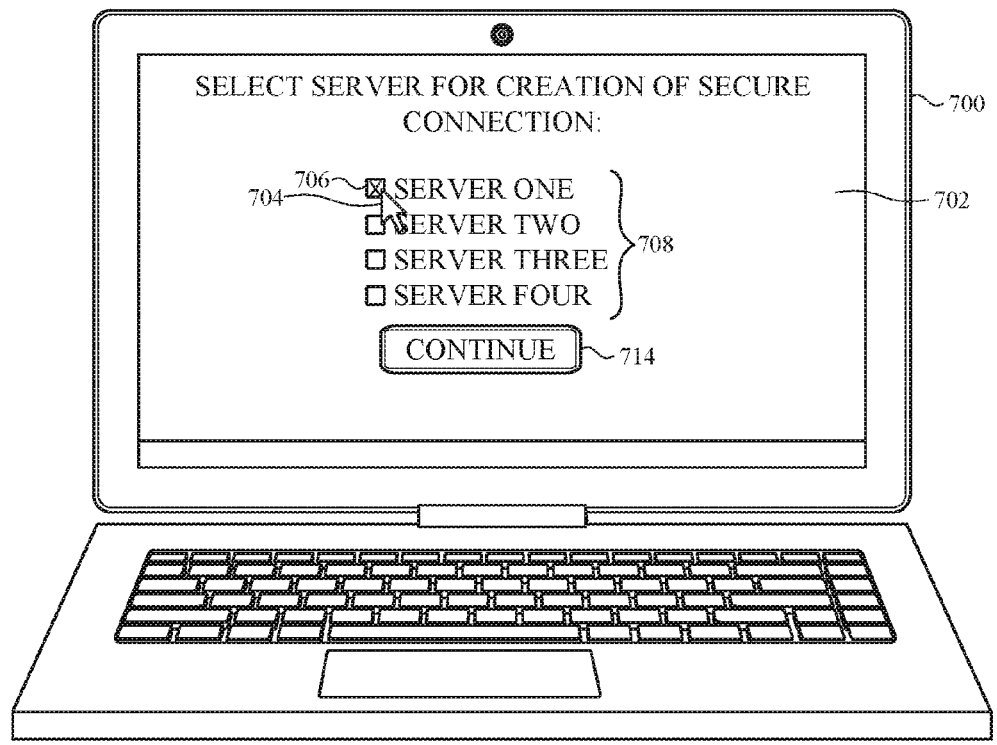
FIGS. 7A-7L illustrate exemplary user interfaces for managing a remote authorization to proceed with an action, in accordance with some embodiments.
Figure 7A:
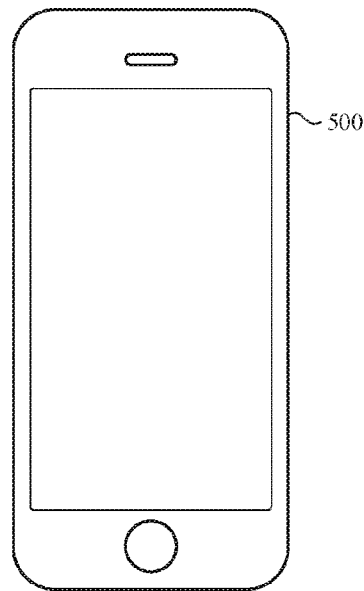

FIG. 7A illustrates requesting device 700 (e.g., an electronic device, such as a laptop computer with a display, that does not have a hardware token generator) and authenticating device 500 (e.g., an electronic device, such as a smartphone, with a display that does have a hardware token generator). In some examples, the authenticating device 500 includes hardware (e.g., hardware token generator) capable of certain functionality, while the requesting device 700 does not include the hardware and is not capable of performing the functionality. By using remote authorization in such a scenario, a user is able to take advantage of the hardware capabilities of a device (e.g., the authenticating device 500) while using (or performing tasks on) a different device (e.g., the requesting device 700). In some examples, the present technique enables a parent to remotely authorize an action using a first device (e.g., the authenticating device 500), where the action was requested (or initiated) by the parent's child using a second device (e.g., a requesting device), (e.g., regardless of the hardware capabilities of the second device). In some examples, the techniques helps to maintain a certain level of security by avoiding the need to distribute secure data to systems that do not meet certain security standards (e.g., avoiding the need to generate or store secure information on a system that does not have a secure element).

In some examples, requesting device 700 and authenticating device 500 are configured to be in communication, such as via wireless communication. For example, the requesting device 700 and authenticating device 500 may be in communication via a personal area network, a local area network, a wide area network, Bluetooth, WLAN, a cellular network, or any combination thereof.

Requesting device 700 displays a user interface 702 that includes one or more options 708. In this example, the one or more options 708 are names of corresponding remote servers. In some examples, the requesting device 700 displays a plurality of options 708. Authenticating device 500 is in the on state. In this example, the display of authenticating device 500 is not displaying anything (e.g., the display is turned off).

Figure 7B:
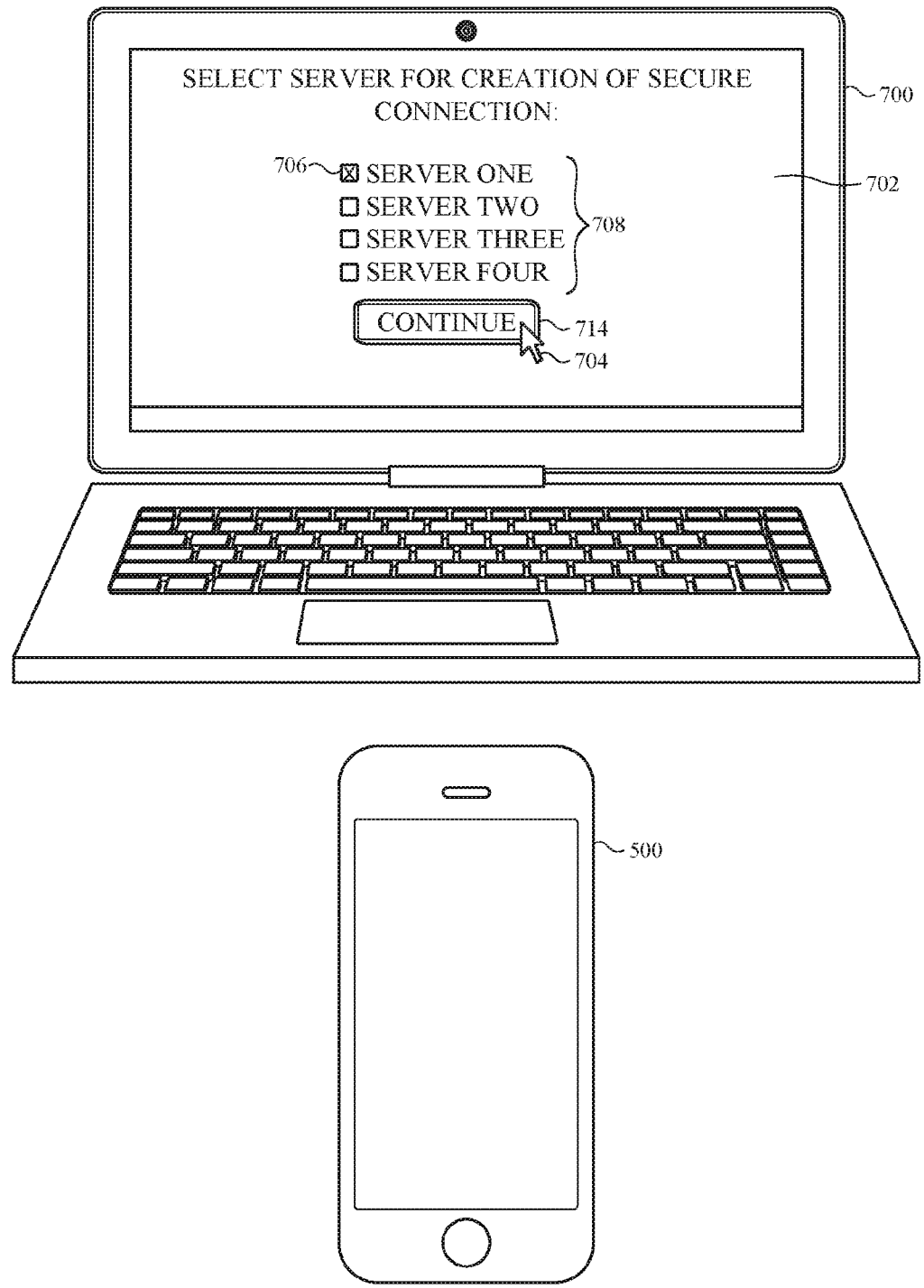

The requesting device 700 receives selection of one or more options (e.g., receiving user selection of a name or address of a remote server; receiving user selection of a security token generation algorithm from among a plurality of token generation algorithms; receiving user selection of a length for a to-be-generated security token; or a combination thereof). In this example, requesting device 700 receives activation of option 706 of the one or more options with cursor 704. In FIG. 7B, the requesting device detects activation of the continue affordance 714 with cursor 704.

Figure 7C:
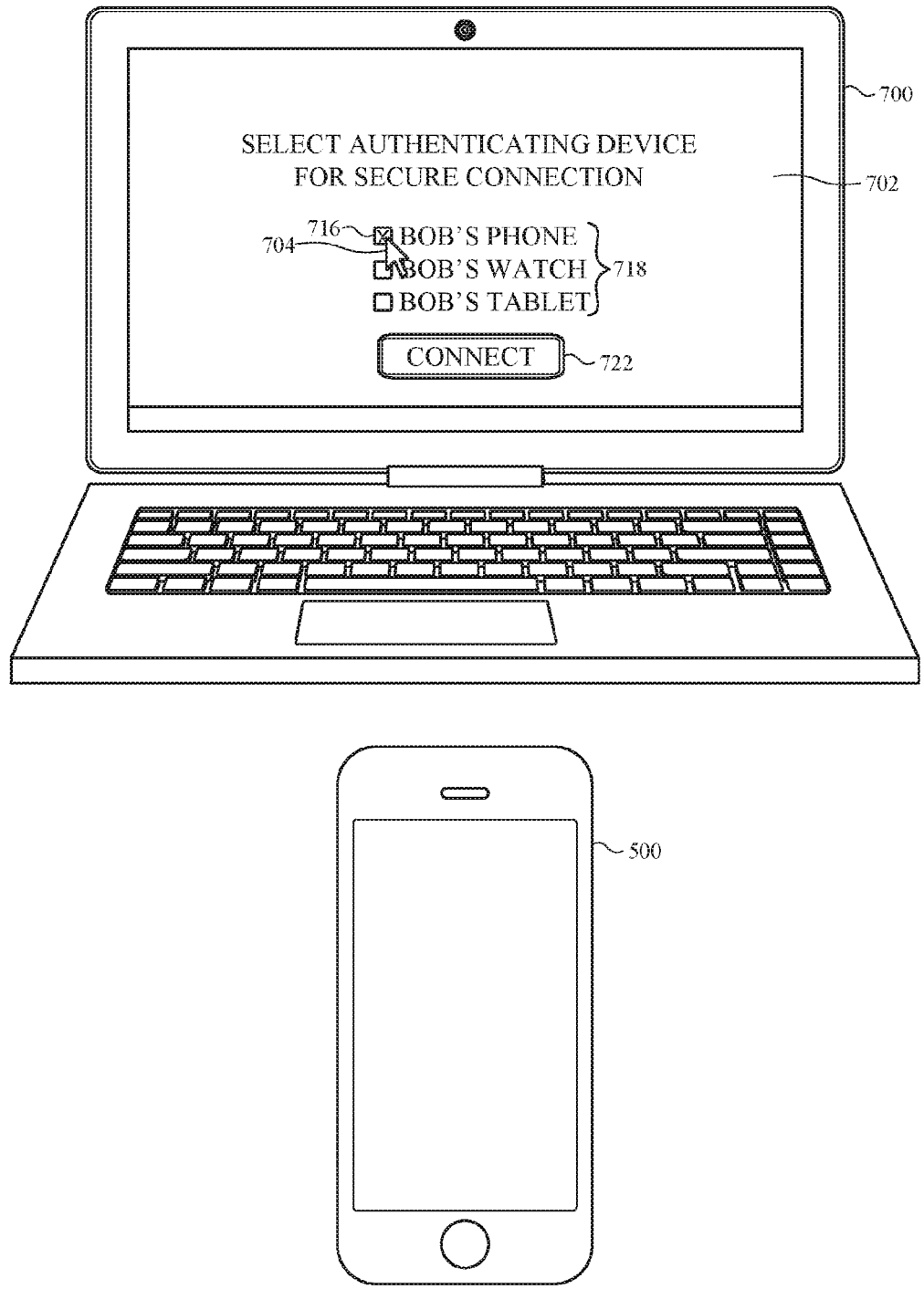
Figure 7D:
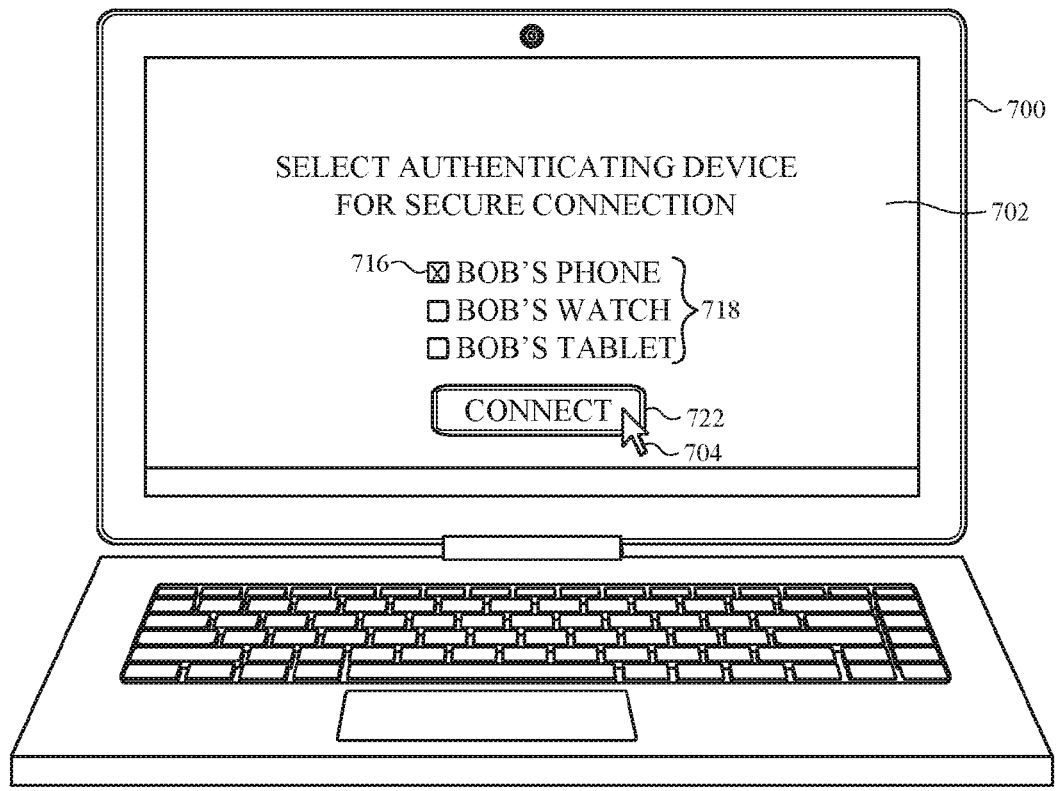
Figure 7D:
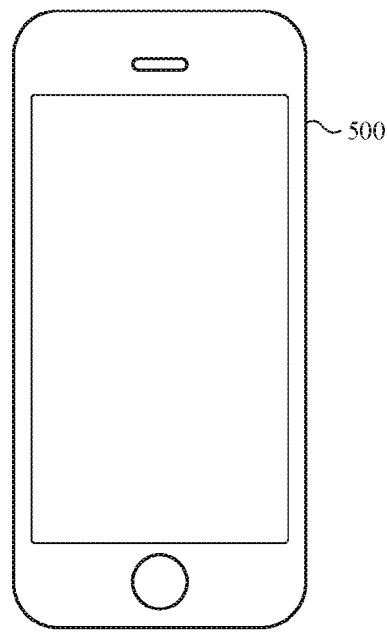

In some examples, at FIG. 7C, the requesting device 700 provides options (e.g., by displaying options) corresponding to a plurality of authenticating devices, the options corresponding to the plurality of authenticating devices includes an option 716, labeled Bob's Phone, that corresponds to the authenticating device 500.

At FIG. 7C, the requesting device 700 receives input selecting the option 716 corresponding to the authenticating device. At FIG. 7D, the requesting device receives selection of an option 722 (e.g., detecting user activation of a "confirm" affordance or a "connect" affordance) to proceed with an action (e.g., creating a secure network connection; proceeding with a payment transaction) associated with the selected one or more options 706. In some examples, the action is based on the selected one or more options 706. In some examples, a plurality of the one or more options is selected.

The requesting device 700 transmits a request to proceed with the action. The request includes information about (or based on) the selected one or more options. In some examples, the requesting device 700 transmits the request to proceed with the action to the authenticating device 500 based on the received input selecting the option 716 corresponding to the authenticating device.

Figure 7E:
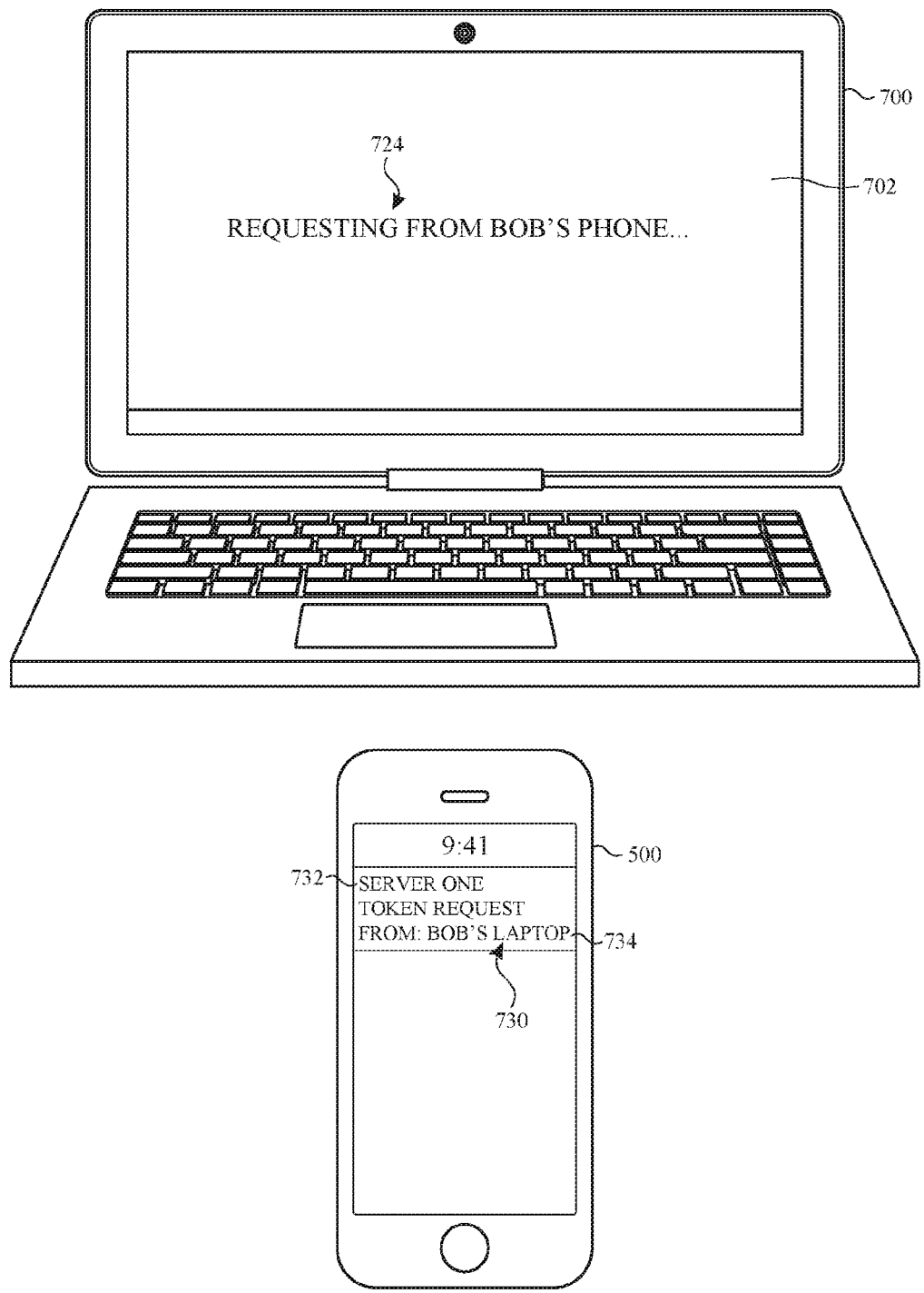

As illustrated in FIG. 7E, the authenticating device 500 receives the request to proceed with the action. In some examples, the transmission from the requesting device 700 to the authenticating device 500 is direct. In some examples, the transmission from the requesting device 700 to the authenticating device 500 is indirect, such as through an intermediary device.

In some examples, the authenticating device 500 is in a locked state when receiving the request to proceed with the action. In response to receiving the request to proceed with the action, the authenticating device 500 displays (while remaining in the locked state), on the display, a request notification 730 (e.g., on the lock screen of the authenticating device 500). In some examples, the request notification 730 includes one or more of the information 732 about (or based on) the selected one or more options and the indication 734 of the requesting device 700.

Figure 7F:
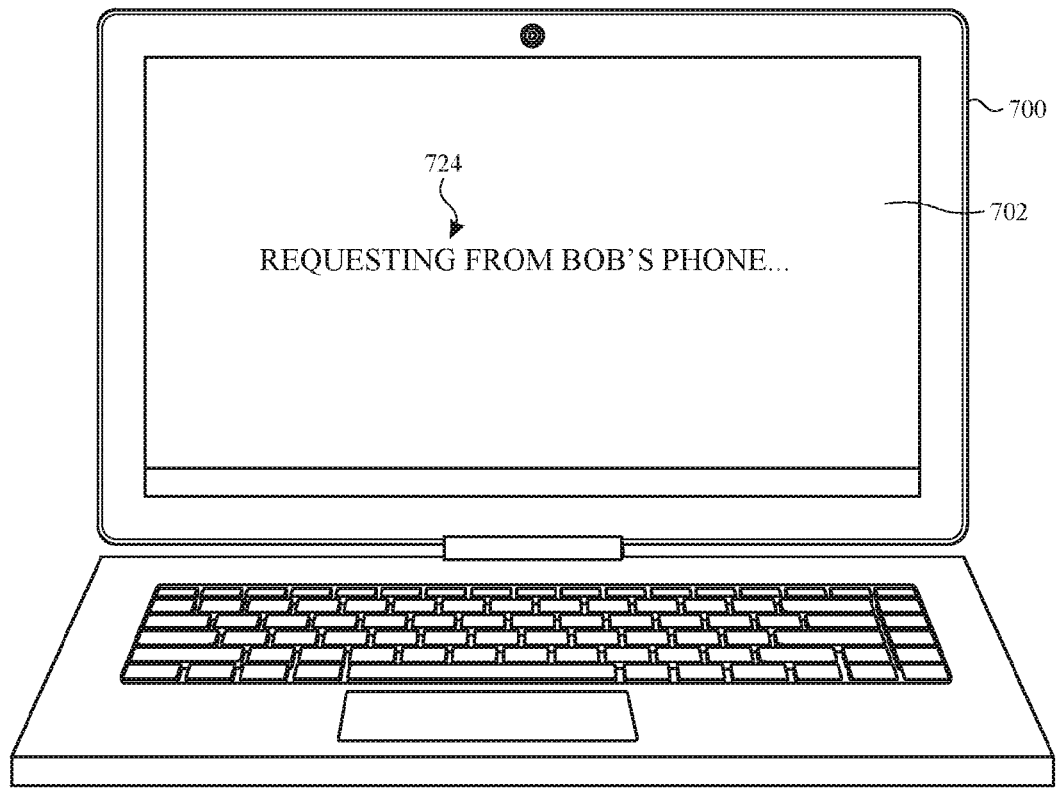
Figure 7F:
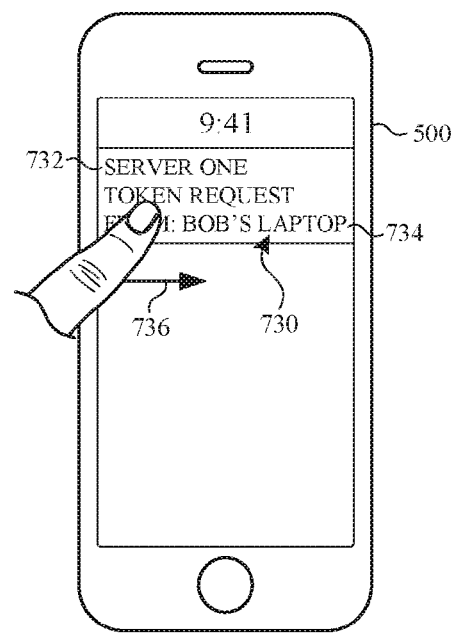

In some examples, as illustrated in FIG. 7F, the authenticating device 500 receives input activating the request notification 730 (e.g., receiving a user swipe gesture 736 to slide the request notification 730 beyond a threshold distance or a user input gesture pressing on the notification with a characteristic intensity above a respective threshold intensity).

Figure 7G:
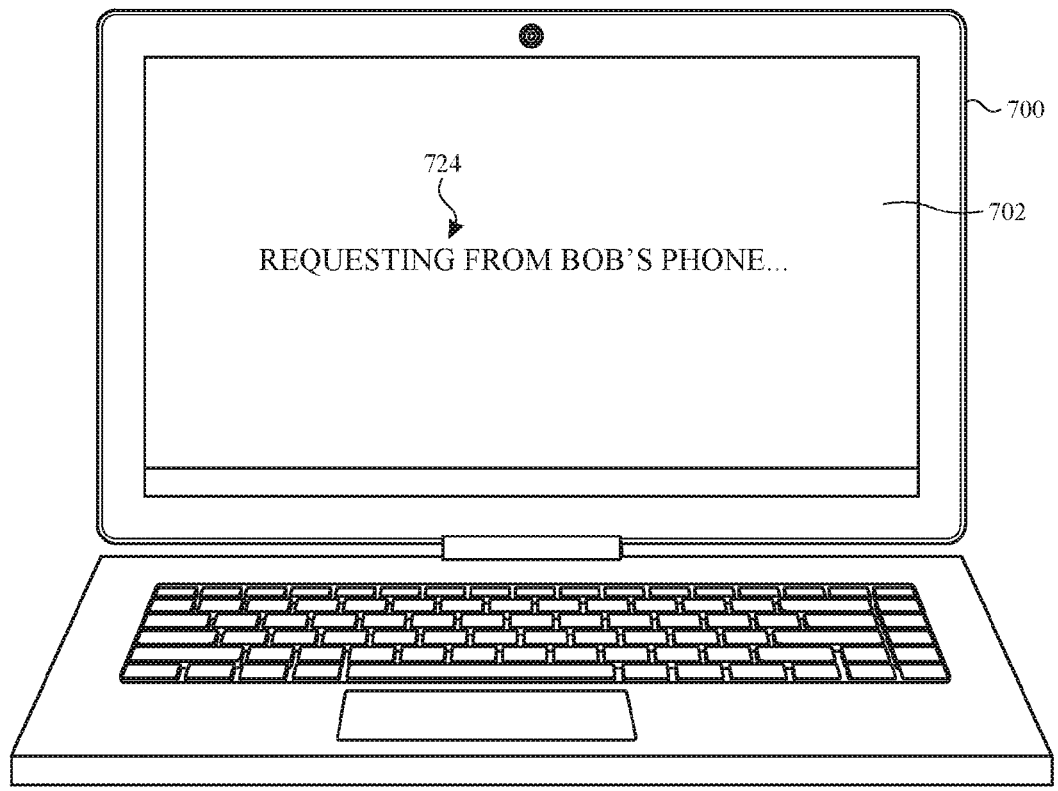
Figure 7G:
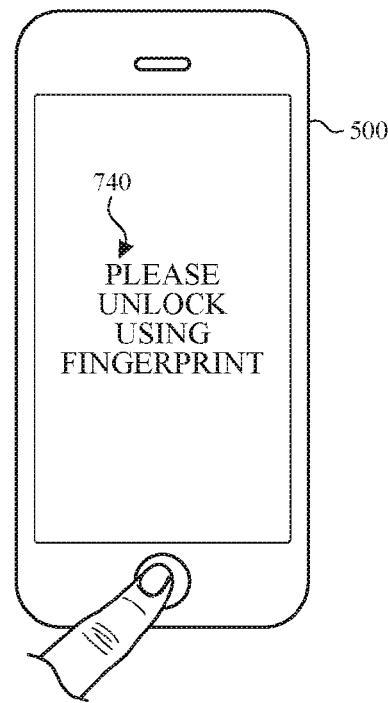

In some examples, as illustrated in FIG. 7G, the authenticating device 500 notifies a user of authenticating device 500 (e.g., by displaying a request 740 and/or generating a haptic vibration) that authorization to unlock the authenticating device 500 has been requested.

In some examples, the authenticating device 500 receives authorization (e.g., via fingerprint or passcode) to unlock the authenticating device (e.g., to transition the authenticating device 500 to an unlocked state). This authorization for unlocking the device is separate and in addition to authorization to proceed with the action. In some examples, the authorization to unlock and the authorization to proceed with the action can be satisfied using the same technique (e.g., using the same fingerprint or the same password). In some examples, the authorization to unlock and the authorization to proceed with the action are satisfied using different techniques (e.g., using a fingerprint for authorization to unlock and a password for authorization to proceed with the action). In some examples, the authorization to unlock and the authorization to proceed with the action are satisfied using the same technique, but with different inputs (e.g., using a first fingerprint for authorization to unlock and a second fingerprint for authorization to proceed with the action; using a first password for authorization to unlock and a second password for authorization to proceed with the action). In response to (or subsequent to) receiving authorization to unlock the authenticating device 500, authenticating device 500 unlocks (e.g., transitioning the authenticating device 500 to an unlocked state).

Figure 7H:
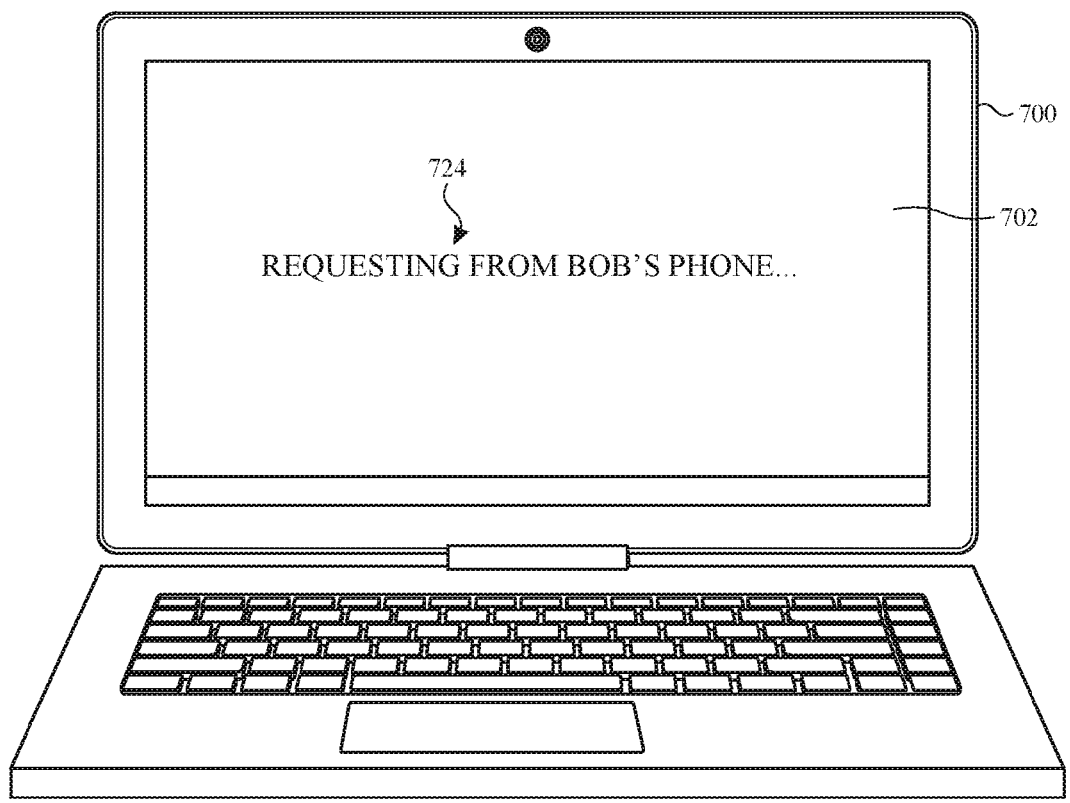
Figure 7H:
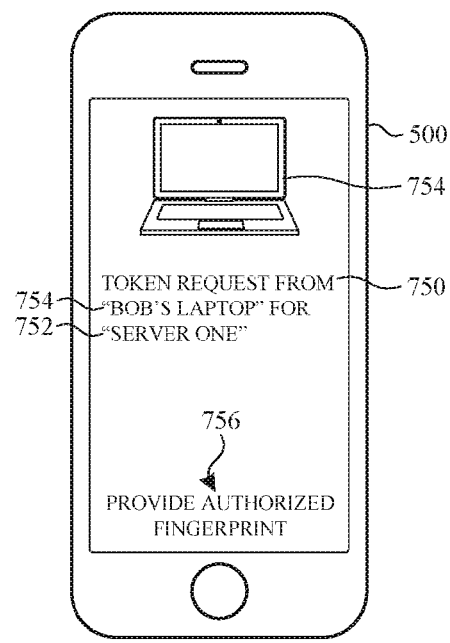

At FIG. 7H, the authenticating device 500 concurrently displays (e.g., in response to receiving the request to proceed with the action; in response to unlocking), on the display of the authenticating device 500, an indication 750 of the request to proceed with the action, the information 752 about the selected one or more options (e.g., name of a remote server for connection; a security token generation algorithm; a length for the to-be-generated security token; one or more products/services for purchase; one or more shipping preferences; or a combination thereof), and an indication 754 of the requesting device 700 (e.g., the name of the requesting device, an identifier of the requesting device, or an icon or image that represents the requesting device, such as a line drawing of a housing of the requesting device).

In some examples, the indication 754 of the requesting device 700 includes a graphical representation of the requesting device 700. In some examples, the graphical representation of the requesting device 700 is an icon representation of the requesting device 700, such as a line drawing of a housing of the device. In some examples, the icon representation includes one or more of: a finish, a form factor, and one or more dimension information of the requesting device 700 to enable a user to quickly and accurately identify the device on which authentication will be requested. For example, the graphical representation may indicate that the requesting device 700 is a gold MacBook® or a 27" iMac®.

The authenticating device 500 displays, on the display of the authenticating device 500, a request 756 for authorization to proceed with the action.

Figure 7I:
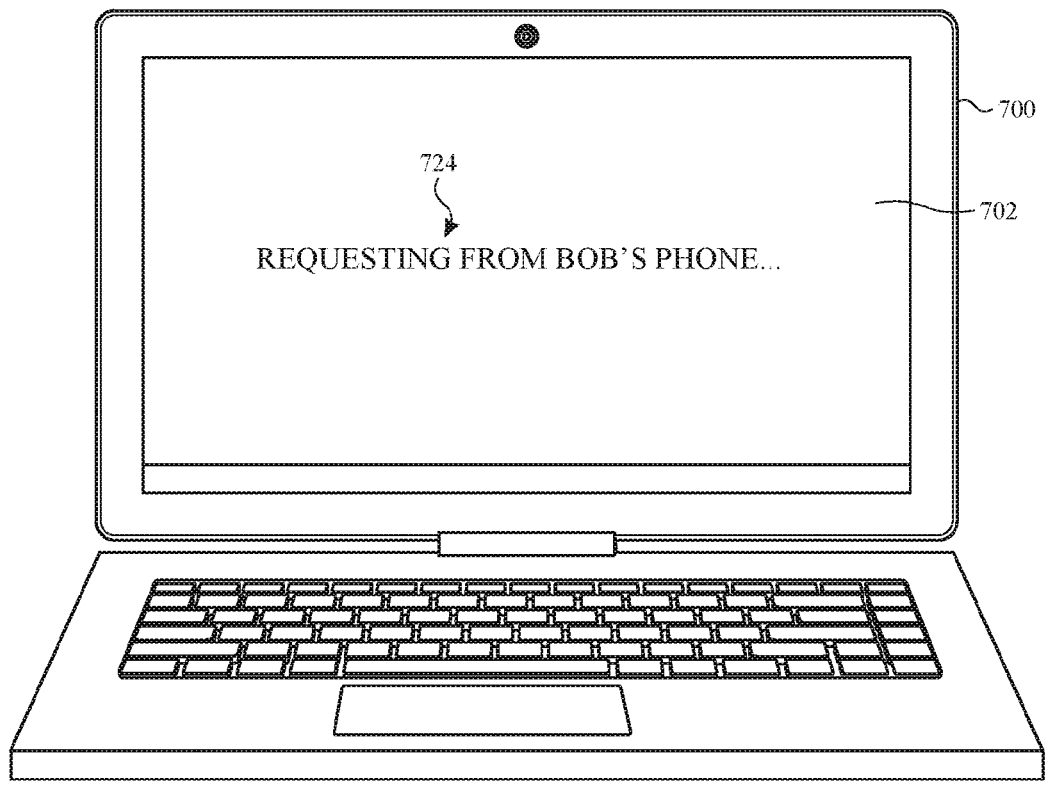
Figure 7I:
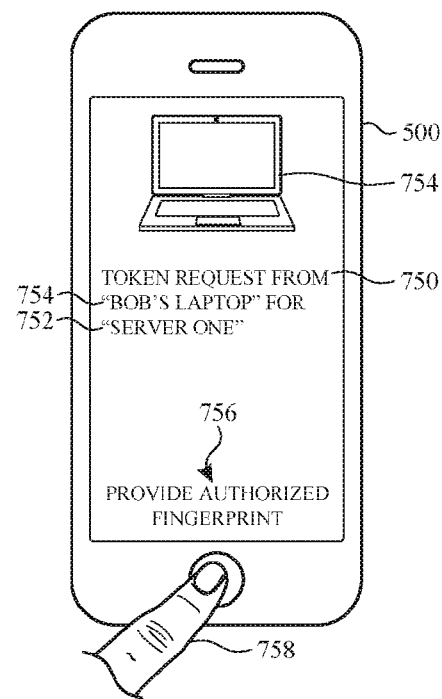

As illustrated in FIG. 7I, the authenticating device 500 receives an input that is responsive to the request for authorization to proceed with the action (e.g., user authentication information, a fingerprint of finger 758, a passcode). For example, the authenticating device 500 receives as input a fingerprint of finger 758 and determines that the fingerprint is consistent with a fingerprint enabled to authorize the authenticating device 500 to proceed with the action.

The authenticating device 500 transmits a response to the request to proceed with the action. For example, the authenticating device 500 transmits the response to the requesting device 700. The response to the request to proceed with the action is based on the input that is responsive to the request for authorization to proceed with the action. In some examples, the authenticating device 500 provides an indication 760 that a response to the request to proceed with the action was sent.

The requesting device 700 receives (e.g., in response to transmitting the request; subsequent to transmitting the request) the response to the request to proceed with the action. For example, the requesting device 700 receives the response to the request to proceed with the action from the authenticating device 500.

Figure 7J:
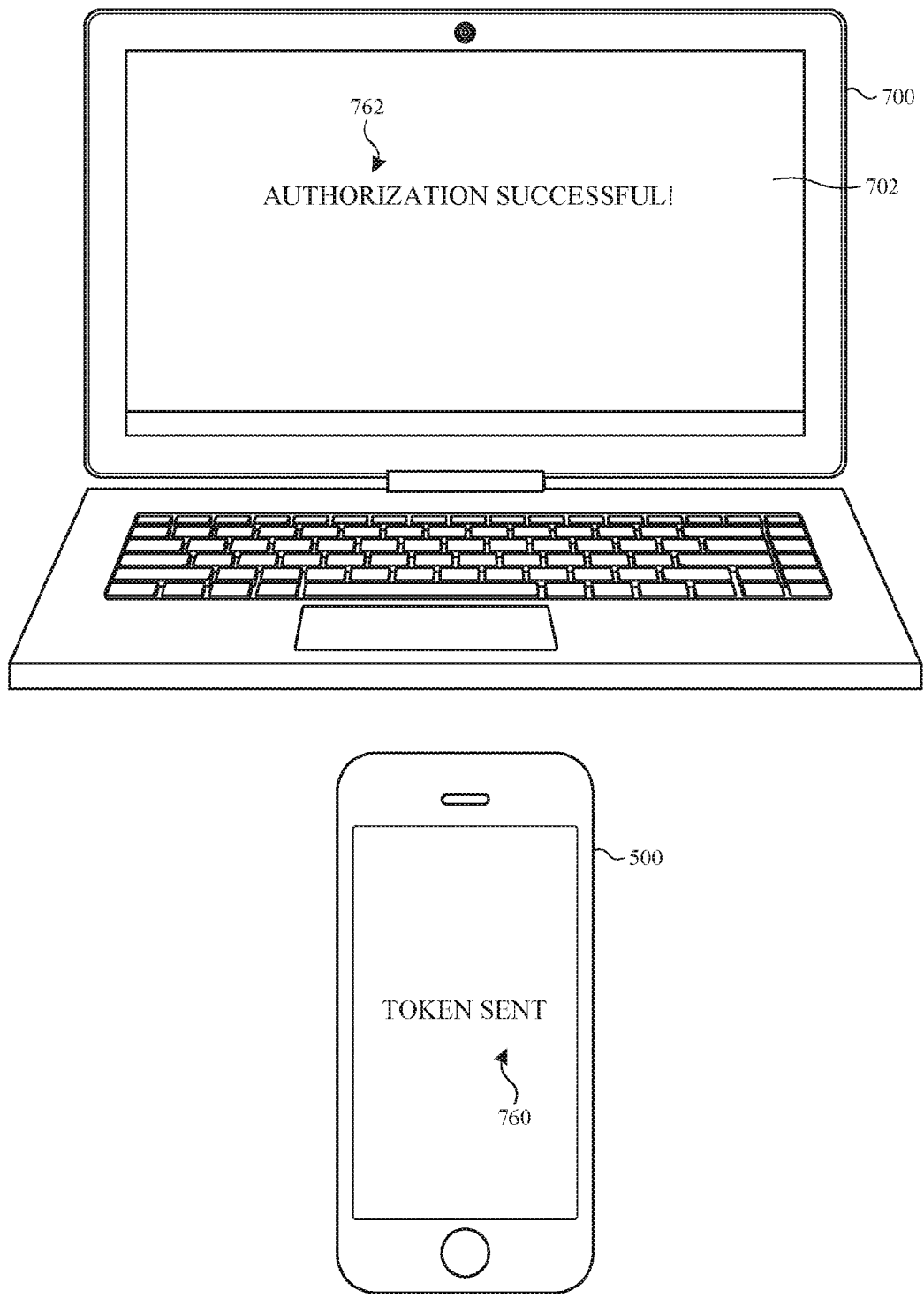

As illustrated in FIG. 7J, in accordance with a determination, at the requesting device 700, that the response to the request to proceed with the action indicates that the authorization at the authenticating device 500 (e.g., a user authentication by the authenticating device 500 based on biometrics, a fingerprint, a password) was successful, the requesting device 700 displays, on the display of the requesting device 700, an indication 762 that the authorization was successful.

Figure 7K:
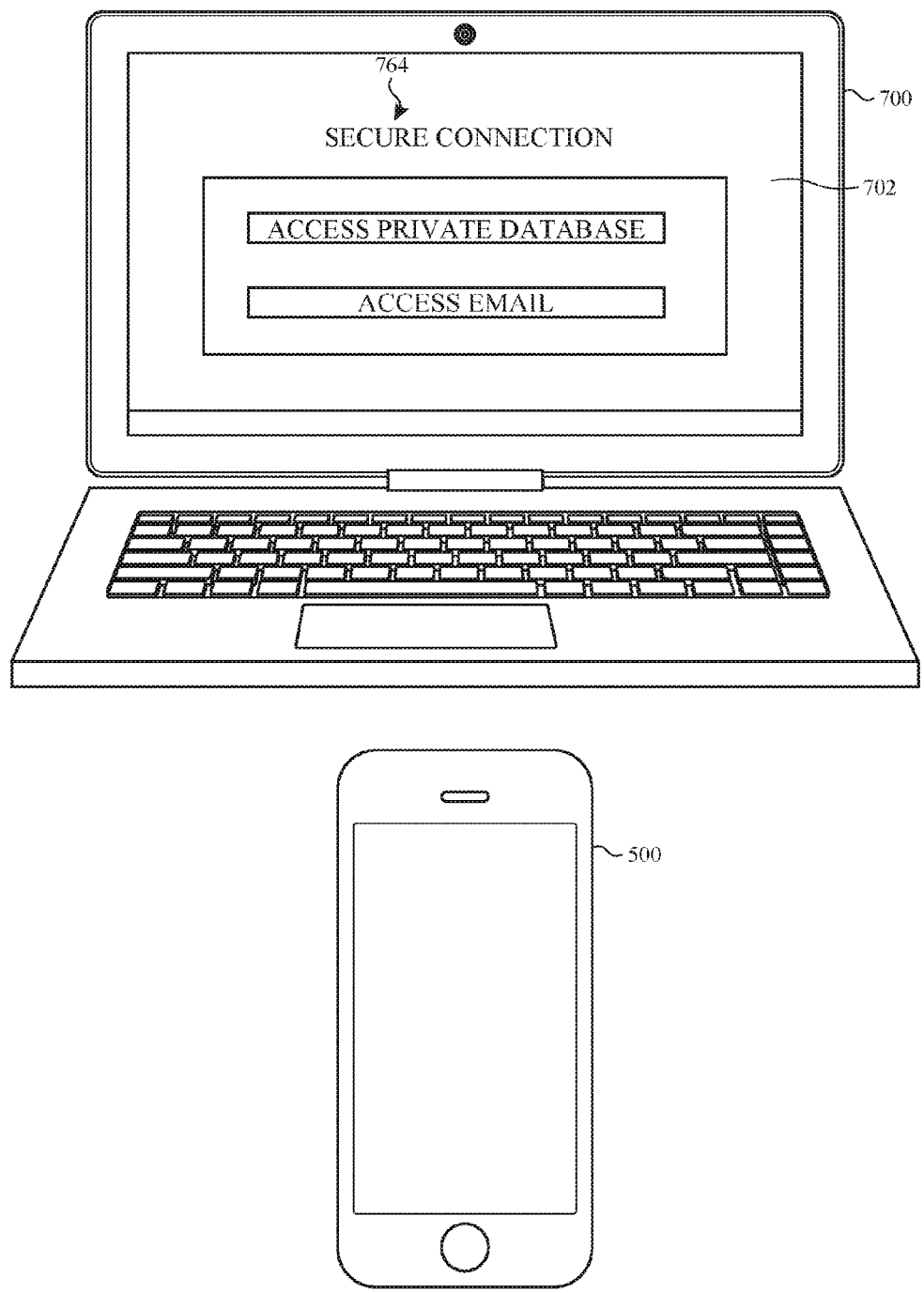

In some examples, as illustrated in FIG. 7K, the requesting device 700 displays an indication 764 that the requesting device 700 (and alternatively or in addition, the authenticating device 500) proceeded with the action.

Figure 7L:
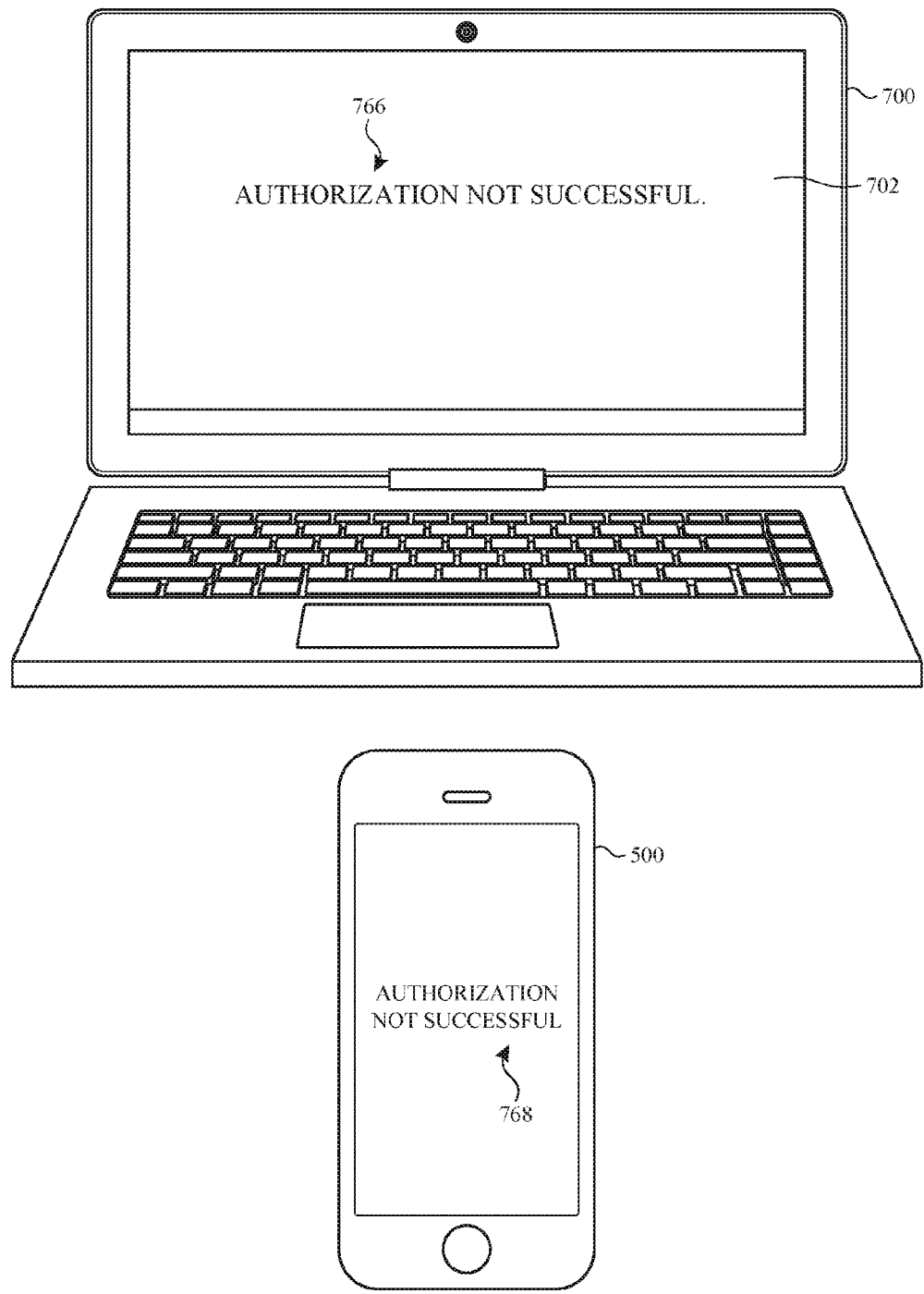

As illustrated in FIG. 7L, in accordance with a determination, at the requesting device 700, that the response to the request to proceed with the action indicates that the authorization (e.g., a user authentication by the authenticating device 500 based on a biometric, a fingerprint, a password) was not successful, the requesting device 700 displays, on the display of the requesting device 700, an indication 766 that the authorization was not successful. The indication 762 that the authorization was successful is different from the indication 766 that the authorization was not successful. In some examples, the authenticating device 500 displays an indication 768 that the authorization was not successful.

In some examples, receiving authorization to proceed with the action includes receiving a passcode via a touch-sensitive surface of the authenticating device 500, the passcode being determined to be consistent with an enrolled passcode that is enabled to authorize the action. In some examples, authorization to proceed includes detecting a fingerprint using a fingerprint sensor, the fingerprint being determined to be consistent with an enrolled fingerprint that is enabled to authorize the action. For example, the authenticating device 500 stores information about one or more fingerprints of the user to use for determining whether a respective fingerprint is enabled to authorize the action. In some examples, authorization to proceed includes receiving a double-press of a mechanical button while the device is in an unlocked state (and, optionally, while the device has continuously been on a user's wrist since the device was unlocked by providing authentication credentials to the device, where the continuous presence of the device on the user's wrist is determined by periodically checking that the device is in contact with the user's skin).

In some examples, the authenticating device 500 includes hardware (e.g., a hardware token generator, a secure element) configured to respond (e.g., by generating or providing a token, by generating or providing payment information) to the input that is responsive to the request for authorization to proceed with the action and the requesting device 700 does not include the hardware (e.g., the hardware token generator, a secure element). Thus, the user is able to take advantage of the hardware capabilities of a device (e.g., the authenticating device 500) while using (or performing tasks on) a different device (e.g., the requesting device 700).

FIGS. 8A-8M illustrate exemplary user interfaces for managing a remote authorization to proceed with a payment transaction, in accordance with some embodiments. The user interfaces in these figures are used to illustrate the processes described below, including the processes in FIGS. 9-11.

Figure 8A:
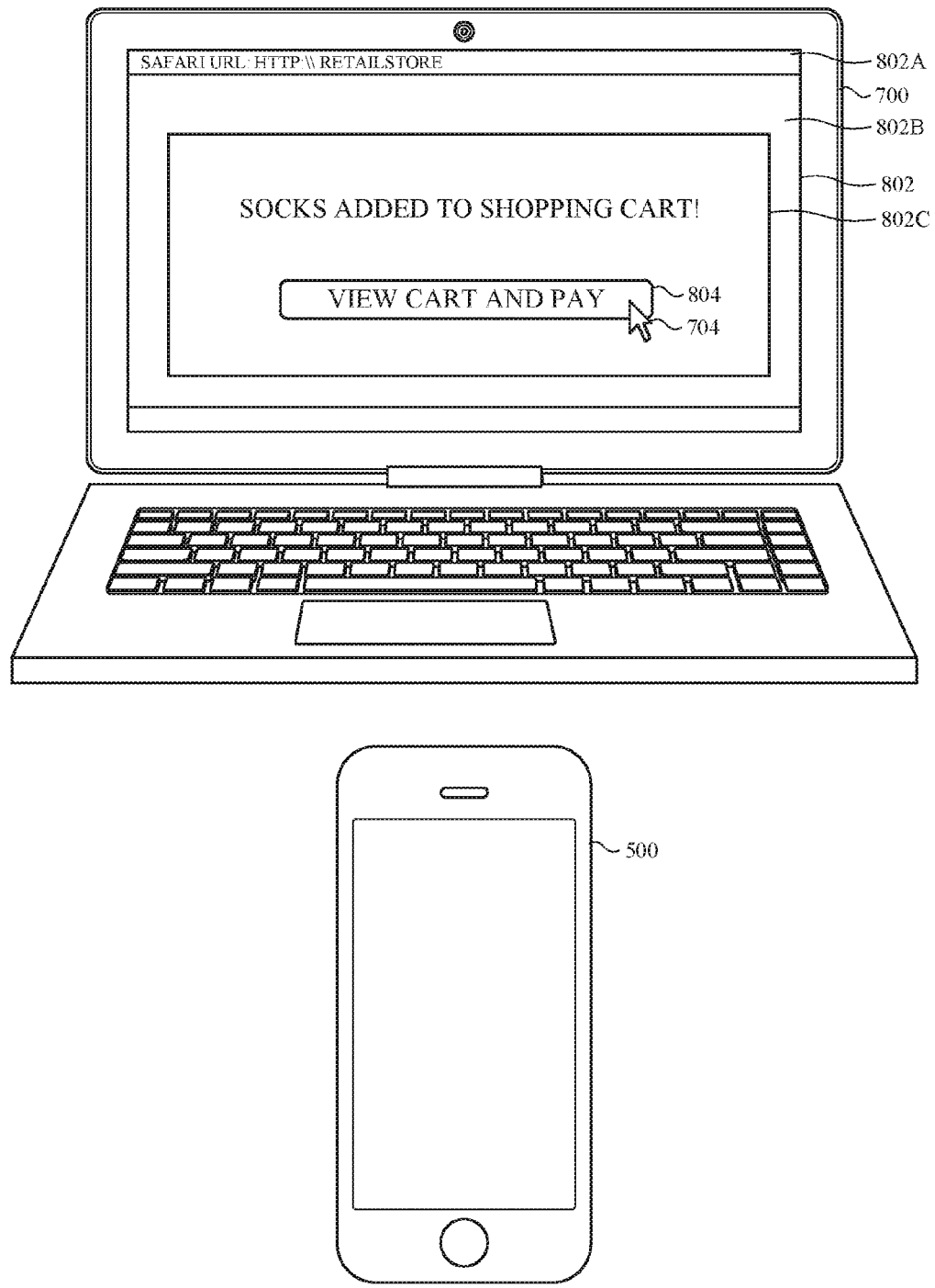
FIGS. 8A-8M illustrate exemplary user interfaces for managing a remote authorization to proceed with an action, in accordance with some embodiments.

FIG. 8A illustrates requesting device 700 (e.g., an electronic device, such as a laptop computer with a display, that does not have a secure element) and authenticating device 500 (e.g., an electronic device, such as a smartphone, with a display that does have a secure element). In some examples, the authenticating device 500 includes hardware (e.g., a secure element) capable of certain functionality (e.g., such as generating payment account information for use in a payment transaction), while the requesting device 700 does not include the hardware and is not capable of performing the functionality. By using remote authorization in such a scenario, a user is able to take advantage of the hardware capabilities of a device (e.g., the authenticating device 500) while using (or performing tasks on) a different device (e.g., the requesting device 700). For example, a user can browse websites and select items for purchase using a requesting device 700, and use authenticating device 500 for proceeding with a payment for the selected items.

Requesting device 700 displays a user interface 802 of a computer application. In this example, the application is a web browser application that is configured to retrieve and display webpages, such as through the retrieval and display of markup language. In some examples, requesting device 700 receives user input causing it to navigate to a web address. User interface 802 includes a URI/URL field 802A, which displays the web address. In some examples, retrieved webpages are displayed in a first portion 802C (e.g., a webpage-displaying portion) of the user interface 802 that is different from a second portion 802B (e.g., a non-webpage-displaying portion) of the user interface 802. In some examples, the second portion is a status bar, a non-webpage-displaying portion, or the like. In some examples, the web browser application is configured to display retrieved webpages in the first portion 802C and is not configured to display retrieved webpages in the second portion 802B. This allows the user to differentiate between content displayed as the result of a rendered webpage (e.g., in the first portion 802C) and content displayed as the result of content provided by the web browser application (e.g., in the second portion 802B).

At FIG. 8A, requesting device 700 has navigated a website and received user instructions to add one or more items to a virtual shopping cart. Requesting device 700 displays an affordance 804, which when activated, transitions to (e.g., causes display of) a checkout webpage 805 of FIG. 8B. In some examples, the affordance 804 is displayed in the first portion 802C of the user interface 802 of the web browser application.

Figure 8B:
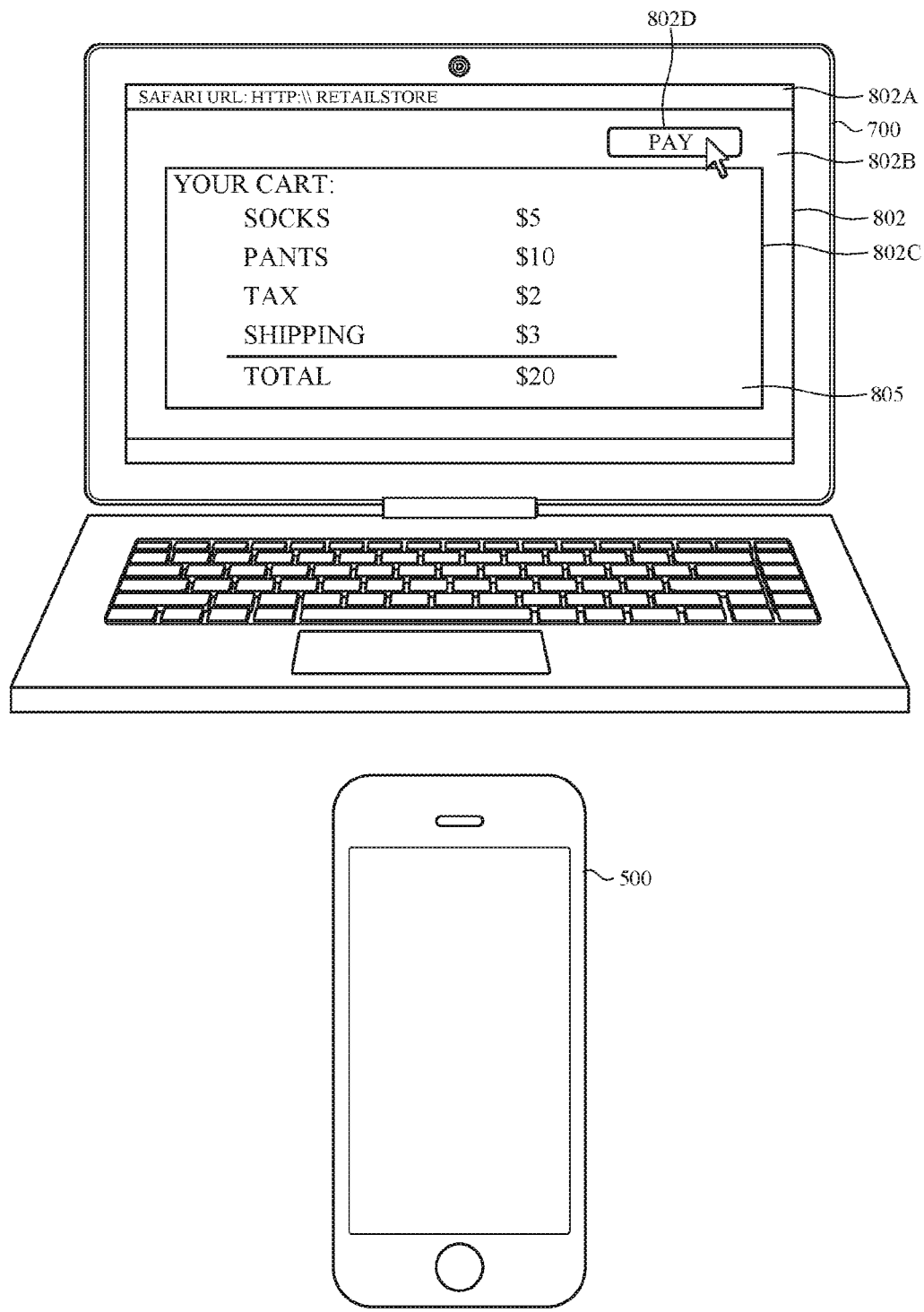

At FIG. 8B, requesting device 700 displays (e.g., in the first portion 802C) the checkout webpage (e.g., in response to detecting activation of affordance 804). In accordance with a determination that a set of one or more transaction conditions are met, the requesting device 700 displays an affordance 802D (e.g., in the second portion 802B, in the first portion 802C). For example, the set of one or more transaction conditions include one or more of: (1) a condition that is met when a remote server (e.g., that provided the checkout webpage for display) requests that a payment affordance be displayed, (2) a condition that is met when the requesting device 700 determines that a remote server (e.g., that provided the checkout webpage for display) is configured to accept payments using a particular payment method, and (3) a condition that is met when the requesting device 700 determines that the displayed webpage includes a request for payment that, for example, is displayed in the first portion 802C. The affordance 802D, when activated, causes display of a payment sheet 802E. In some examples, the payment sheet 802E is a user interface of the operating system of the requesting device. In some embodiments, the payment sheet 802E is part of a first-party application provided by a provider of the operating system of the requesting device.

Figure 8C:
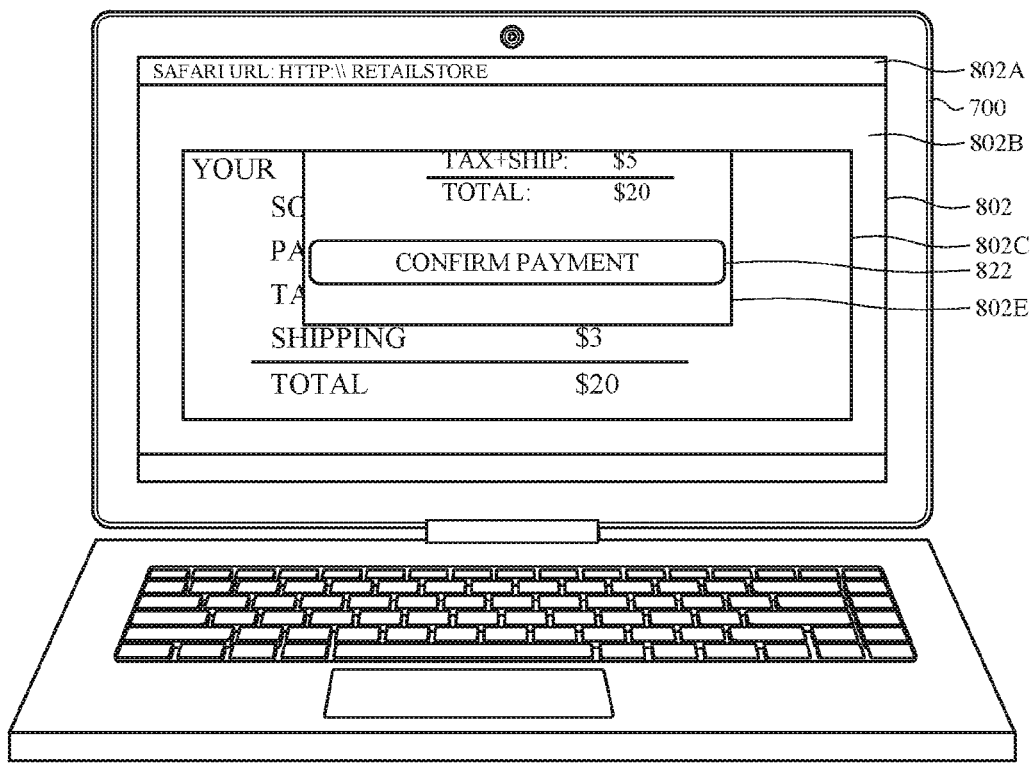
Figure 1:
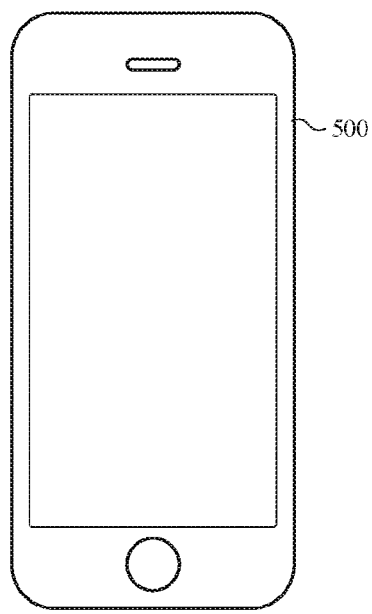
Figure 2:
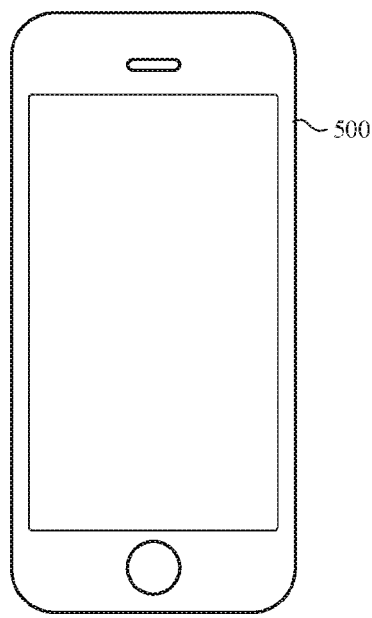

In some examples, as illustrated in FIGS. 8C-1 and 8C-2, the payment sheet 802E slides into display (e.g., into view on the display) in response to activation of the affordance 802D. In some examples, the payment sheet 802E at least partially obscures the checkout webpage displayed in the first portion 802C. In some examples, the payment sheet 802E at least partially obscures the second portion 802B. In some examples, the payment sheet 802E is not a part of the first portion 802C or the second portion 802C, but rather overlays the two portions.

The payment sheet 802E includes one or more options for selection. The one or more options include, for example, one or more of: one or more products/services for purchase, one or more shipping preferences (e.g., a shipping address), one or more payment accounts, one or more authenticating devices, and a contact name.

In some examples, the payment sheet 802E includes an indication of a default payment account 802G associated with an authenticating device (e.g., a default authenticating device). In some examples, the payment sheet 802E includes a user-configurable "ship to" mailing address. For example, the requesting device 700 populates the mailing address field based on information stored at the requesting device 700 (e.g., based on profile information or a default contact address stored in a contacts application). In some examples, the requesting device 700 receives user-selection of an address for use as the mailing address. In some examples, the payment sheet 802E includes a user-configurable contact name. The requesting device 700 populates the contact name field based on information stored at the requesting device 700 (e.g., based on profile information or a default contact name stored in a contacts application). In some examples, the payment sheet 802E includes a total cost, tax amount, and/or shipping cost of a payment transaction. By receiving selection of various options, the requesting device accounts for the user's purchase preferences.

Figure 8C:
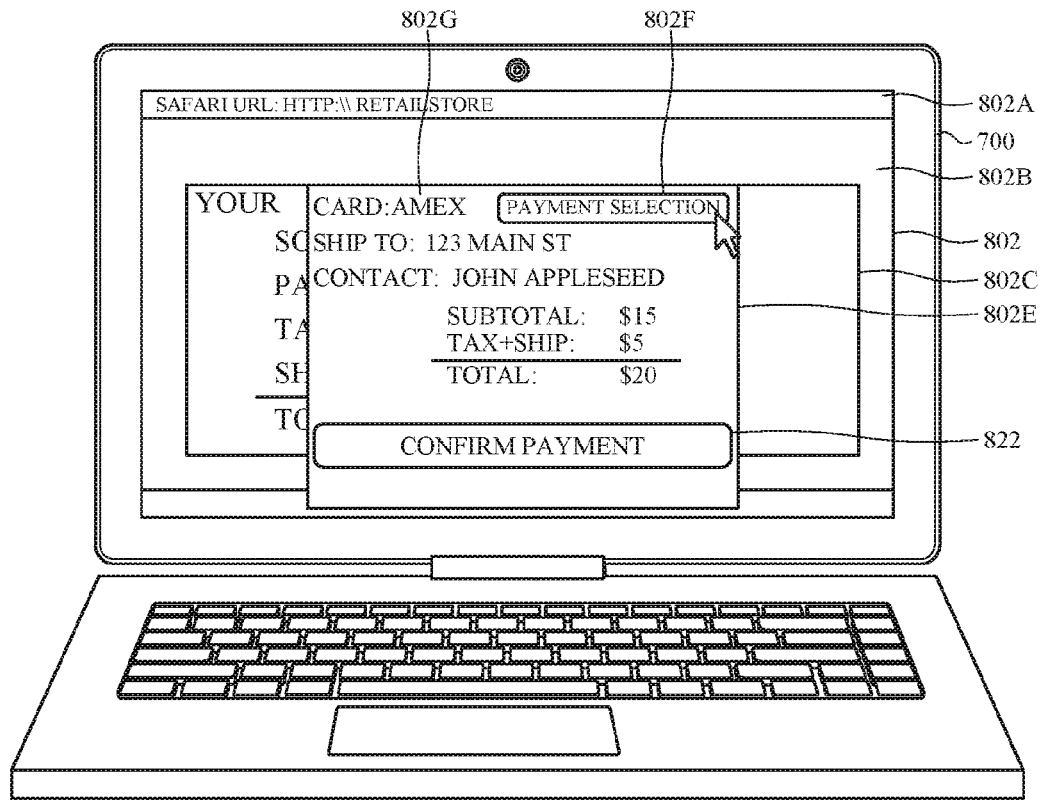
Figure 8D:
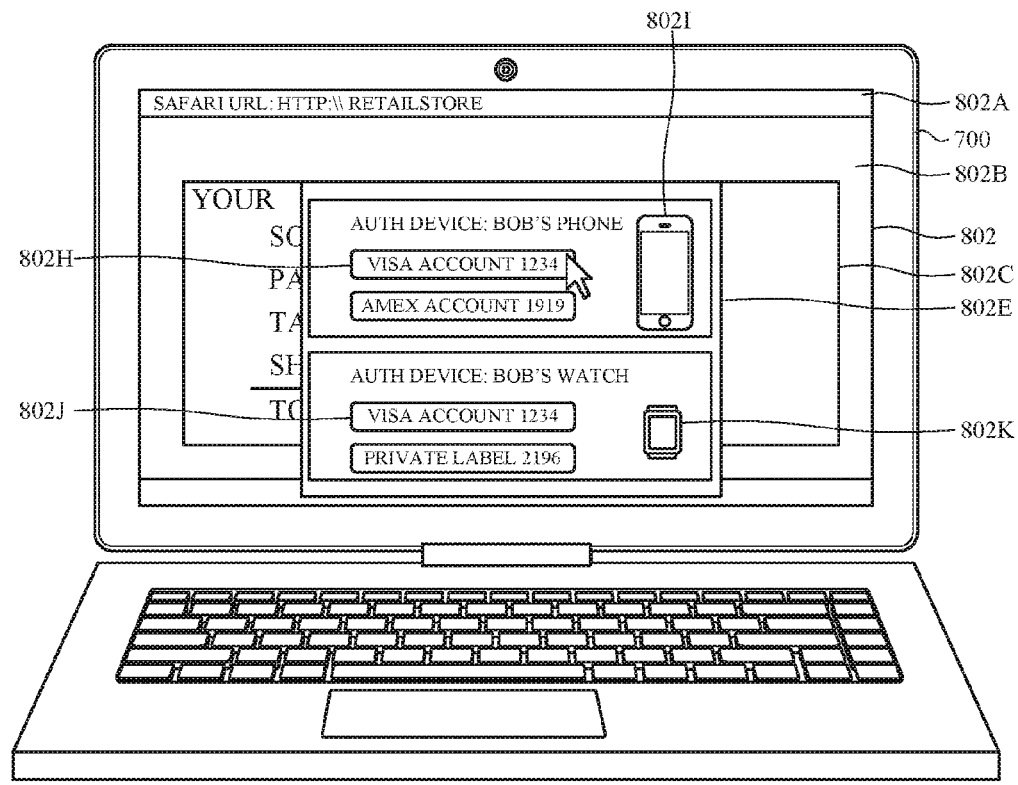
Figure 8D:
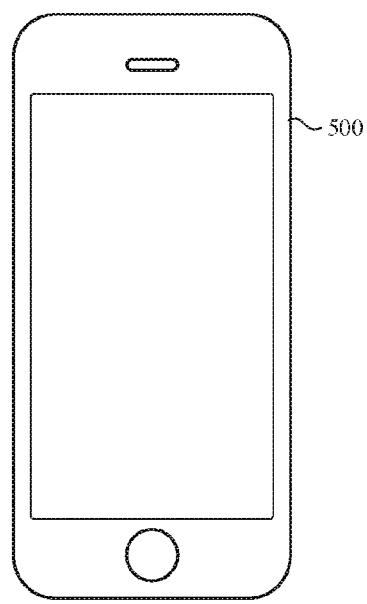

In some examples, payment sheet 802E includes a payment option 802F, which when activated, causes display of options for a plurality of payment accounts associated with corresponding authenticating devices, as illustrated in FIG. 8D. In some embodiments, a first payment account (e.g., indicated by option 802H) is associated with a first authenticating device (e.g., indicated by graphical indication 802I of the first authenticating device) and a second payment account (e.g., indicated by option 802J) corresponds to a second authenticating device (e.g., indicated by graphical indication 802K of the second authenticating device) that is different from the first authenticating device. For example, the payment accounts are grouped according to their corresponding authenticating device or are displayed along with graphical or textual indications of which authenticating device corresponds to each of the payment accounts. In some examples, a first area includes one or more (or a plurality of) indications of payment accounts associated with the first authenticating device and a second area different from the first area includes one or more (or a plurality of) indications of payment accounts associated with the second authenticating device. In some examples, at least some of the payment accounts associated with the first authenticating device are different than the payment accounts associated with the second authenticating device. By receiving selection of a payment account from among the various payment accounts that have been provisioned on the user's various personal devices, the requesting device accounts for the user's payment preference.

In some examples, requesting device 700 receives selection of an option 802H corresponding to a respective payment account from among the options for the plurality of payment accounts. In response to receiving selection of the option 802H corresponding to the respective payment account, requesting device 700 selects the respective authenticating device (e.g., as indicated by graphical indication 802I of the first authenticating device) based on the selected option 802H corresponding to the respective payment account. In this example, the display of authenticating device 500 is not displaying anything (e.g., the display is turned off). In response to receiving selection of the option 802H corresponding to a respective payment account from among the options for the plurality of payment accounts, the requesting device displays the exemplary user interface illustrated in FIG. 8E.

In some examples, the requesting device is a smart phone. In some examples, the smart phone displays a user interface for a web browser application. In some examples, the smart phone displays a user interface for an application that has been downloaded from a remote server and installed on the smart phone. In some examples, the smart phone detects activation of an affordance (e.g., 802D), and, in response displays a payment sheet (e.g., 802E). In some examples, the requesting device is a smart watch. In some examples, the smart watch displays a user interface for an application that has been downloaded from a remote server and installed on the smart watch. In some examples, the smart watch detects activation of an affordance (e.g., 802D), and, in response displays a payment sheet (e.g., 802E).

Figure 8E:
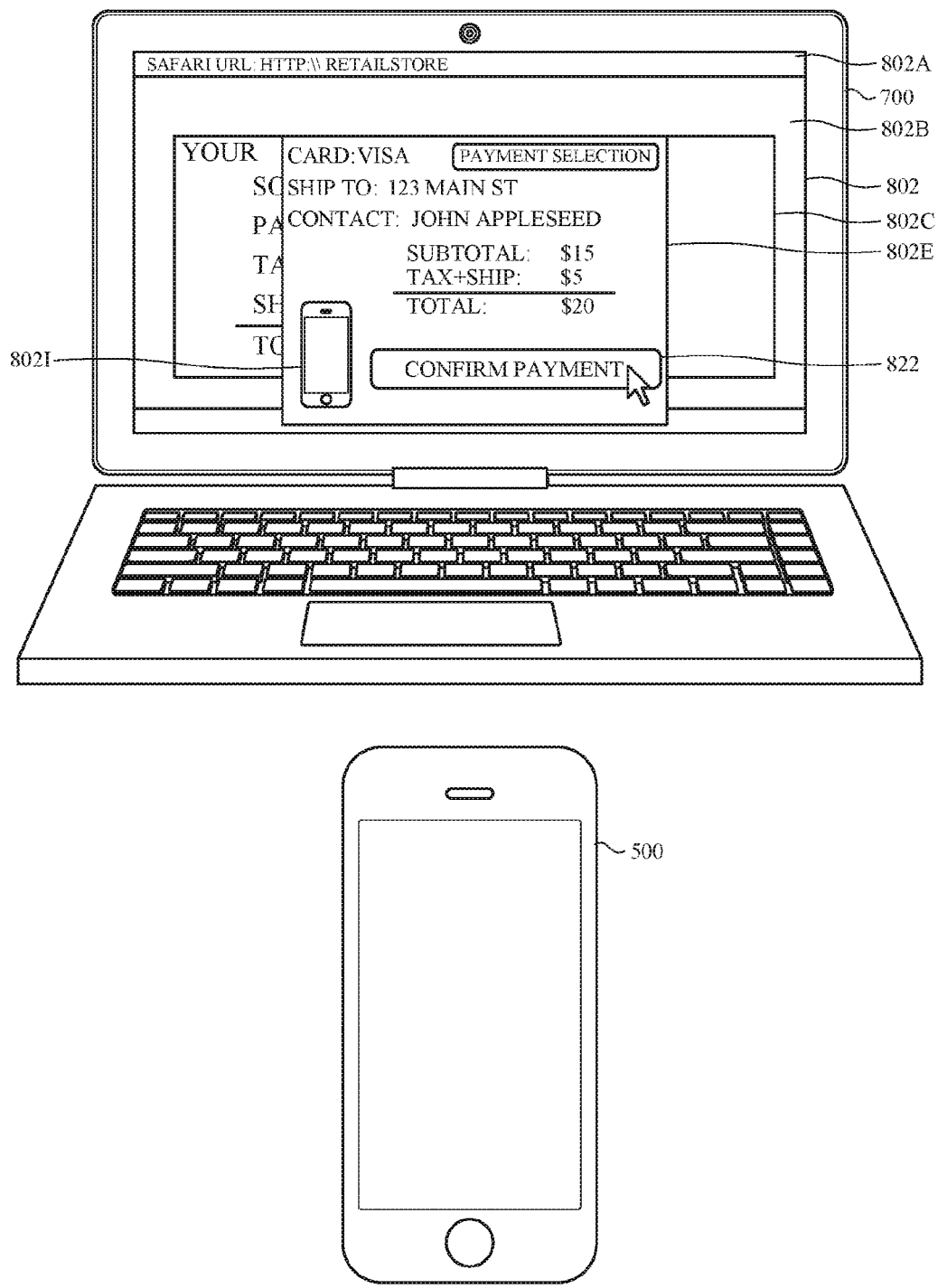

At FIG. 8E, after the requesting device 700 receives selection of the one or more options (e.g., receiving user selection of a contact name; receiving user selection of a payment account; receiving selection of an authenticating device; receiving selection of one or more products/services for purchase; receiving selection of one or more shipping preferences; or a combination of these), the requesting device 700 receives selection of an option 822 (e.g., detecting user activation of a "confirm" affordance or a "make payment" affordance) to proceed with an action (e.g., proceeding with a payment transaction) associated with the selected one or more options (e.g., 802H). In some examples, the action is based on the selected one or more options (e.g., 802H). In some examples, a plurality of the one or more options is selected.

The requesting device 700 transmits a request to proceed with the action. The request includes information about (or based on) the selected one or more options. In some examples, the requesting device 700 transmits the request to proceed with the action to the authenticating device 500 based on the received input selecting the option 802H corresponding to the authenticating device.

Figure 8F:
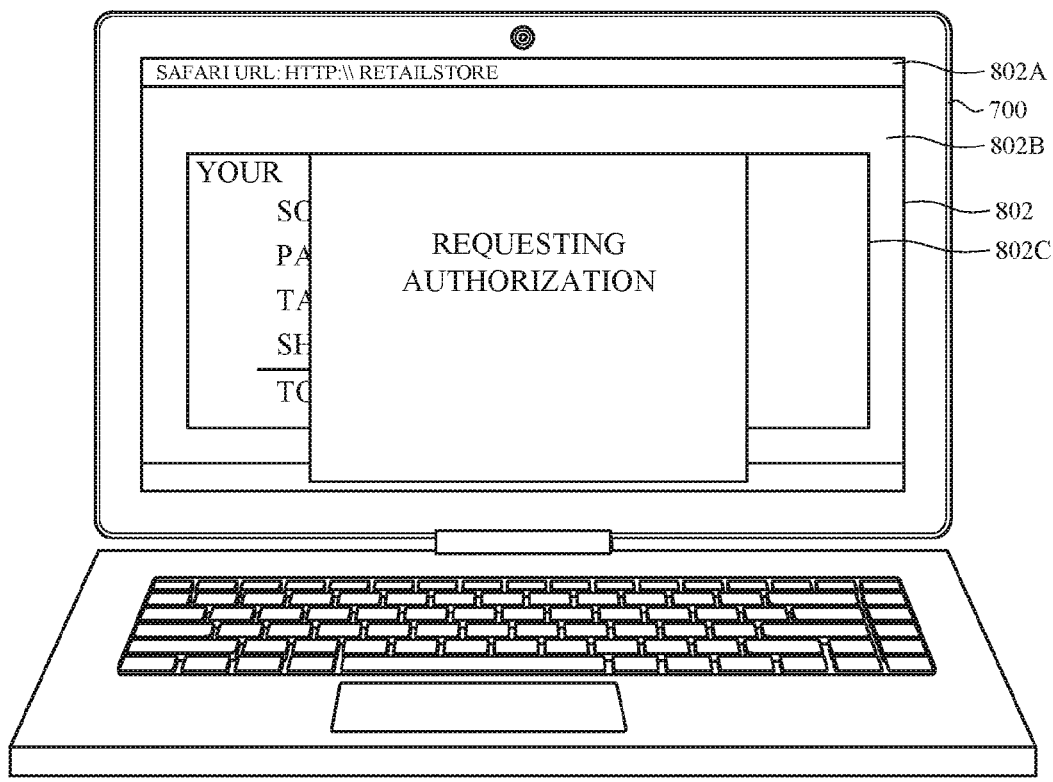
Figure 8F:
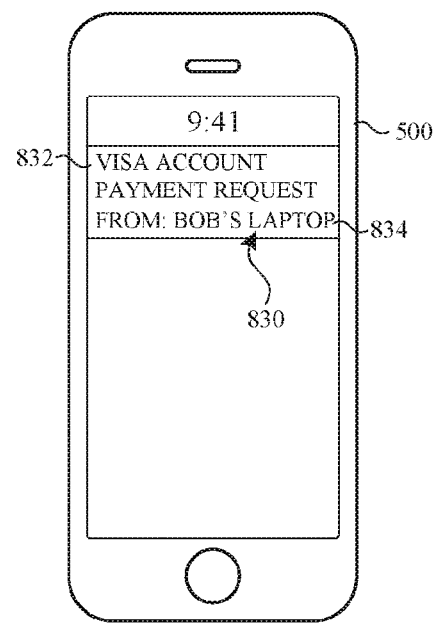

As illustrated in FIG. 8F, the authenticating device 500 receives the request to proceed with the action. The transmission from the requesting device 700 to the authenticating device 500 is direct or indirect, such as through an intermediary device.

In response to receiving the request to proceed with the action, the authenticating device 500 displays (while remaining in the locked state), on the display, a request notification 830 (e.g., on the lock screen of the authenticating device 500). In some examples, the authenticating device 500 is in a locked state when receiving the request to proceed with the action. In some examples, the request notification 830 includes one or more of the information 832 about (or based on) the selected one or more options and an indication 834 of the requesting device 700.

Figure 8G:
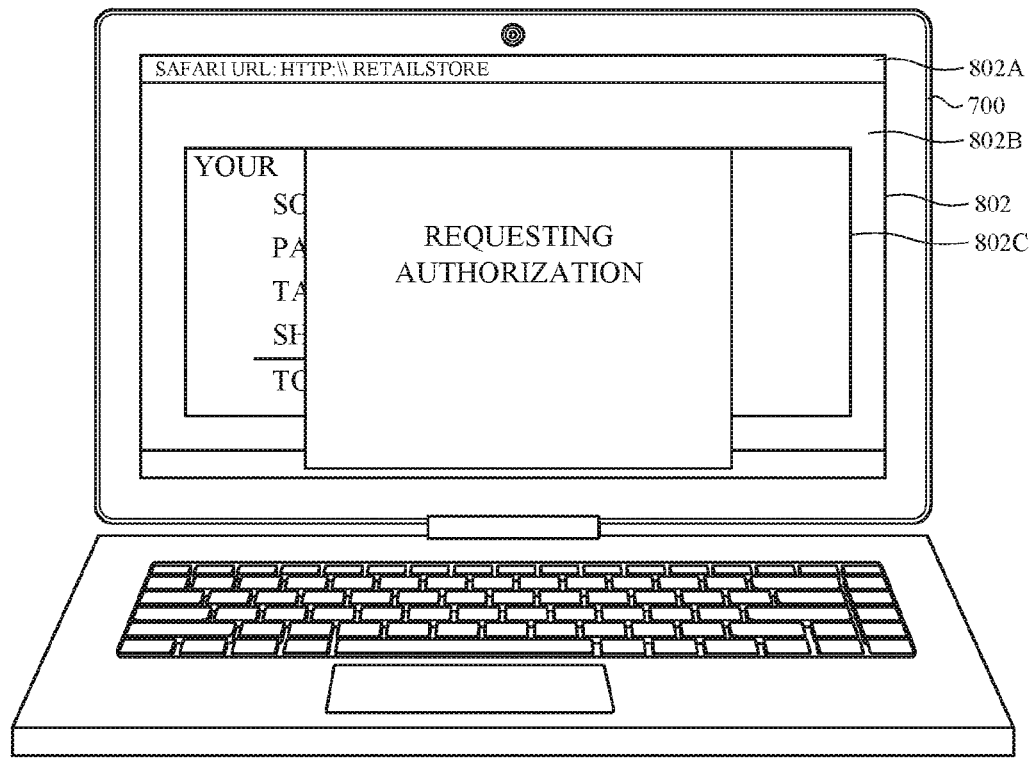
Figure 8G:
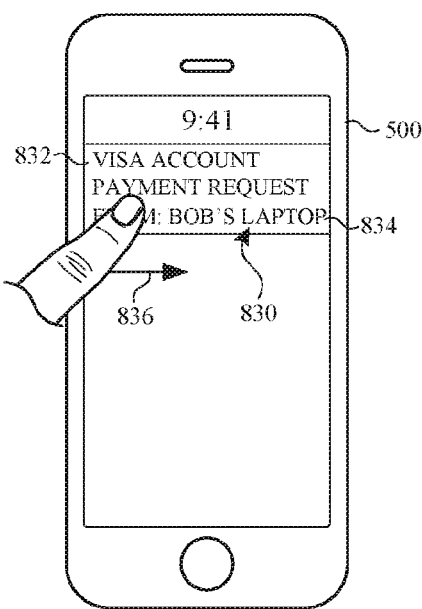

In some examples, as illustrated in FIG. 8G, the authenticating device 500 receives input activating the request notification 830 (e.g., receiving a user swipe gesture 836 to slide the request notification 830 beyond a threshold distance or a user input gesture pressing on the notification with a characteristic intensity above a respective threshold intensity).

Figure 8H:
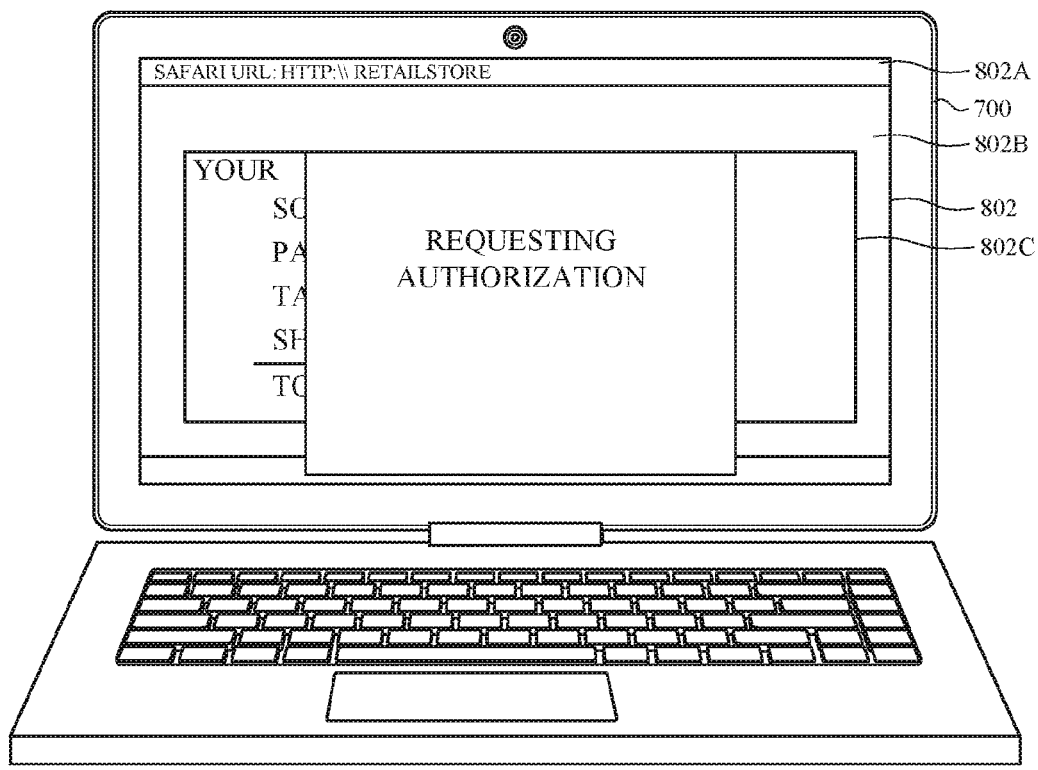
Figure 8H:
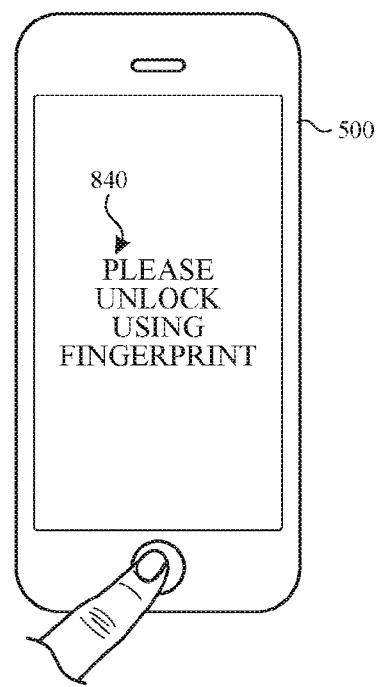

In some examples, as illustrated in FIG. 8H, the authenticating device 500 requests (e.g., by displaying a request 840 and/or causing a haptic vibration) authorization to unlock the authenticating device 500.

In some examples, the authenticating device 500 receives authorization (e.g., via fingerprint or passcode) to unlock the authenticating device (e.g., to transition the authenticating device 500 to an unlocked state). This authorization for unlocking the device is separate and in addition to authorization to proceed with the action. In some examples, the authorization to unlock and the authorization to proceed with the action can be satisfied using the same technique (e.g., using the same fingerprint or the same password). In some examples, the authorization to unlock and the authorization to proceed with the action are satisfied using different techniques (e.g., using a fingerprint for authorization to unlock and a password for authorization to proceed with the action). In some examples, the authorization to unlock and the authorization to proceed with the action are satisfied using the same technique, but with different inputs (e.g., using a first fingerprint for authorization to unlock and a second fingerprint for authorization to proceed with the action; using a first password for authorization to unlock and a second password for authorization to proceed with the action). In response to (or subsequent to) receiving authorization to unlock the authenticating device 500, authenticating device 500 unlocks (e.g., transitioning the authenticating device 500 to an unlocked state).

Figure 8I:
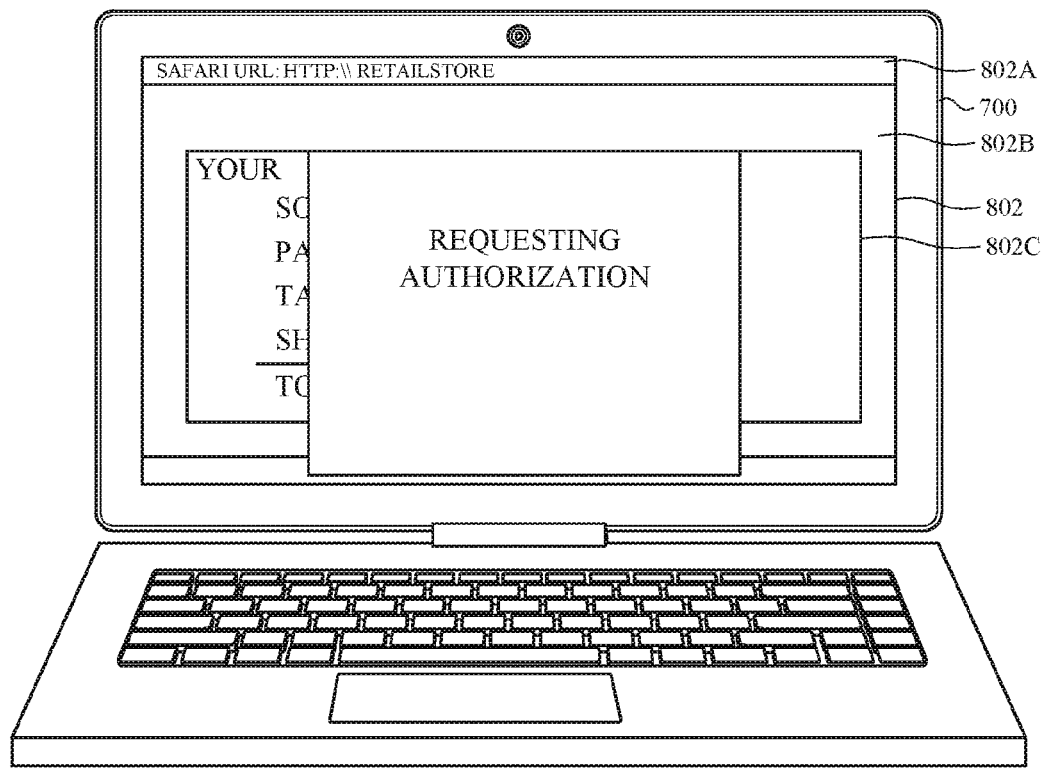
Figure 8I:
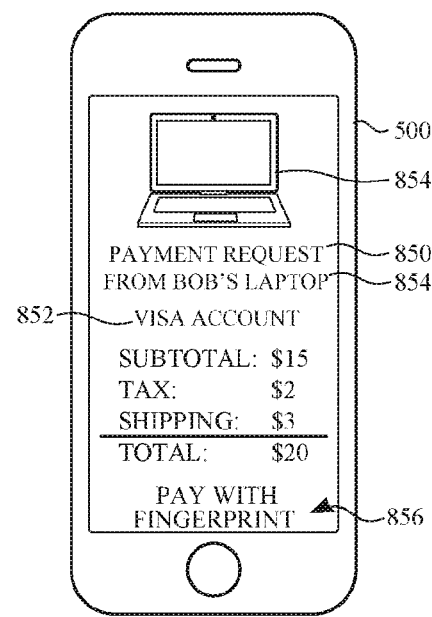
Figure 8J:
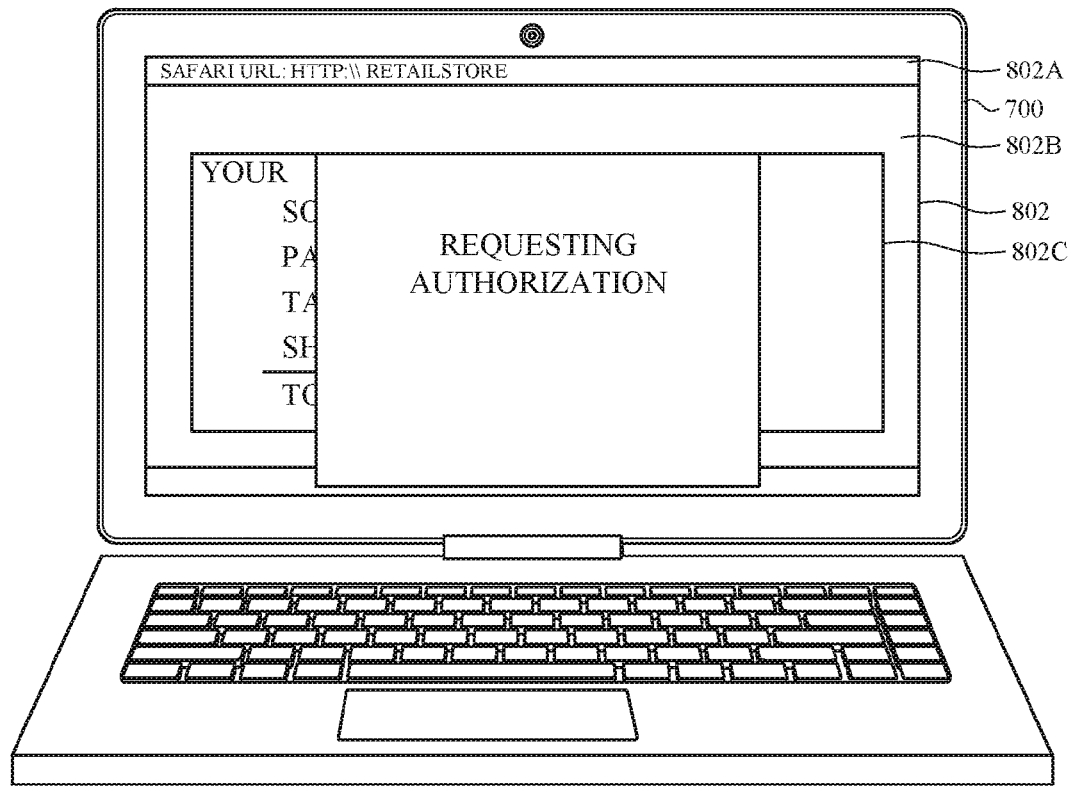
Figure 8J:
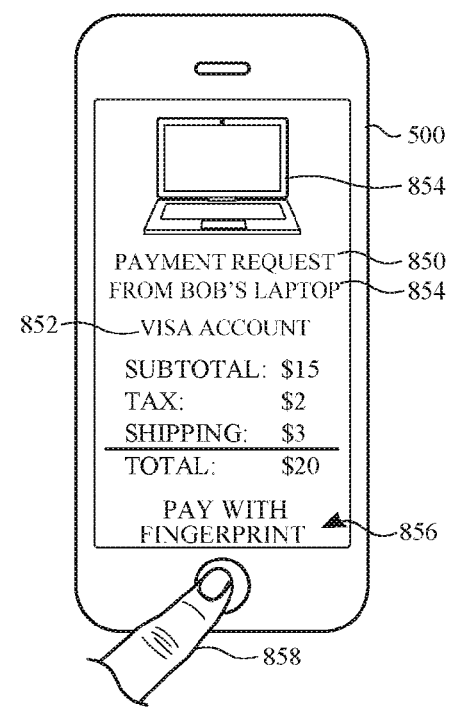

At FIG. 8I, the authenticating device 500 concurrently displays (e.g., in response to receiving the request to proceed with the action; in response to unlocking), on the display of the authenticating device 500, an indication 850 of the request to proceed with the action, the information 852 about the selected one or more options (e.g., selection of a contact name; selection of a payment account; selection of an authenticating device; selection of one or more products/services for purchase; selection of one or more shipping preferences; or a combination thereof), and an indication 854 of the requesting device 700 (e.g., the name of the requesting device, an identifier of the requesting device, or an icon or image that represents the requesting device, such as a line drawing of a housing of the requesting device).

In some examples, the indication 854 of the requesting device 700 includes a graphical representation of the requesting device 700. In some examples, the graphical representation of the requesting device 700 is an icon representation of the requesting device 700, such as a line drawing of a housing of the device. In some examples, the icon representation includes one or more of: a finish, a form factor, and one or more dimension information of the requesting device 700. For example, the graphical representation may indicate that the requesting device 700 is a gold MacBook® or a 27" iMac®.

The authenticating device 500 displays, on the display of the authenticating device 500, a request 856 for authorization to proceed with the action.

Figure 8K:
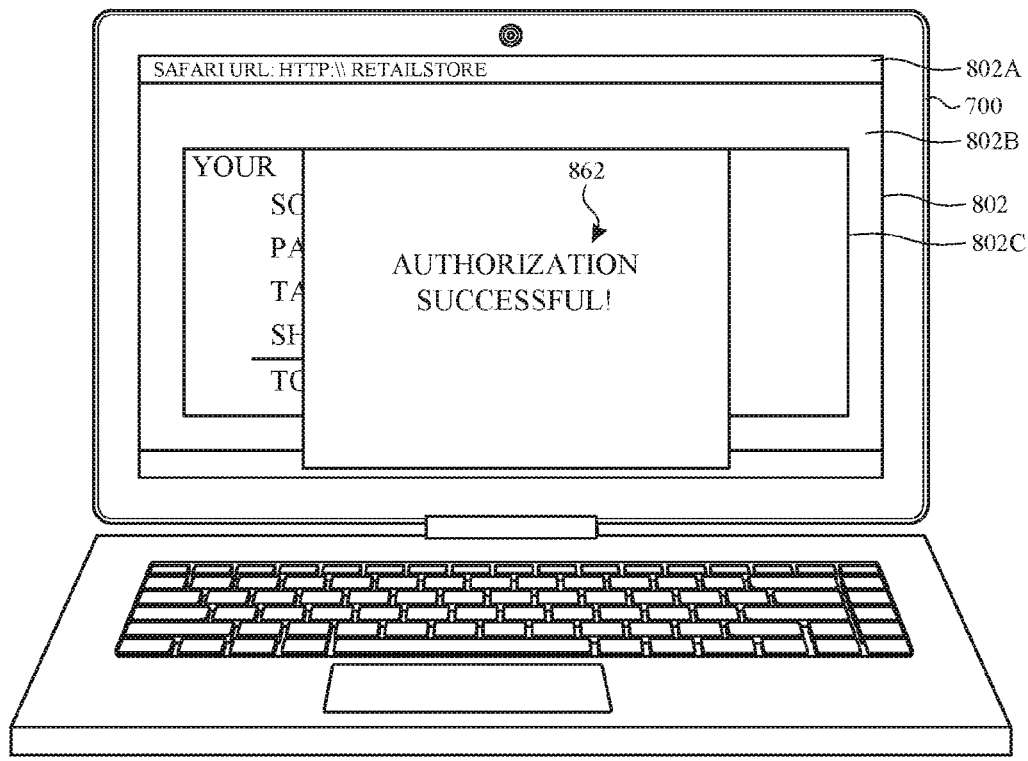
Figure 8K:
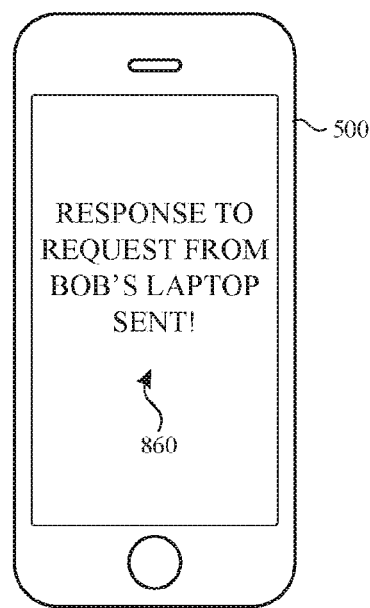

As illustrated in FIG. 8K, the authenticating device 500 receives an input that is responsive to the request for authorization to proceed with the action (e.g., user authentication information, a fingerprint of finger 858, a passcode). For example, the authenticating device 500 receives as input a fingerprint of finger 858 and determines that the fingerprint is consistent with a fingerprint enabled to authorize to proceed with the action.

The authenticating device 500 transmits a response to the request to proceed with the action. For example, the authenticating device 500 transmits the response to the requesting device 700. The response to the request to proceed with the action is based on the input that is responsive to the request for authorization to proceed with the action. In some examples, the authenticating device 500 provides an indication 860 that a response to the request to proceed with the action was sent.

The requesting device 700 receives (e.g., in response to transmitting the request; subsequent to transmitting the request) the response to the request to proceed with the action. For example, the requesting device 700 receives the response to the request to proceed with the action from the authenticating device 500.

As illustrated in FIG. 8K, in accordance with a determination, at the requesting device 700, that the response to the request to proceed with the action indicates that the authorization at the authenticating device 500 (e.g., a user authentication by the authenticating device 500 based on a biometric, a fingerprint, a password) was successful, the requesting device 700 displays, on the display of the requesting device 700, an indication 862 that the authorization was successful.

Figure 8L:
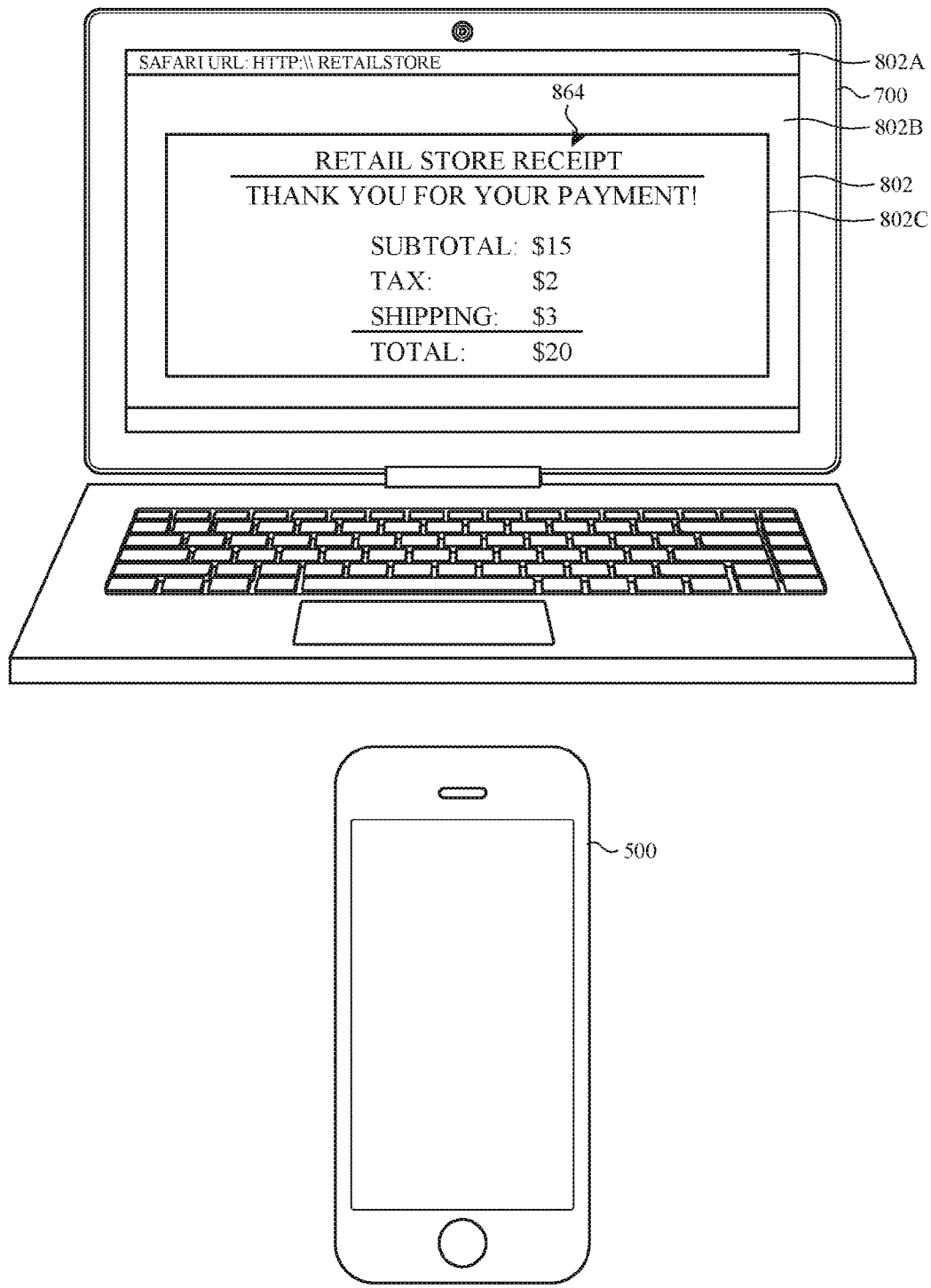

In some examples, as illustrated in FIG. 8L, the requesting device 700 displays (e.g., in the first portion 802C) an indication 864 that the requesting device 700 (and alternatively or in addition, the authenticating device 500) proceeded with the action. In some examples, the requesting device 700 displays (e.g., in the second portion 802B) an indication that the requesting device 700 (and alternatively or in addition, the authenticating device 500) proceeded with the action.

Figure 8M:
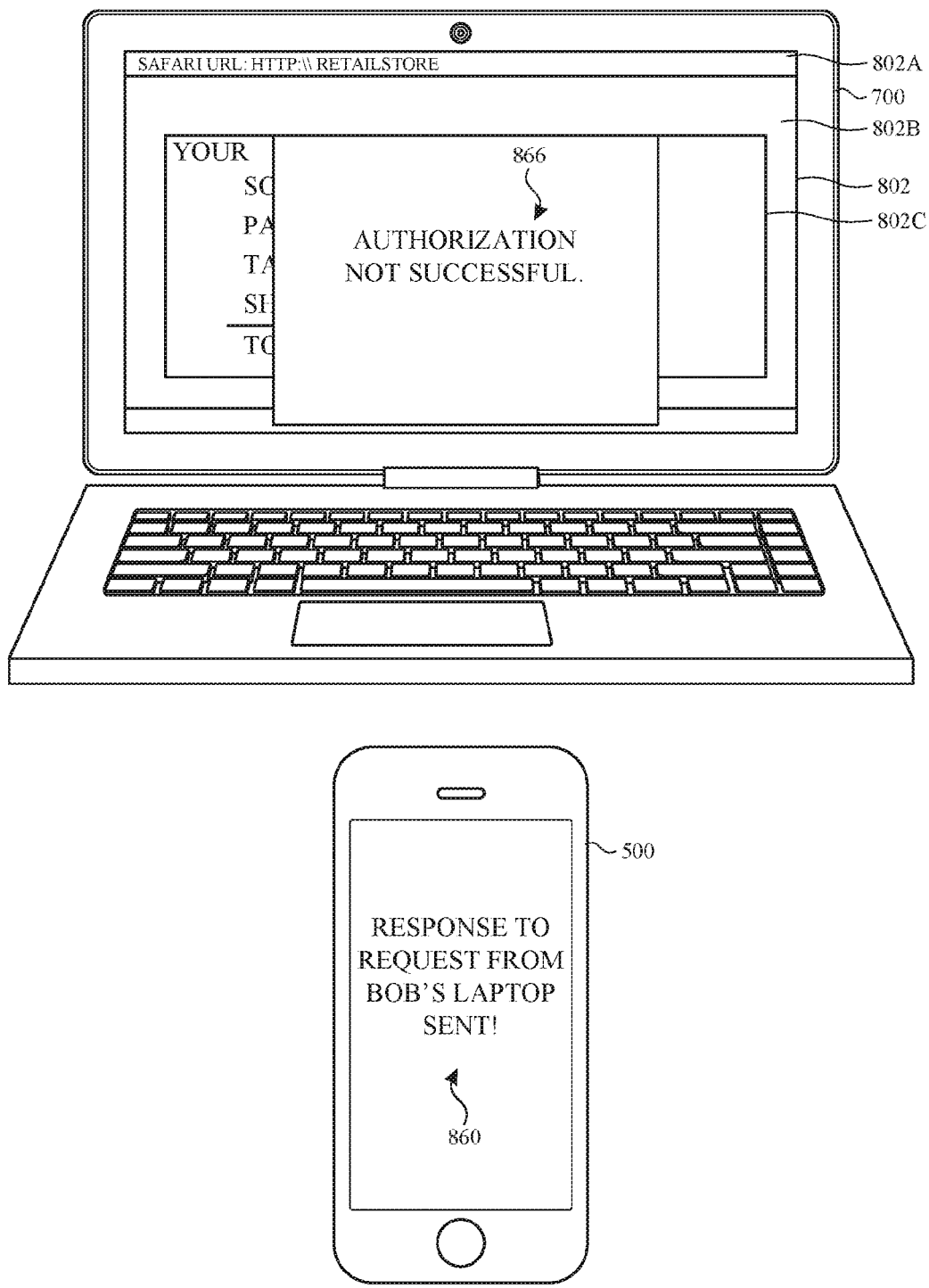
Figure 9A:
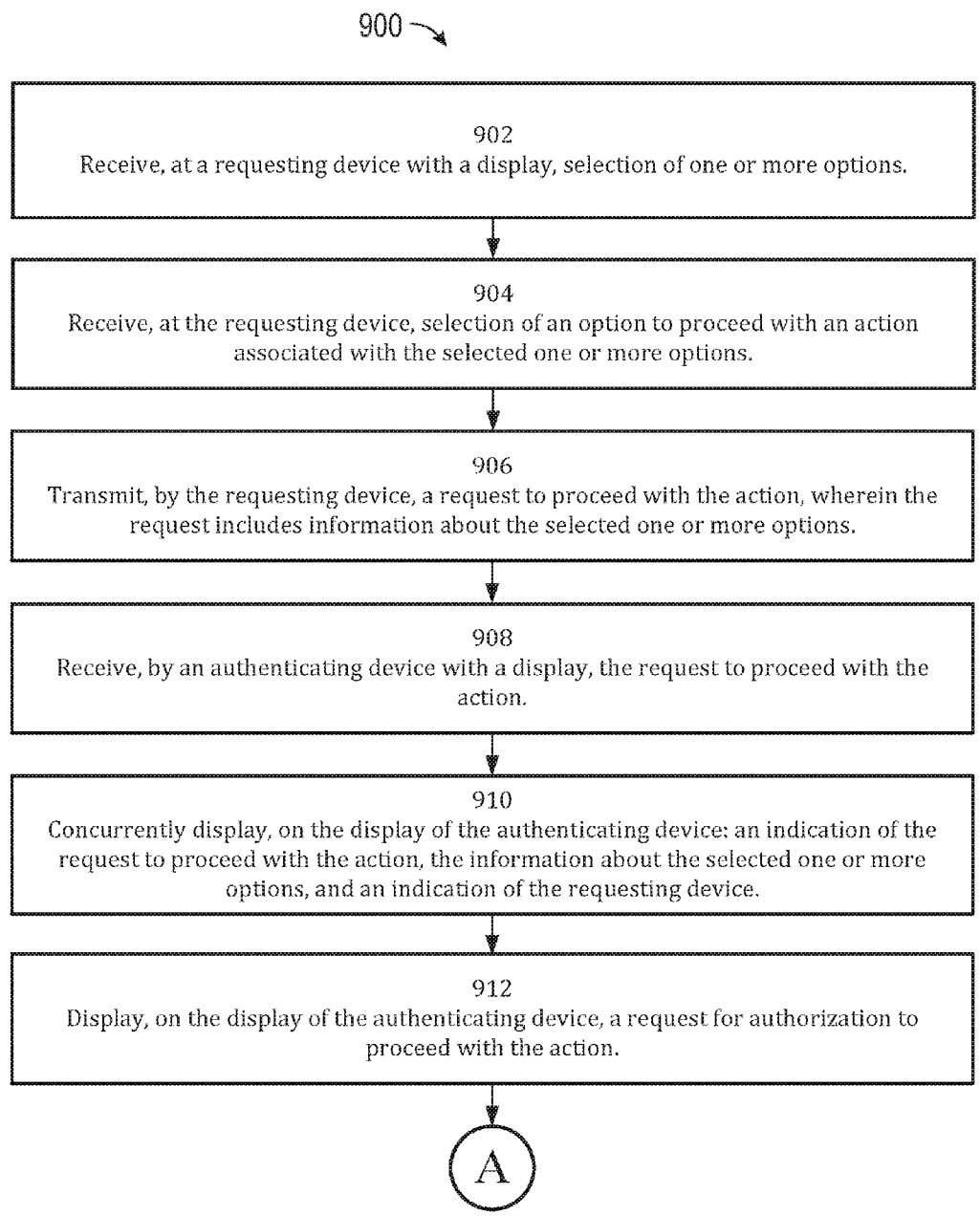
FIGS. 9A-9D are a flow diagram illustrating a method for managing a remote authorization to proceed with an action, in accordance with some embodiments.
Figure 9B:
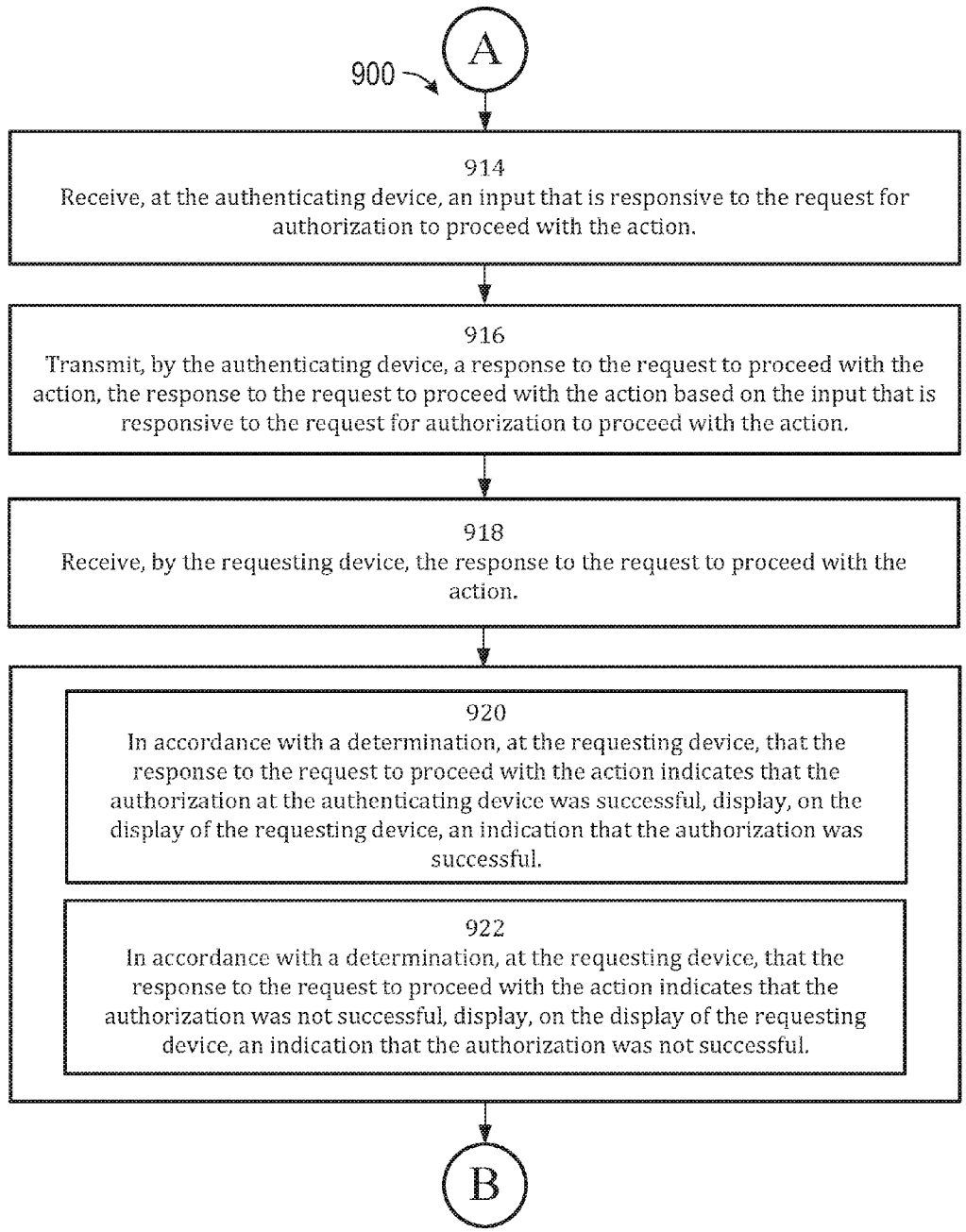
Figure 9C:
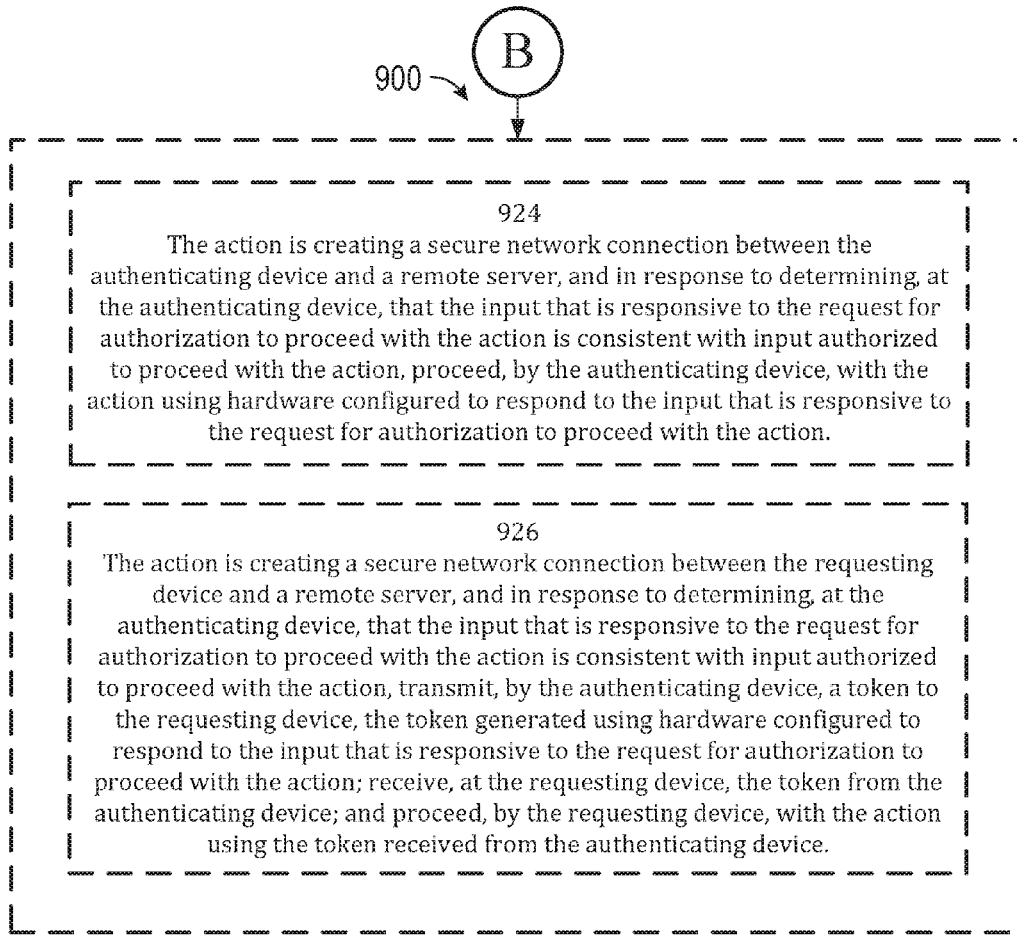
Figure 9D:
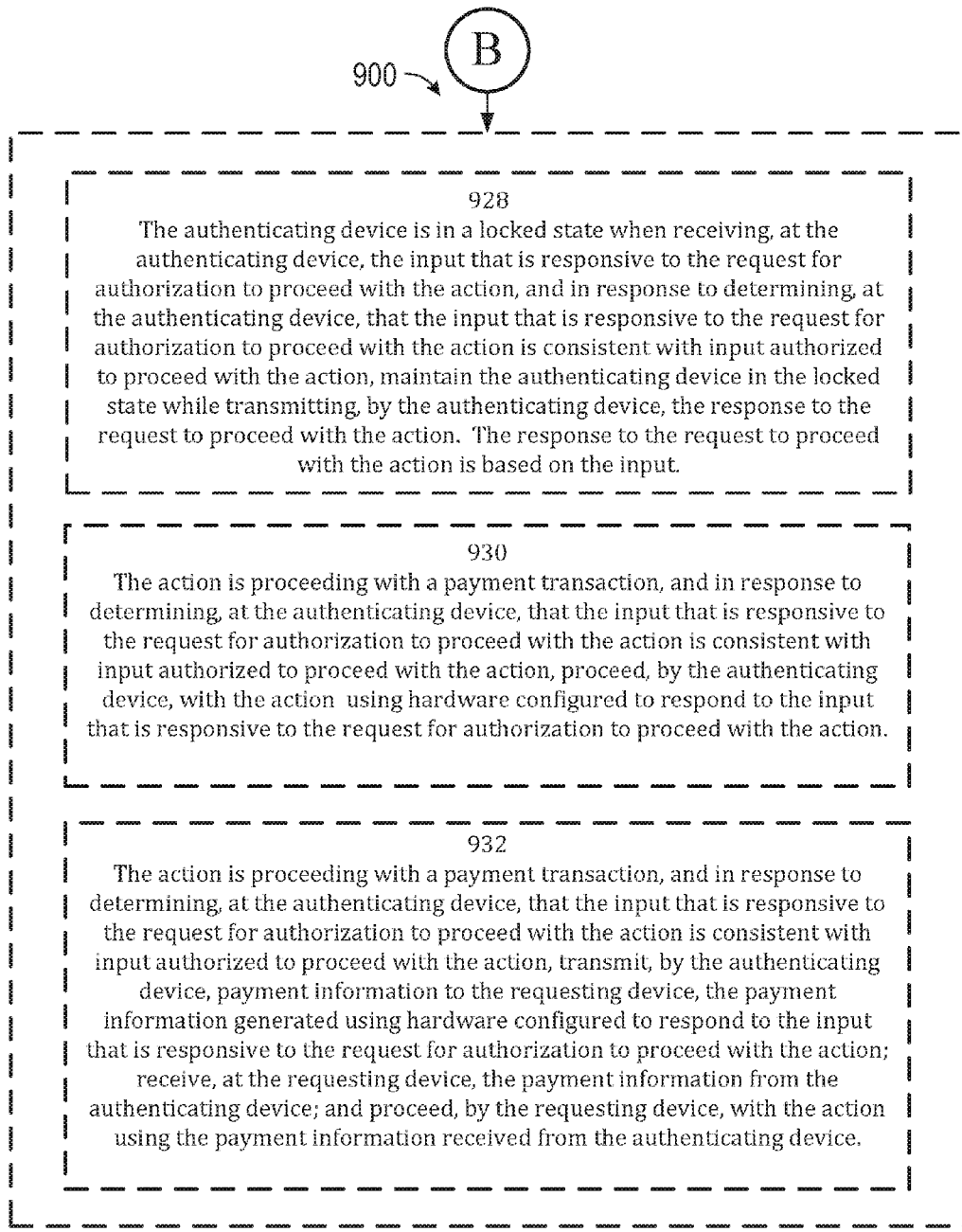

As illustrated in FIG. 8M, in accordance with a determination, at the requesting device 700, that the response to the request to proceed with the action indicates that the authorization (e.g., a user authentication by the authenticating device 500 based on a biometric, a fingerprint, a password) was not successful, displaying, on the display of the requesting device 700, an indication 866 that the authorization was not successful. The indication 862 that the authorization was successful is different from the indication 866 that the authorization was not successful.

In some examples, receiving authorization to proceed with the action includes receiving a passcode via a touch-sensitive surface of the authenticating device 500, the passcode being determined to be consistent with an enrolled passcode that is enabled to authorize the action. In some examples, authorization to proceed includes detecting a fingerprint using a fingerprint sensor, the fingerprint being determined to be consistent with an enrolled fingerprint that is enabled to authorize the action. For example, the authenticating device 500 stores information about one or more fingerprints of the user to use for determining whether a respective fingerprint is enabled to authorize the action. In some examples, authorization to proceed includes receiving a double-press of a mechanical button while the device is in an unlocked state (and, optionally, while the device is on a user's wrist, such as by detecting that the device is in contact with the user's skin).

In some examples, the authenticating device 500 includes hardware (e.g., a secure element) configured to respond (e.g., by generating or providing payment information) to the input that is responsive to the request for authorization to proceed with the action and the requesting device 700 does not include the hardware (e.g., a secure element). Thus, the user is able to take advantage of the hardware capabilities of a device (e.g., the authenticating device 500) while using (or performing tasks on) a different device (e.g., the requesting device 700).

FIGS. 9A-9D are flow diagrams illustrating method 900 for managing a remote authorization to proceed with an action using an electronic device in accordance with some embodiments. Method 900 is performed at a requesting device (e.g., 100, 300, 500) with a display and at an authenticating device (e.g., 700) with a display. In some examples, the authenticating device 500 includes hardware (e.g., a secure element, a token generator) configured to respond (e.g., by generating or providing payment information) to the input that is responsive to the request for authorization to proceed with the action and the requesting device 700 does not include the hardware (e.g., a secure element). Some operations in method 900 are, optionally, combined, the order of some operations is, optionally, changed, and some operations are, optionally, omitted.

As described below, method 900 provides an intuitive way for managing a remote authorization to proceed with an action. The method reduces the cognitive burden on a user, thereby creating a more efficient human-machine interface. For battery-operated computing devices, enabling a user to manage a remote authorization faster and more efficiently conserves power and increases the time between battery charges.

At block 902, a requesting device (e.g., 700, a laptop device that does not have a hardware token generator) receives selection of one or more options (e.g., 708, 718, 802G, 802H, 802J). For example, the requesting device receives user selection of a name or address of a remote server, receives user selection of a security token generation algorithm from among a plurality of token generation algorithms, receives user selection of a length for the to-be-generated security token, receives user selection of one or more products/services for purchase, receives user selection of one or more shipping preferences, receives user selection of a payment account, or a combination thereof.

At block 904, the requesting device (e.g., 700) receives selection of an option (e.g., 722, 822) to proceed with an action associated with the selected one or more options. In some examples, the action is creating a secure network connection. In some examples, the action is proceeding with a payment transaction. In some examples, receiving selection of option includes detecting user activation of a "confirm" affordance or a "connect affordance." In some examples, the action is based on the selected one or more options (e.g., 708, 718, 802G, 802H, 802J).

At block 906, the requesting device (e.g., 700) transmits a request to proceed with the action. The request includes information about (or based on) the selected one or more options (e.g., 708, 718, 802G, 802H, 802J). For example, the request may include selected shipping information or selected payment account information.

At block 908, the authenticating device (e.g., 500, a phone device that does have a hardware token generator; a phone device that does have a secure element) receives the request to proceed with the action. In some examples, the transmission of the request to proceed with the action from the requesting device (e.g., 700) to the authenticating device (e.g., 500) is direct. In some examples, the transmission is indirect, such as through an intermediary device.

At block 910, the authenticating device concurrently displays (e.g., in response to receiving the request), on the display of the authenticating device, an indication (e.g., 750, 850) of the request to proceed with the action, the information (e.g., 752, 852) about the selected one or more options, and an indication (e.g., 754, 854) of the requesting device (e.g., the name of the requesting laptop or phone, an identifier of the requesting device, or an icon or image that represents the requesting device such as a line drawing of a housing of the device).

At block 912, the authenticating device (e.g., 500) displays, on the display of the authenticating device, a request (e.g., 756, 856) for authorization to proceed with the action.

At block 914, the authenticating device receives an input that is responsive to the request for authorization to proceed with the action (e.g., user authentication information, a fingerprint of finger 758/858, a passcode).

At block 916, the authenticating device transmits a response to the request to proceed with the action. The response to the request to proceed with the action is based on the input that is responsive to the request for authorization to proceed with the action.

At block 918, the requesting device receives (e.g., in response to transmitting the request; subsequent to transmitting the request) the response to the request to proceed with the action.

At block 920, in accordance with a determination, at the requesting device (e.g., 700), that the response to the request to proceed with the action indicates that the authorization (e.g., a user authentication) at the authenticating device (e.g., 500) was successful (e.g., the user successfully authenticated based on biometrics, a fingerprint, or a password), the requesting device (e.g., 700) displays, on the display of the requesting device, an indication (e.g., 762, 862) that the authorization was successful.

At block 932, in accordance with a determination, at the requesting device (e.g., 700), that the response to the request to proceed with the action indicates that the authorization (e.g., a user authentication based on a biometric, a fingerprint, a password) at the authenticating device (e.g., 500) was not successful, the requesting device (e.g., 700) displays, on the display of the requesting device, an indication (e.g., 766, 866) that the authorization was not successful. The indication (e.g., 762, 862) that the authorization was successful is different from the indication (e.g., 766, 866) that the authorization was not successful).

In some examples, receiving authorization to proceed with the action includes receiving a passcode via a touch-sensitive surface of the electronic device. The authorization is successful when the passcode is determined to be consistent with an enrolled passcode that is enabled to authorize the action. In some examples, authorization to proceed includes detecting a fingerprint. The authorization is successful when the fingerprint is determined to be consistent with an enrolled fingerprint that is enabled to authorize the action. For example, the device stores information about one or more fingerprints of the user to use for determining whether a respective fingerprint is enabled to authorize the action. In some examples, authorization to proceed includes receiving a double-press of a mechanical button while the device (e.g., a smartwatch device) is in an unlocked state (and, optionally, while the device is on a user's wrist, such as by detecting that the device is in contact with the user's skin.)

In some examples, the authenticating device (e.g., 500) includes hardware (e.g., a hardware token generator, a secure element) configured to respond (e.g., by generating or providing a token, by generating or providing payment information) to the input that is responsive to the request for authorization to proceed with the action and the requesting device (e.g., 700) does not include the hardware (e.g., the hardware token generator, the secure element).

In some examples, at block 824, the action is creating a secure network connection between the authenticating device (e.g., 500) and a remote server. In response to determining, at the authenticating device (e.g., 500), that the input that is responsive to the request for authorization to proceed with the action is consistent with input authorized to proceed with the action, (e.g., successful user authentication based on the user input, user authentication information, a fingerprint, a passcode), the authenticating device proceeds with the action (e.g., creating a secure network connection) using the hardware configured to respond to the input that is responsive to the request for authorization to proceed with the action (e.g., a hardware token generator). Thus, the authenticating device proceeds with creating a secure network connection by using a token generated by the hardware token generator. For example, the authenticating device (e.g., 500) transmits the token to the remote server. In some examples, the action is proceeding with a payment transaction, rather than creating a secure network connection.

In some examples, at block 826, the action is creating a secure network connection between the requesting device (e.g., 700) and a remote server. In response to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device transmits a token to the requesting device. The token having been generated using hardware of the authenticating device (e.g., 500) configured to respond to the input that is responsive to the request for authorization to proceed with the action (e.g., a hardware token generator). The requesting device (e.g., 700) receives the token from the authenticating device. The requesting device (e.g., 700) proceeds with the action (e.g., creating a secure network connection) using the token received from the authenticating device (e.g., 500).

In some examples, the indication of the requesting device (e.g., 700) includes a graphical representation (e.g., 754, 854) of the requesting device (e.g., 700). In some examples, the graphical representation (e.g., 754, 854) of the requesting device (e.g., 700) is an icon representation of the requesting device such as a line drawing of a housing of the device, the icon representation including one or more of: a finish, a form factor, and one or more dimension information of the requesting device. For example, the graphical representation may indicate that the requesting device (e.g., 700) is a gold MacBook® or a 27" iMac®.

In some examples, at block 828, the authenticating device is in a locked state when receiving the input that is responsive to the request for authorization to proceed with the action (e.g., user authentication information, a fingerprint, a passcode). In response to determining, at the authenticating device, that the input that is responsive to the request for authorization to proceed with the action is consistent with input authorized to proceed with the action, the authenticating devices maintains (e.g., remains in) the locked state while transmitting the response to the request to proceed with the action, wherein the response to the request to proceed with the action based on the input. Thus, it is not necessary to request that the authenticating device (e.g., 500) be unlocked (e.g., as in FIGS. 7G, 8H and their accompanying descriptions).

In some examples, detecting an interaction with the fingerprint sensor while the authenticating device is locked would (in the absence of the request for authorization) cause the authenticating device (e.g., 500) to unlock (e.g., a touch on a fingerprint sensor embedded into a home button causes the device to unlock if detected while the lock screen is displayed, but causes the request to be authorized without unlocking the authenticating device when the touch on the fingerprint sensor is detected while the request is displayed on the display of the authenticating device). Thus, in some examples the swipe gestures 736 and 836 cause display of the user interfaces of FIGS. 7H and 8I, respectively.

In some examples, the requesting device (e.g., 700) is signed into a service using an account when transmitting the request to proceed with the action and the authenticating device (e.g., 500) is signed into the service using the account when receiving the request to proceed with the action (e.g., both the requesting device and the authenticating devices are signed into a service using the same user account/the same user credentials). Alternatively, the requesting device (e.g., 700) and the authenticating device (e.g., 500) are each signed into separate accounts on the same service, and the separate accounts are linked to each other (e.g., explicitly linked to each other for the purpose of authorizing the action).

In some examples, at block 830, the action is proceeding with a payment transaction, and in response to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device (e.g., 500) proceeds with the action (e.g., proceeding with the payment transaction) using hardware (e.g., a secure element) configured to respond to the input that is responsive to the request for authorization to proceed with the action. In some examples, the hardware used to perform the action is not available at the requesting device (e.g., 700). For example, the authenticating device (e.g., 500) provides (e.g., to a payment transaction server/merchant so that the merchant can receive payment from a payment institution or the requesting device) payment information (e.g., a payment account number) for use in the payment transaction.

In some examples, at block 832, the action is proceeding with a payment transaction, and in response to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device (e.g., 500) transmits payment information to the requesting device. The payment information is generated using hardware (e.g., a secure element) configured to respond to the input that is responsive to the request for authorization to proceed with the action. In some examples, the hardware used for generating the payment information is not available at the requesting device (e.g., 700). The requesting device (e.g., 700) receives the payment information from the authenticating device (e.g., 500). The requesting device (e.g., 700) proceeds with the action (e.g., proceeding with the payment transaction; providing the payment information to a payment transaction server/merchant so that the merchant can receive payment from a payment institution) using the payment information (e.g., a payment account number) received from the authenticating device (e.g., 500).

In some examples, the authenticating device (e.g., 500) transmits a token to a server (e.g., a remote server), and the server uses the token to obtain a resource associated with the token (e.g., CPU time, network socket, memory access). In some examples, the requesting device (e.g., 700) transmits a token to a server (e.g., a remote server), and the server uses the token to obtain a resource associated with the token (e.g., CPU time, network socket, memory access).

In some examples, the authenticating device (e.g., 500) transmits the payment information to a payment transaction server (e.g., a merchant's server), and the payment transaction server uses the payment information to obtain a resource (e.g., funds) associated with the payment information (e.g., payment from a user payment account specified by the token). In some examples, the requesting device (e.g., 700) transmits the payment information to a payment transaction server (e.g., a merchant's server), and the payment transaction server uses the payment information to obtain a resource (e.g., funds) associated with the payment information (e.g., payment from a user payment account specified by the token).

In some examples, the action is proceeding with a payment transaction. The authenticating device (e.g., 500) includes hardware (e.g., hardware secure element) for authorizing payment transactions. In some examples, the hardware is configured to respond to the input that is responsive to the request for authorization to proceed with the action. For example, the hardware of the authenticating device (e.g., 500) generates and/or provides payment information once it receives authorization by authenticating a user (e.g., using fingerprint authentication, using passcode authentication). In some examples, the requesting device (e.g., 700) does not include the hardware for authorizing payment transactions. In some examples, the authenticating device (e.g., 500) includes hardware for authenticating a user and the requesting device (e.g., 700) does not include the hardware for authenticating the user.

In some examples, the action is proceeding with a payment transaction. Subsequent to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device (e.g., 500) proceeds with the action (e.g., proceeding with the payment transaction using the payment information) without further input from the requesting device (e.g., 700). For example, the authenticating device transmits the information (e.g., payment information) necessary for processing the payment transaction to a payment transaction server. In some examples, subsequent to determining authorization to proceed is provided, the authenticating device (e.g., 500) proceeds with the action (e.g., proceeding with the payment transaction using the payment information) without further input from the user at the authenticating device (e.g., 500).

In some examples, the authenticating device (e.g., 500) is a phone (e.g., a smartphone) and the requesting device is a television device (e.g., a flat panel television or a set top box that is controlling display of a user interface on the flat panel television). In some examples, the authenticating device is a phone (e.g., a smart phone) and the requesting device is a computer (e.g., a laptop computer, a desktop computer). In some examples, the authenticating device is a wearable device (e.g., an electronic smartwatch) and the requesting device is a television device (e.g., a flat panel television or a set top box that is controlling display of a user interface on the flat panel television). In some examples, the authenticating device is a wearable device (e.g., an electronic smartwatch) and the requesting device is a computer (e.g., a laptop computer, a desktop computer).

In some examples, an electronic wallet of the authenticating device (e.g., 500) includes one or more payment accounts associated with a user of the authenticating device and the payment information is based on a payment account of the one or more payment accounts. In some examples, the payment information is an account number or a PAN of a payment account.

In some examples, proceeding with the payment transaction includes transmitting the payment information (e.g., payment information of a payment account linked to the electronic device and stored in an electronic wallet of the device) to a payment transaction server to engage in the payment transaction. In some examples, engaging in the payment transaction includes routing information to one or more financial institutions to verify payment credentials and/or receive authorization to complete the transaction. For example, payment information is transmitted from the authenticating device (e.g., 500) to a payment server for engaging in the payment transaction. For another example, payment information is transmitted from the requesting device (e.g., 700) to a payment server for engaging in the payment transaction.

In some examples, proceeding with the payment transaction includes using the payment information (e.g., payment information of a payment account linked to the electronic device and stored in an electronic wallet of the device) to complete the payment transaction. In some examples, proceeding with the payment transaction includes using the payment information (e.g., an account number or a PAN of a payment account) for use in the payment transaction (e.g., using a credit account to make the purchase) to complete the payment transaction, where the payment information is stored at the electronic device (e.g., 500, 700).

Note that details of the processes described above with respect to method 900 (e.g., FIGS. 9A-9D) are also applicable in an analogous manner to the methods described below. For example, methods 1000 and 1100 optionally include one or more of the characteristics of the various methods described above with reference to method 900. For example, characteristics and techniques of the requesting devices of the various methods can be combined. For another example, characteristics and techniques of the authenticating devices of the various methods can be combined. For brevity, some of these details are not repeated below.

Figure 10A:
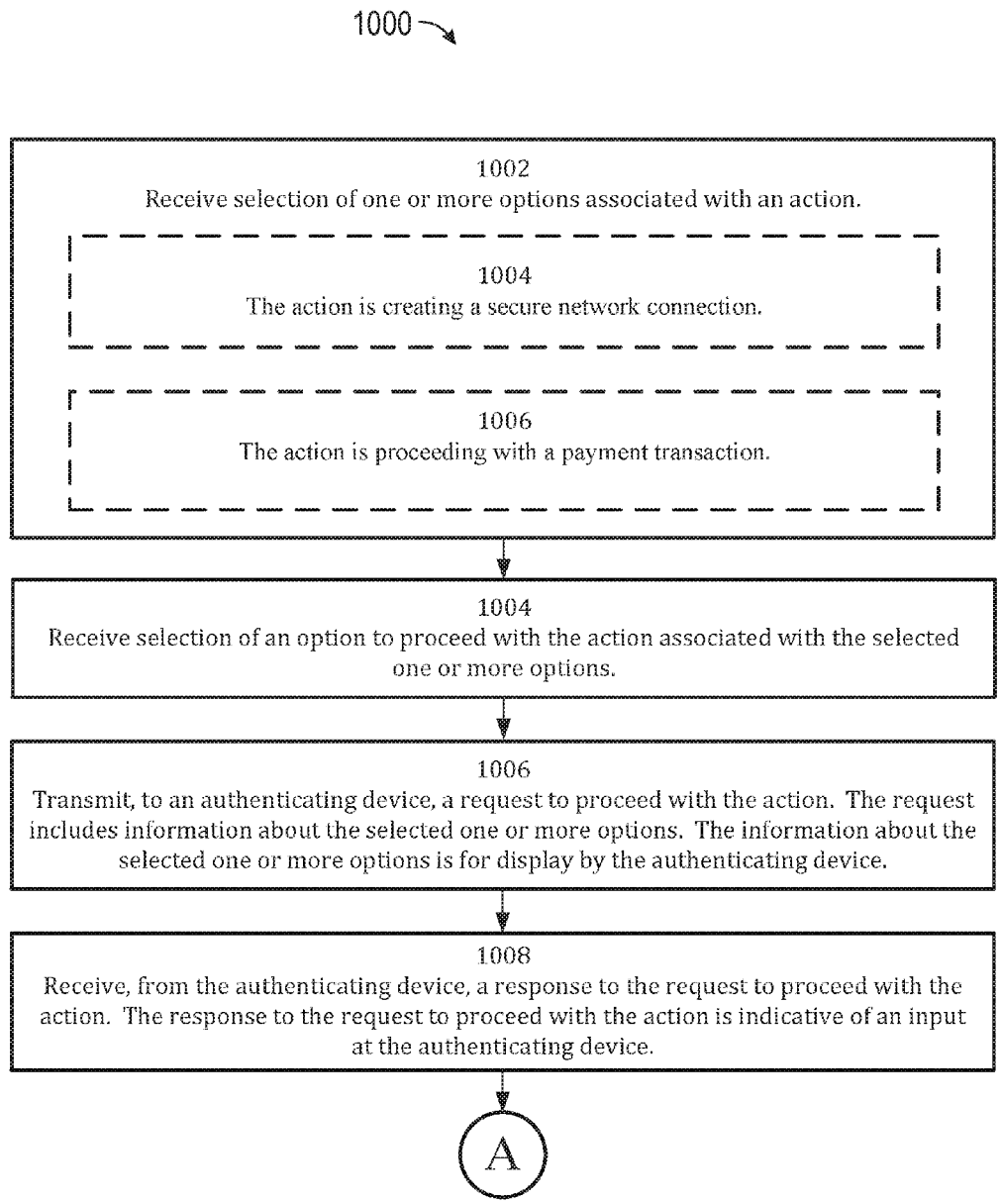
FIGS. 10A-10B are a flow diagram illustrating a method for managing a remote authorization to proceed with an action, in accordance with some embodiments.
Figure 10B:
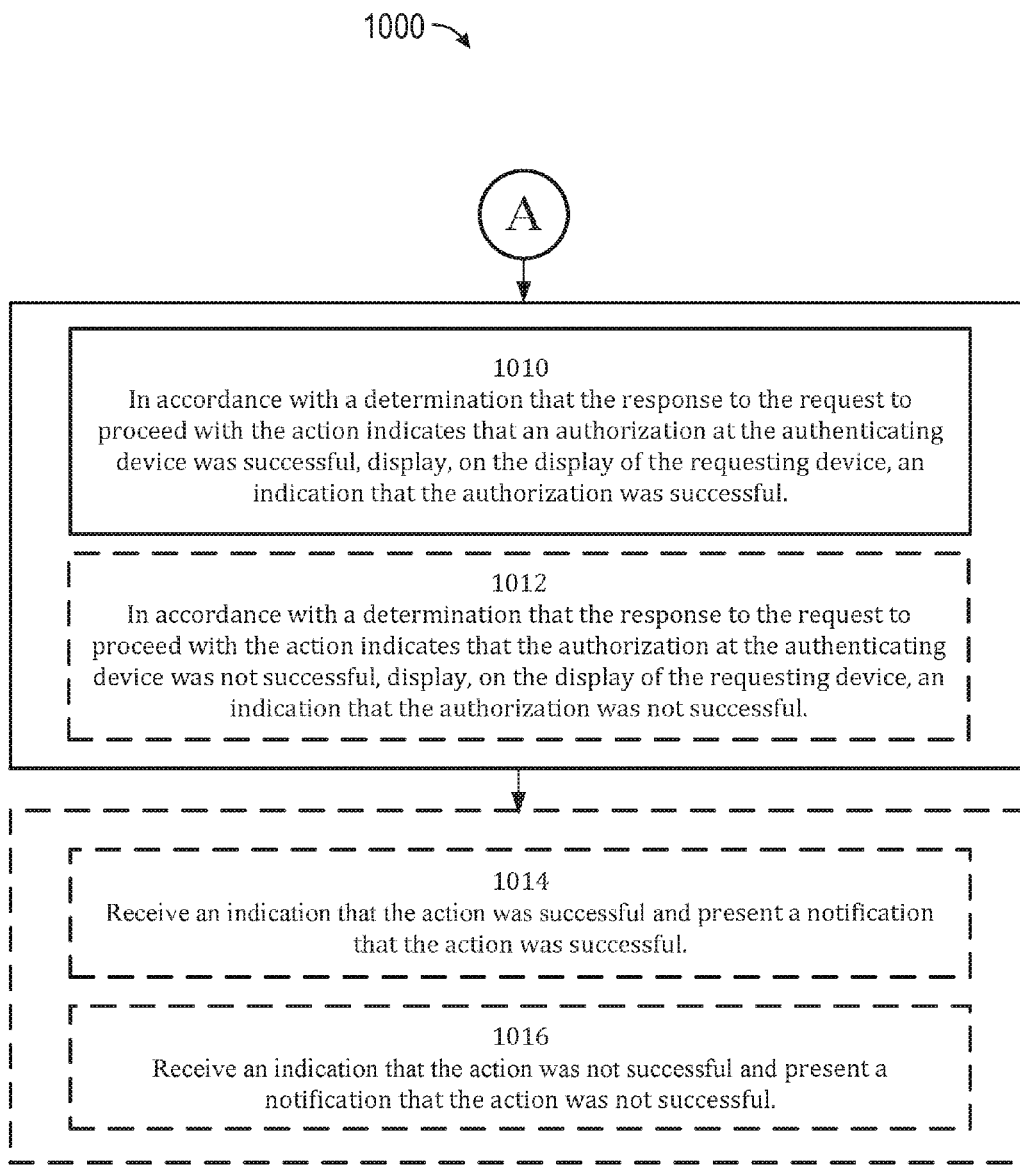
Figure 11:
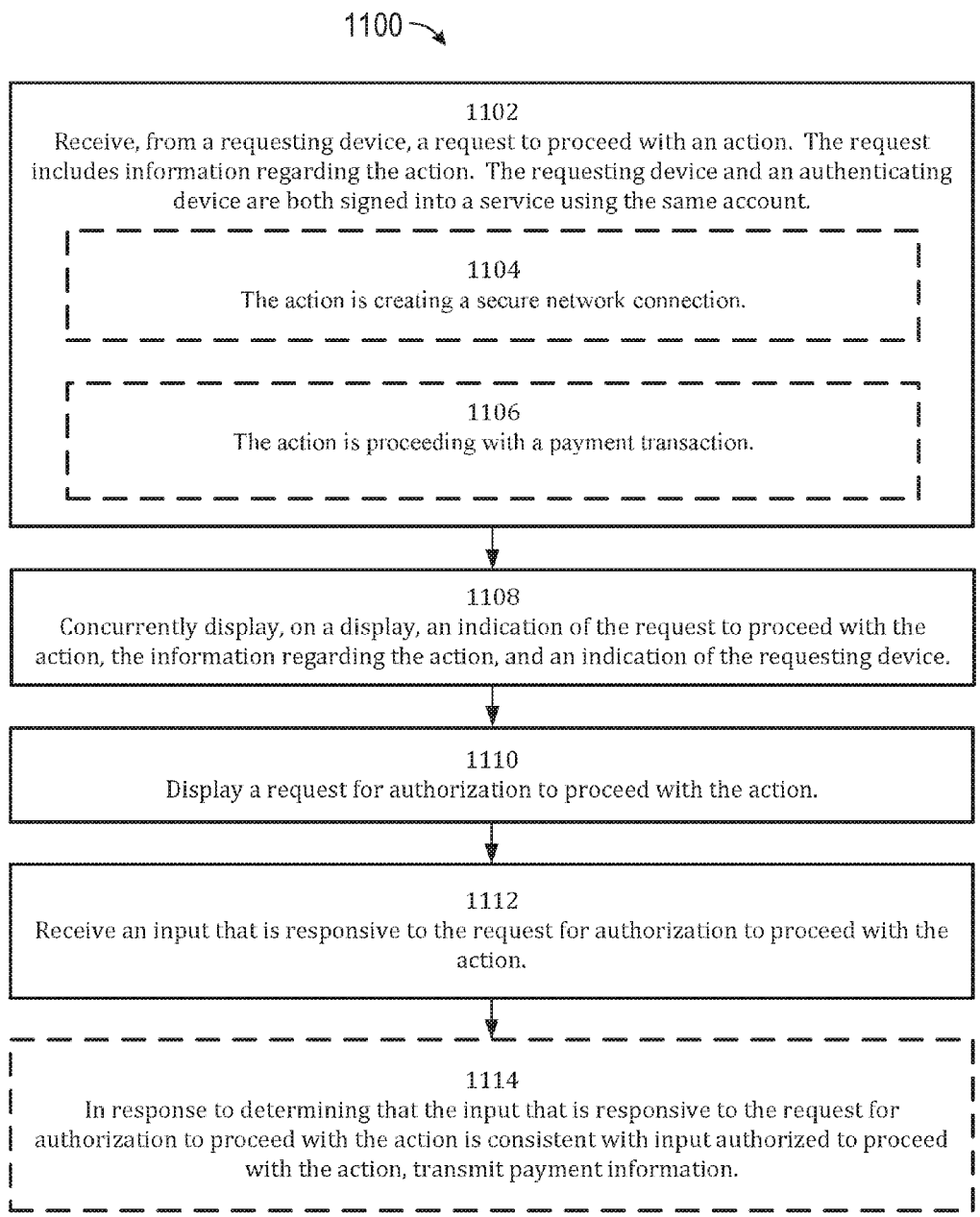
FIG. 11 is a flow diagram illustrating a method for managing a remote authorization to proceed with an action, in accordance with some embodiments.

FIGS. 10A-10B are flow diagrams illustrating method 1000 for managing a remote authorization to proceed with an action using an electronic device in accordance with some embodiments. Method 1000 is performed at a requesting device (e.g., 100, 300, 700) with a display. In some examples, the requesting device (e.g., 700) does not have a hardware token generator or a secure element. Some operations in method 1000 are, optionally, combined, the order of some operations is, optionally, changed, and some operations are, optionally, omitted.

As described below, method 1000 provides an intuitive way for managing a remote authorization to proceed with an action. The method reduces the cognitive burden on a user, thereby creating a more efficient human-machine interface. For battery-operated computing devices, enabling a user to manage a remote authorization faster and more efficiently conserves power and increases the time between battery charges. The method also improves the security of transactions by allowing a user to use an authenticating device with specialized authentication and/or secure storage hardware. The method also reduces the cost of devices by enabling specialized authentication and/or secure storage hardware from one device to be used by a user at another device.

At block 1002, the requesting device receives selection of one or more options (e.g., 708, 718, 802G, 802H, 802J) associated with an action. For example, the requesting device receives user selection of a security token generation algorithm from among a plurality of token generation algorithms, receives user selection of a length for the to-be-generated security token, receives selection of one or more products/services for purchase, receives selection of one or more shipping preferences, receives selection of a payment account, or a combination thereof. In some examples, the selected one or more options associated with the action are displayed on the display of the requesting device. In some examples, the one or more options associated with the action are a plurality of options associated with the action.

In some examples, at block 1004, the action is creating a secure network connection. The secure network is created between the requesting device (e.g., 700) and a remote server by transmitting (e.g., by the requesting device or the authenticating device) a token to the remote server. In some examples, the action is to create a secure connection between the authenticating device and a remote server by transmitting (e.g., by the requesting device or the authenticating device) a token to the remote server. In some examples, the authenticating device (e.g., 500) generates the token and transmits the token to the requesting device (e.g., 700) prior to the requesting device (e.g., 700) transmitting the token to the remote server.

In some examples, at block 1006, the action is proceeding with a payment transaction (e.g., by transmitting payment information to a payment transaction server for use by the payment transaction server to process the payment transaction).

At block 1008, the requesting device receives selection of an option (e.g., 722, 822) to proceed (e.g., detecting user activation of a "confirm" affordance) with the action (e.g., creating a secure network connection; proceeding with a payment transaction) associated with the selected one or more options (e.g., 708, 718, 802G, 802H, 802J). In some examples, the action is based on the selected one or more options.

At block 1010, the requesting device (e.g., 700) transmits (e.g., in response to receiving selection of the option to proceed with the action) to an authenticating device (e.g., 500; a phone device that does have a hardware token generator; a phone device that does have a secure element; the transmission to the authenticating device being direct or indirect, such as through an intermediary device), a request to proceed with the action. The request includes information about (or based on) the selected one or more options. The information (e.g., 752, 852) about the selected one or more options are for display by the authenticating device (e.g., 500). For example, the information about the selected one or more options are for display on a display of the authenticating device (e.g., 500).

At block 1012, the requesting device (e.g., 700) receives (e.g., in response to transmitting the request; subsequent to transmitting the request), from the authenticating device (e.g., 500), a response to the request to proceed with the action. The response to the request to proceed with the action is indicative of an input at the authenticating device (e.g., 500).

At block 1014, in accordance with a determination that the response to the request to proceed with the action indicates that an authorization (e.g., a user authentication by the authenticating device based on a biometric, a fingerprint, a password) at the authenticating device (e.g., 500) was successful, the requesting device (e.g., 700) displays, on the display of the requesting device, an indication (e.g., 762, 862) that the authorization was successful.

In some examples, at block 1016, in accordance with a determination that the response to the request to proceed with the action indicates that the authorization at the authenticating device (e.g., a user authentication by the authenticating device based on a biometric, a fingerprint, a password) was not successful, the requesting device (e.g., 70) displays, on the display of the requesting device, an indication (e.g., 766, 866) that the authorization was not successful. The indication that the authorization was successful (e.g., 762, 862) is different from the indication (e.g., 766, 866) that the authorization was not successful.

In some examples, the action is creating a secure network connection. The requesting device (e.g., 700) receives a token from the authenticating device (e.g., 500). The requesting device (e.g., 700) proceeds with the action (e.g., creating the secure network connection) using the token (e.g., a security token) received from the authenticating device (e.g., 500).

In some examples, the action is proceeding with a payment transaction. The requesting device (e.g., 700) receives payment information (e.g., a payment account number, an identifier of a payment account, payment card information, such as account number and expiration date) from the authenticating device (e.g., 500). The requesting device (e.g., 700) proceeds with the action (e.g., proceeding with the payment transaction) using the payment information (e.g., a payment account number, an identifier of a payment account, payment card information, such as account number and expiration date) received from the authenticating device (e.g., 500).

In some examples, proceeding with the payment transaction includes transmitting at least a portion of the payment information to a to a payment transaction server/merchant so that the merchant can receive payment from a payment institution or the requesting device. For example, the payment transaction server is a server configured to process payments.

In some examples, the requesting device is signed into a service using an account and the authenticating device is signed into the service using the account (e.g., both the requesting device and the authenticating devices are signed into a service using the same user account/the same user credentials). Alternatively, the requesting device and the authenticating device are each signed into separate accounts on the same service, wherein the separate accounts are linked to each other (e.g., explicitly linked to each other for the purpose of authorizing the action).

In some examples, at block 1014, the requesting device (e.g., 700) receives (e.g., via communication with a bank, card issuer server, payment transaction server, or merchant; via communication with the authenticating device) an indication that the action was successful (e.g., a payment has been approved by the authenticating device, a token has been sent by the authenticating device). The requesting device (e.g., 700) presents a notification (e.g., 762, 862) at the requesting device that the action was successful (e.g., via displaying the notification on the display; via playing audio of the notification on a speaker; via performing a tactile output at the requesting device).

In some examples, at block 1016, the requesting device (e.g., 700) receives (e.g., via communication with a bank, card issuer server, payment transaction server, or merchant; via communication with the authenticating device) an indication that the action was not successful (e.g., a payment has been rejected by the authenticating device, a token has not been sent by the authenticating device). The requesting device (e.g., 700) presents a notification (e.g., 766, 866) at the requesting device (e.g., 700) that the action was not successful (e.g., via displaying the notification on the display; via playing audio of the notification on a speaker; via performing a tactile output at the requesting device).

In some examples, prior to transmitting the request to proceed with the action, the requesting device (e.g., 700) determines whether a set of one or more conditions that indicate whether the requesting device (e.g., 700) is capable of authorizing the request is met (e.g., is a local token generator for generating token information available; is a local secure element with payment account information available). Transmitting the request to the authenticating device occurs in accordance with a determination that the set of one or more conditions is not met. In accordance with a determination that the set of one or more conditions is met, the requesting device does not transmit the request for information to the authenticating device and instead uses capabilities of the requesting device to authenticate the request (e.g., using a locally available fingerprint sensor and secure element to generate a token and/or retrieve payment information that can be used to complete the transaction). In some examples, if a fingerprint sensor and secure element are available at the requesting device (e.g., 700), the requesting device displays a user interface instructing the user to provide authentication to proceed with the transaction using the fingerprint sensor and secure element that are available locally at the device. Alternatively, in some examples, the requesting device (e.g., 700) displays instructions for entering a passcode that, when entered, enables retrieval of the token from the token generator or payment information from the secure element.

In some examples, the set of one or more conditions is met when hardware (e.g., a local secure element) configured to generate (or securely store or provide) payment information is available at the requesting device (e.g., 700). In some examples, in accordance with a determination that the set of one or more conditions is met, the requesting device requests, from the secure element of the requesting device (e.g., 700), payment information for use in proceeding with the action.

In some examples, the request to proceed with the action includes one or more payment transactions details (e.g., a price, a merchant name, a shipping address, a payment account identifier, a URL of a payment transaction server).

In some examples, prior to transmitting, by the requesting device (e.g., 700), to the authenticating device (e.g., 500) the request to proceed with the action, the requesting device (e.g., 700) provides options (e.g., displaying options) corresponding to a plurality of authenticating devices, the plurality of authenticating devices including the authenticating device, and the requesting device (e.g., 700) receives input (e.g., user input on a touch-sensitive surface) selecting an option corresponding to the authenticating device (e.g., 500). The transmitting, by the requesting device (e.g., a laptop device that does not have a hardware token generator, a laptop device that does not have a secure element), to the authenticating device the request to proceed with the action is done in accordance with receiving the input selecting the authenticating device from among the plurality of authenticating devices. In some examples, the options corresponding to the plurality of authenticating devices are displayed in a browser user interface of a web browser (e.g., a sheet, tongue, or overlay that expands from a portion of the web browser such as a smart search field or web address field). In some examples, a plurality of other options associated with the transaction is also displayed concurrently with the options corresponding to the authenticating devices (e.g., a shipping address, shipping options).

In some examples, prior to transmitting, by the requesting device (e.g., 700), to the authenticating device (e.g., 500) the request to proceed with the action, the requesting device (e.g., 700) selects the authenticating device (e.g., 500) from among a plurality of authenticating devices based on one or more of the proximity of the authenticating device to the requesting device, the recency of use of the authenticating device, a user-defined preference for the authenticating device, and a prioritization scheme of the plurality of authenticating devices. The transmitting, by the requesting device, to the authenticating device the request to proceed with the action is done in accordance with selecting the authenticating device from among the plurality of authenticating devices. Thus, in some examples, the requesting device (e.g., 700) automatically selects an authenticating device (e.g., 500) based on a criterion.

In some examples, prior to transmitting, by the requesting device (e.g., 700) to the authenticating device the request to proceed with the action, the requesting device (e.g., 700) selects the authenticating device from among a plurality of authenticating devices based on availability of a selected payment account (or payment account type) on the authenticating device. The transmitting, by the requesting device (e.g., 700) to the authenticating device (e.g., 500), the request to proceed with the action is done in accordance with selecting the authenticating device from among the plurality of authenticating devices. In some examples, the requesting device receives input selecting a payment account and the authenticating device is selected from among the plurality of authenticating devices based on the authenticating device being provisioned to provide payment information using the selected payment account. In some examples, the requesting device receives input selecting a card type (such as American Express or Visa) and the authenticating device is selected from among the plurality of authenticating devices based on the authenticating device being provisioned to provide payment information using a payment account of the selected card type. In some examples, if a first payment method selection is received, the requesting device sends the request to a first authenticating device; if second payment method selection is received, the requesting device sends the send request to a second authenticating device.

In some examples, in accordance with transmitting, by the requesting device (e.g., 700) to the authenticating device, the request to proceed with the action, the requesting device (e.g., 700) forgoes transmitting to another authenticating device of a plurality of authenticating devices the request to proceed with the action. For example, the requesting device only transmits the request to proceed with the action to one authenticating device, even when multiple authenticating devices are nearby and available.

In some examples, the requesting device (e.g., 700) transmits, to a second authenticating device (or to a plurality of authenticating devices), the request to proceed with the action. For example, the requesting device concurrently (or sequentially) transmits the request to proceed with the action to multiple authenticating devices.

In some examples, prior to transmitting the request to proceed with the action, the requesting device (e.g., 700) determines whether a set of one or more conditions is met (e.g., is a local secure element for generating token information available; is a local secure element with payment information available). The set of one or more conditions is met when hardware (e.g., a local secure element) configured to generate (or provide or securely store) payment information is available at the requesting device (e.g., 700). In accordance with a determination that the set of one or more conditions is not met, the requesting device provides options (e.g., displaying options) corresponding to a plurality of authenticating devices. The plurality of authenticating devices includes the authenticating device (e.g., 500). In some examples, the requesting device receives input (e.g., user input on a touch-sensitive surface) selecting an option corresponding to the authenticating device. The transmitting, by the requesting device to the authenticating device, the request to proceed with the action is done in accordance with receiving the input selecting the authenticating device from among the plurality of authenticating devices.

In some examples, subsequent to transmitting the request to proceed with the action, the requesting device (e.g., 700) receives user input changing at least one of the selected one or more options (e.g., 708, 718, 802G, 802H, 802J) associated with the action; transmits, to the authenticating device, a revised request to proceed with the action; and receives (e.g., in response to transmitting the request; subsequent to transmitting the request), from the authenticating device, a confirmation of receipt of the revised request to proceed with the action. The displaying, on the display of the requesting device, the indication that the authorization was successful is done in accordance with a determination that the confirmation of receipt of the revised request to proceed with the action was received.

In some examples, prior to transmitting the request to proceed with the action, the requesting device (e.g., 700) displays, on the display of the requesting device, the selected one or more options (e.g., 708, 718, 802G, 802H, 802J) associated with the action. Subsequent to transmitting the request to proceed with the action, the requesting device (e.g., 700) receives, from the authenticating device, changes to at least one of the selected one or more options associated with the action; and in response to receiving, from the authenticating device, the changes to the at least one of the selected one or more options associated with the action, updates the display in accordance with the received changes to the at least one of the selected one or more options associated with the action. For example, the authenticating device receives user input changing some of the one or more options and the authenticating device transmits information indicative of the changes to the requesting device.

In some examples, subsequent to transmitting the request to proceed with the action, the requesting device (e.g., 700) receives selection of an option to cancel (e.g., detecting user activation of a "cancel" affordance) the action, and in response to receiving selection of the option to cancel the action, transmits, to the authenticating device, a request to cancel the action.

In some examples, the requesting device (e.g., 700) displays, on the display of the requesting device, the one or more options (e.g., 708, 718, 802G, 802H, 802J) associated with the action in a third-party user interface. The requesting device (e.g., 700) displays (e.g., concurrently with the one or more options), on the display of the requesting device, the option (e.g., 722, 822) to proceed with the action in a first-party user interface. In some examples, the third-party user interface is a web page displayed in a web browser application. In some examples, the third-party user interface is a user interface of a first application. In some examples, the first-party user interface is user interface of a second application different from the first application. In some examples, the first-party user interface is a user interface of an operating system of the requesting device. In some examples, the first-party user interface is a user interface of the web browser that is not coded in hypertext markup language.

In some examples, the requesting device (e.g., 700) displays, on the display of the requesting device, the option (e.g., 722, 822) to proceed with the action in a first-party user interface.

In some examples, the requesting device (e.g., 700) determines whether one or more authenticating devices are available (e.g., within a predetermined distance) for authentication. In accordance with a determination that one or more authenticating devices are available (e.g., determining that at least one device is available within a predetermined distance of the requesting device; determining that at least one device is available on the same LAN as the requesting device; determining that at least one device is available via a personal area network of the requesting device) for authentication, the requesting device (e.g., 700) displays, on the display of the requesting device, the option (e.g., 722, 822) to proceed with the action. In accordance with a determination that one or more authenticating devices are not available (e.g., determining that no device is available) for authentication, forgoing displaying, on the display of the requesting device, the option to proceed with the action.

In some examples, prior to transmitting, by the requesting device (e.g., 700) to the authenticating device (e.g., 500), the request to proceed with the action, the requesting device (e.g., 700) receives selection of one or more options associated with a second action (e.g., a second payment transaction). The request to proceed with the action is a request to proceed with both the action and the second action and wherein the request further includes information about (or based on) the selected one or more options associated with the second action, the information about the selected one or more options associated with the second action for display by the authenticating device. For example, the user can add multiple items from a single website or multiple websites into a single shared shopping cart, and then send a single request to the authenticating device for authorization to purchase the multiple items. When the request is authenticated, the different websites are informed of the different purchases, and fulfill the orders separately.

In some examples, prior to receiving (e.g., by the requesting device) selection of the option (e.g., 822) to proceed (e.g., detecting user activation of a "confirm" affordance) with the action (e.g., proceeding with a payment transaction) associated with the selected one or more options, the requesting device (e.g., 700) receives selection of a payment option (e.g., 802F). In response to receiving selection of the payment option (e.g., 802F), the requesting device (e.g., 700) displays options for a plurality of payment accounts (e.g., 802H, 802J) associated with corresponding authenticating devices. In some embodiments, a first payment account is associated with a first authenticating device and a second payment account corresponds to a second authenticating device that is different from the first authenticating device. For example, the payment accounts are grouped according to their corresponding authenticating device or are displayed along with graphical or textual indications of which authenticating device corresponds to each of the payment accounts.

In some examples, prior to receiving (e.g., by the requesting device) selection of the option (e.g., 822) to proceed (e.g., detecting user activation of a "confirm" affordance) with the action (e.g., proceeding with a payment transaction) associated with the selected one or more options, the requesting device (e.g., 700) receives selection of an option (e.g., 802H) corresponding to a respective payment account from among the options (e.g., 802H, 802J) for the plurality of payment accounts. In response to receiving selection of the option (e.g., 802H) corresponding to the respective payment account, the requesting device (e.g., 700) selects the respective authenticating device based on the selected option (e.g., 802H) corresponding to the respective payment account.

In some examples, prior to receiving (e.g., by the requesting device) selection of the option (e.g., 822) to proceed (e.g., detecting user activation of a "confirm" affordance) with the action (e.g., proceeding with a payment transaction) associated with the selected one or more options, the requesting device (e.g., 700) displays options (e.g., 802H, 802J) for a plurality of payment accounts that are associated with corresponding authenticating devices. In some examples, a first payment account is associated with a first authenticating device and a second payment account corresponds to a second authenticating device that is different from the first authenticating device. For example, the payment accounts are grouped according to their corresponding authenticating device or are displayed along with graphical or textual indications of which authenticating device corresponds to each of the payment accounts. The requesting device (e.g., 700) receives selection of an option (e.g., 802H) corresponding to a respective payment account. In response to receiving selection of the option corresponding to the respective payment account, the requesting device (e.g., 700) selects the respective authenticating device based on the selected option (e.g., 802H) corresponding to the respective payment account. In some embodiments a payment account associated with the first authenticating device is initially selected as a default payment account and in response to receiving selection of the option corresponding to a second payment account, a second device is selected in place of the first device as the respective authenticating device. In some embodiments there are more than two devices that are capable of being selected as the respective authenticating device.

In some examples, subsequent to receiving selection of the option (e.g., 802H) corresponding to the respective payment account, concurrently displaying the option (e.g., 822) to proceed (e.g., a "confirm" affordance) with the action (e.g., proceeding with a payment transaction) associated with the selected one or more options and an indication (e.g., 802I) of the authenticating device.

In some examples, the indication (e.g., 802I) of the authenticating device includes a graphical representation of the authenticating device. In some examples, the graphical representation of the authenticating device is an icon representation of the authenticating device such as a line drawing of a housing of the device, the icon representation including one or more of: a finish, a form factor, and one or more dimension information of the authenticating device. For example, the graphical representation may indicate that the requesting device (e.g., 700) is a gold MacBook® or a 27" iMac®.

In some examples, the options for the plurality of payment accounts includes payment accounts linked to devices of a first type regardless of whether the devices of the first type are currently in a locked state or unlocked state (e.g., even if a wearable device such as a smart watch that is associated with payment accounts is near the requesting device, if the smart watch is not being worn and/or is in a locked state, then the payment accounts associated with the smart watch are excluded from the list of payment accounts that are available for use by the requesting device, whereas if the smartwatch is being worn and is in an unlocked state, then the payment accounts associated with the smart watch are included in the list of payment accounts). The options for the plurality of payment accounts includes payment accounts linked to devices of a second type (e.g., smartwatch devices) based on being in an unlocked state (and alternatively or in addition, based on the devices of the second type currently being on a user's wrist). In some examples, the options for the plurality of payment accounts do not include payment accounts linked to devices of the second type that are in a locked state. In some examples, the options for the plurality of payment accounts do not include payment accounts linked to devices of the second type that are either in the locked state or are not currently on a user's wrist). For example, if a portable device such as a tablet, laptop, or smartphone that is associated with payment accounts is near the requesting device, the payment accounts associated with the portable device are included in the list of payment accounts whether or not the portable device is locked.

In some examples, the authenticating device (e.g., 500) is a phone and the requesting device (e.g., 700) is a television device (e.g., a flat panel television or a set top box that is controlling display of a user interface on the flat panel television). In some examples, the authenticating device is a phone and the requesting device is a computer (e.g., a laptop computer, a desktop computer). In some examples, the authenticating device is a wearable device (e.g., an electronic smartwatch) and the requesting device is a television device (e.g., a flat panel television or a set top box that is controlling display of a user interface on the flat panel television). In some examples, the authenticating device is a wearable device (e.g., an electronic smartwatch) and the requesting device is a computer (e.g., a laptop computer, a desktop computer).

In some examples, an electronic wallet of the authenticating device (e.g., 500) includes one or more payment accounts associated with a user of the authenticating device and the payment information is based on a payment account of the one or more payment accounts. In some examples, the payment information is an account number or a PAN of a payment account.

In some examples, proceeding with the payment transaction includes transmitting the payment information to a payment transaction server to engage in the payment transaction. In some examples, engaging in the payment transaction includes routing information to one or more financial institutions to verify payment credentials and/or receive authorization to complete the transaction. For example, payment information is transmitted from the authenticating device to a payment server for engaging in the payment transaction. For another example, payment information is transmitted from the requesting device to a payment server for engaging in the payment transaction.

In some examples, proceeding with the payment transaction includes using the payment information (e.g., payment information of a payment account linked to the electronic device and stored in an electronic wallet of the device) to complete the payment transaction. In some examples, proceeding with the payment transaction includes using the payment information (e.g., a primary account number) for use in the payment transaction (e.g., using a credit account to make the purchase) to complete the payment transaction, where the payment information is stored at the electronic device.

Note that details of the processes described above with respect to method 1000 (e.g., FIGS. 10A-10B) are also applicable in an analogous manner to the methods described above and below. For example, methods 900 and 1100 optionally include one or more of the characteristics of the various methods described above with reference to method 1000. For example, characteristics and techniques of the requesting devices of the various methods can be combined. For another example, characteristics and techniques of the authenticating devices of the various methods can be combined. For brevity, some of these details are not repeated below.

FIG. 11 is a flow diagram illustrating a method for 1100 using an electronic device in accordance with some embodiments. Method 1100 is performed at an authenticating device (e.g., 100, 300, 500) with a display. In some examples, the authenticating device (e.g., 500) includes hardware (e.g., a secure element, a token generator) configured to respond (e.g., by generating or providing payment information) to input that is responsive to the request for authorization to proceed with the action. Some operations in method 1100 are, optionally, combined, the order of some operations is, optionally, changed, and some operations are, optionally, omitted.

As described below, method 1100 provides an intuitive way for managing a remote authorization to proceed with an action. The method reduces the cognitive burden on a user for managing a remote authorization, thereby creating a more efficient human-machine interface. For battery-operated computing devices, enabling a user to manage a remote authorization faster and more efficiently conserves power and increases the time between battery charges.

At block 1102, the authenticating device (e.g., 500) receives, from a requesting device (e.g., 700), a request to proceed with an action. The request includes information regarding the action (e.g., information about or based on one or more options selected by a user at the requesting device; name of remote server for connection; a transaction detail, such as a total price or an indication of a payment account). The requesting device (e.g., 700) and the authenticating device (e.g., 500) are both signed into a service using the same account (or are each signed into separate accounts that are explicitly linked to each other for the purpose of authorizing the action). In some examples, at block 1104, the action is creating a secure network connection. In some examples, at block 1106, the action is proceeding with a payment transaction.

At block 1108, the authenticating device (e.g., 500) concurrently displays, on the display of the authenticating device: an indication (e.g., 750, 850) of the request to proceed with the action, the information (e.g., 752, 852) regarding the action (e.g., name of remote server for connection, a transaction detail, such as a total price or an indication of a payment account), and an indication (e.g., 754, 854) of the requesting device (e.g., the name of the requesting laptop or phone; an identifier of the requesting device).

At block 1110, the authenticating device (e.g., 500) displays a request (e.g., 856) for authorization to proceed with the action.

At block 1112, the authenticating device (e.g., 500) receives an input that is responsive to the request for authorization to proceed with the action (e.g., user authentication information, a fingerprint, a passcode). In some examples, receiving authorization to proceed with the action includes receiving a passcode via a touch-sensitive surface of the electronic device, the passcode being determined to be consistent with an enrolled passcode that is enabled to authorize the action. In some examples, authorization to proceed includes detecting a fingerprint, the fingerprint being determined to be consistent with an enrolled fingerprint that is enabled to authorize the action. For example, the device stores information about one or more fingerprints of the user to use for determining whether a respective fingerprint is enabled to authorize the action. In some examples, authorization to proceed includes receiving a double-press of a mechanical button while the device (e.g., an electronic smartwatch) is in an unlocked state (and, optionally, while the device is on a user's wrist, such as by detecting that the device is in contact with the user's skin).

In some examples, the action is creating a secure network connection between the requesting device and a remote server. In response to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device (e.g., 500) transmits token information to the requesting device. In some examples, the requesting device (e.g., 700) receives the token information from the authenticating device and the requesting device (e.g., 700) proceeds with the action (e.g., creating a secure network connection) using the token information received from the authenticating device. In some examples, in response to determining, at the authenticating device (e.g., 500), that the input that is responsive to the request for authorization to proceed with the action is not consistent with input authorized to proceed with the action (e.g., unsuccessful user authentication based on the user input, user authentication information, a fingerprint, a passcode), the authenticating device (e.g., 500) forgoes transmitting token information to the requesting device.

In some examples, concurrently displaying, on the display, the indication (e.g., 750, 850) of the request to proceed with the action, the information (e.g., 752, 852) regarding the action, and the indication (e.g., 754, 854) of the requesting device is in response to (or subsequent to) receiving the request to proceed with the action.

In some examples, the authenticating device includes hardware (e.g., a hardware token generator; a secure element) configured to respond (e.g., by generating or providing a token, by generating or providing payment information) to the input that is responsive to the request for authorization to proceed with the action when, for example, the requesting device (e.g., 700) does not include the hardware (e.g., a hardware token generator, a secure element).

In some examples, the action is proceeding with a payment transaction. The authenticating device (e.g., 500) generates (or provides, or releases) payment information (e.g., a payment account number, an identifier of a payment account, or payment card information, such as account number and expiration date, of a payment account linked to the device and stored in an electronic wallet of the device). For example, the authenticating device (e.g., 500) uses hardware (e.g., a secure element) configured to respond (by generating or providing payment information) to the input that is responsive to the request for authorization to proceed with the action. In response to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device (e.g., 500) transmits the payment information (e.g., to the requesting device or to a payment transaction server). In some examples, the requesting device receives the payment information from the authenticating device and the requesting device proceeds with the action (e.g., proceeding with a payment transaction) using the payment information received from the authenticating device. In some examples, a payment transaction server receives the payment information the authenticating device and processes the payment transaction using the payment information received from the authenticating device. In response to determining, at the authenticating device (e.g., 500), that the input that is responsive to the request for authorization to proceed with the action is not consistent with input authorized to proceed with the action (e.g., unsuccessful user authentication based on the user input, user authentication information, a fingerprint, a passcode), the authenticating device (e.g., 500) forgoes transmitting the payment information (e.g., to the requesting device or to a payment transaction server).

In some examples, the indication (e.g., 754, 854) of the requesting device includes a graphical representation of the requesting device. In some examples, the graphical representation of the requesting device is an icon representation of the requesting device such as a line drawing of a housing of the device, the icon representation including one or more of: a finish, a form factor, and one or more dimension information of the requesting device. For example, the graphical representation may indicate that the requesting device (e.g., 700) is a gold MacBook® or a 27" iMac®.

In some examples, the authenticating device (e.g., 500) is in a locked state when receiving the input that is responsive to the request for authorization to proceed with the action (e.g., user authentication information, a fingerprint, a passcode). In response to determining, at the authenticating device, that the input that is responsive to the request for authorization to proceed with the action is consistent with input authorized to proceed with the action: (e.g., successful user authentication based on the user input, user authentication information, a fingerprint, a passcode), the authenticating device (e.g., 500) maintains the authenticating device in the locked state while transmitting, by the authenticating device, the response to the request to proceed with the action, the response to the request to proceed with the action based on the input. Thus, in some examples, the authenticating device (e.g., 500) remains in the locked state throughout the authorization process.

In some examples, the requesting device (e.g., 700) is signed into a service using an account and the authenticating device (e.g., 500) is signed into the service using the account (e.g., both the requesting device and the authenticating devices are signed into a service using the same user account/the same user credentials). In some examples, the requesting device and the authenticating device are each signed into separate accounts on the same service, wherein the separate accounts are linked to each other (e.g., explicitly linked to each other for the purpose of authorizing the action).

In some examples, the authenticating device (e.g., 500) is in a locked state when receiving the request to proceed with the action. In response to receiving the request to proceed with the action, the authenticating device displays, on the display, a request notification (e.g., 730, 830; on the lock screen of the authenticating device). Prior to concurrently displaying, on the display, the indication (e.g., 750, 850) of the request to proceed with the action, the information (e.g., 752, 852) regarding the action, and the indication (e.g., 754, 854) of the requesting device, the authenticating device (e.g., 500): receives input activating the request notification (e.g., 730, 830) (e.g., receiving a user swipe gesture sliding the notification beyond a threshold distance or a user input gesture pressing on the notification with a characteristic intensity above a respective threshold intensity); requests (e.g., 740, 840; by displaying a request and/or causing a haptic vibration) authorization to unlock the authenticating device); receives authorization (e.g., fingerprint or passcode) to unlock the authenticating device. This authorization for unlocking the authenticating device is separate and in addition to authorization to proceed with the action. In some examples, the authorization to unlock and the authorization to proceed with the action can be satisfied using the same technique (e.g., using the same fingerprint or the same password). In some examples, the authorization to unlock and the authorization to proceed with the action are satisfied using different techniques (e.g., using a fingerprint for authorization to unlock and a password for authorization to proceed with the action). In some examples, the authorization to unlock and the authorization to proceed with the action are satisfied using the same technique, but with different inputs (e.g., using a first fingerprint for authorization to unlock and a second fingerprint for authorization to proceed with the action; using a first password for authorization to unlock and a second password for authorization to proceed with the action). In response to (or subsequent to) receiving authorization to unlock the authenticating device, the authenticating device (e.g., 500) unlocks (e.g., transitioning the device to an unlocked state). The concurrently displaying, on the display, the indication of the request to proceed with the action, the information regarding the action, and the indication of the requesting device occurs in response to receiving authorization to unlock the authenticating device. In some examples, the indication of the request to proceed with the action, the information regarding the action, and the indication of the requesting device are displayed within the user interface of an electronic wallet application. In some examples, the electronic wallet application stores a plurality of payment accounts associated with the user of the authenticating device, as it is a personal device of the user.

In some examples, in response to receiving the request to proceed with the action, the authenticating device (e.g., 500) displays, on the display, a request notification (e.g., 730, 830; on the lock screen of the authenticating device). Prior to concurrently displaying, on the display, the indication of the request to proceed with the action, the information regarding the action, and the indication of the requesting device, the authenticating device (e.g., 500) receives input activating the request notification (e.g., receiving a user swipe gesture sliding the notification beyond a threshold distance or a user input gesture pressing on the notification with a characteristic intensity above a respective threshold intensity). The concurrently displaying, on the display, the indication of the request to proceed with the action, the information regarding the action, and the indication of the requesting device is in response to (or subsequent to) receiving input activating the request notification. In some examples, the indication of the request to proceed with the action, the information regarding the action, and the indication of the requesting device are displayed within the user interface of an electronic wallet application. In some examples, the electronic wallet application stores a plurality of payment accounts associated with the user of the authenticating device, as it is a personal device of the user.

In some examples, the authenticating device (e.g., 500) is in a locked state when receiving the request to proceed with the action. In response to receiving the request to proceed with the action, the authenticating device (e.g., 500) displays, on the display, a request notification (e.g., 730, 830; on the lock screen of the authenticating device). Prior to concurrently displaying, on the display, the indication of the request to proceed with the action, the information regarding the action, and the indication of the requesting device, the authenticating device (e.g., 500) receives input activating the request notification (e.g., receiving a user swipe gesture sliding the notification beyond a threshold distance or a user input gesture pressing on the notification with a characteristic intensity above a respective threshold intensity). The concurrently displaying, on the display, the indication of the request to proceed with the action, the information regarding the action, and the indication of the requesting device is in response to (or subsequent to) receiving input activating the request notification. In some examples, the indication of the request to proceed with the action, the information regarding the action, and the indication of the requesting device are displayed within the user interface of an electronic wallet application. In some examples, the electronic wallet application stores a plurality of payment accounts associated with the user of the authenticating device, as it is a personal device of the user. Determining that the input that is responsive to the request for authorization to proceed with the action is consistent with input authorized to proceed with the action (e.g., user authentication information, a fingerprint, a passcode) does not transition the requesting device to an unlocked state (in other words, does not transition out of the locked state).

In some examples, the authenticating device (e.g., 500) is in an unlocked state (e.g., a state in which the user has already provided authentication and enabled access to restricted features of the authenticating device) when receiving the request to proceed with the action. In some examples, the authenticating device is a wearable device (e.g., an electronic smartwatch) that, once unlocked, remains in an unlocked state while being worn and is automatically locked when the device detects that it is no longer being worn (e.g., by detecting an end of user contact with one or more sensors of the device or detecting an end of proximity to a user with one or more sensors of the device). The requesting device includes a hardware button, and receiving the input that is responsive to the request for authorization to proceed with the action includes detecting a double-press of the hardware button while the device is in the unlocked state.

In some examples, the information regarding the action includes one or more options associated with the action. Subsequent to concurrently displaying, on the display, the indication of the request to proceed with the action, the information regarding the action, and the indication of the requesting device, the authenticating device (e.g., 500): receives user input requesting a change to at least one of the one or more options associated with the action; transmits an updated request to the requesting device, the updated request including the change to the at least one of the one or more options associated with the action; displays, on the display, an indication that a confirmation of receipt of the updated request has not been received from the requesting device; receives confirmation of receipt of the updated request from the requesting device; and, in response to receiving confirmation of receipt of the updated request from the requesting device, ceases to display, on the display, the indication that the confirmation of receipt of the updated request has not been received from the requesting device.

In some examples, subsequent to receiving the request to proceed with the action and prior to receiving the input that is responsive to the request for authorization to proceed with the action (e.g., user authentication information, a fingerprint, a passcode), the authenticating device (e.g., 500): receives, from the requesting device, a request to cancel the action; in response to receiving the request to cancel the action and in accordance with receiving the input that is responsive to the request for authorization to proceed with the action (e.g., user authentication information, a fingerprint, a passcode), the authenticating device (e.g., 500) forgoes proceeding with the action (e.g., foregoing transmitting payment information).

In some examples, subsequent to receiving the request to proceed with the action and prior to receiving the input that is responsive to the request for authorization to proceed with the action (e.g., user authentication information, a fingerprint, a passcode), the authenticating device (e.g., 500): receives, from the requesting device (e.g., 700), a request to cancel the action; and in response to receiving the request to cancel the action, the authenticating device forgoes receiving input that is responsive to the request for authorization to proceed with the action (e.g., user authentication information, a fingerprint, a passcode). For example, the authenticating device (e.g., 500) disables a fingerprint sensor used for receiving input that is response to the request for authorization.

In some examples, subsequent to determining, at the authenticating device (e.g., 500), that the input that is responsive to the request for authorization to proceed with the action is consistent with input authorized to proceed with the action (e.g., successful user authentication based on the user input, user authentication information, a fingerprint, a passcode), the authenticating device proceeds with the action (e.g., using the payment information) without further input (e.g., from either the requesting device or the user). For example, the authenticating device transmits the information necessary (or useful) for processing the payment transaction to a payment server.

In some examples, the authenticating device (e.g., 500) displays transactions in a transaction history user interface. The authenticating device (e.g., 500) receives a second request to proceed with a second action (e.g., requesting to proceed with a second payment transaction). The authenticating device (e.g., 500) concurrently displays, on the display, a second indication of the request to proceed with the action (e.g., proceed with a payment transaction) and an indication of whether the action was successful (e.g., was the payment transaction approved), and concurrently displays, on the display, a third indication of the second request to proceed with the second action (e.g., proceed with a second payment transaction) and an indication of whether the second action was successful (e.g., was the second payment transaction approved). Thus, the authenticating device (e.g., 500) displays a transaction history that includes received requests along with indications of whether the corresponding transaction payments were approved or denied. In some examples, the authenticating device (e.g., 500) concurrently displays the second indication of the request to proceed with the action, the indication of whether the action was successful, the third indication of the second request to proceed with the second action, and the indication of whether the second action was successful.

In some examples, the authenticating device (e.g., 500) is a phone (e.g., a smartphone) and the requesting device is a television device (e.g., a flat panel television or a set top box that is controlling display of a user interface on the flat panel television). In some examples, the authenticating device is a phone (e.g., a smart phone) and the requesting device is a computer (e.g., a laptop computer, a desktop computer). In some examples, the authenticating device is a wearable device (e.g., an electronic smartwatch) and the requesting device is a television device (e.g., a flat panel television or a set top box that is controlling display of a user interface on the flat panel television). In some examples, the authenticating device is a wearable device (e.g., an electronic smartwatch) and the requesting device is a computer (e.g., a laptop computer, a desktop computer).

In some examples, an electronic wallet of the authenticating device (e.g., 500) includes one or more payment accounts associated with a user of the authenticating device and the payment information is based on a payment account of the one or more payment accounts. In some examples, the payment information is an account number or a PAN of a payment account.

In some examples, proceeding with the payment transaction includes transmitting the payment information (e.g., payment information of a payment account linked to the electronic device and stored in an electronic wallet of the device) to a payment transaction server to engage in the payment transaction. In some examples, engaging in the payment transaction includes routing information to one or more financial institutions to verify payment credentials and/or receive authorization to complete the transaction. For example, payment information is transmitted from the authenticating device (e.g., 500) to a payment server for engaging in the payment transaction. For another example, payment information is transmitted from the requesting device (e.g., 700) to a payment server for engaging in the payment transaction.

In some examples, proceeding with the payment transaction includes using the payment information (e.g., payment information of a payment account linked to the electronic device and stored in an electronic wallet of the device) to complete the payment transaction. In some examples, proceeding with the payment transaction includes using the payment information (e.g., an account number or a PAN of a payment account) for use in the payment transaction (e.g., using a credit account to make the purchase) to complete the payment transaction, where the payment information is stored at the electronic device (e.g., 500, 700).

Note that details of the processes described above with respect to method 1100 (e.g., FIG. 11) are also applicable in an analogous manner to the methods described above. For example, methods 900 and 1000 optionally include one or more of the characteristics of the various methods described above with reference to method 1100. For example, characteristics and techniques of the requesting devices of the various methods can be combined. For another example, characteristics and techniques of the authenticating devices of the various methods can be combined. For brevity, these details are not repeated below.

Figure 12:
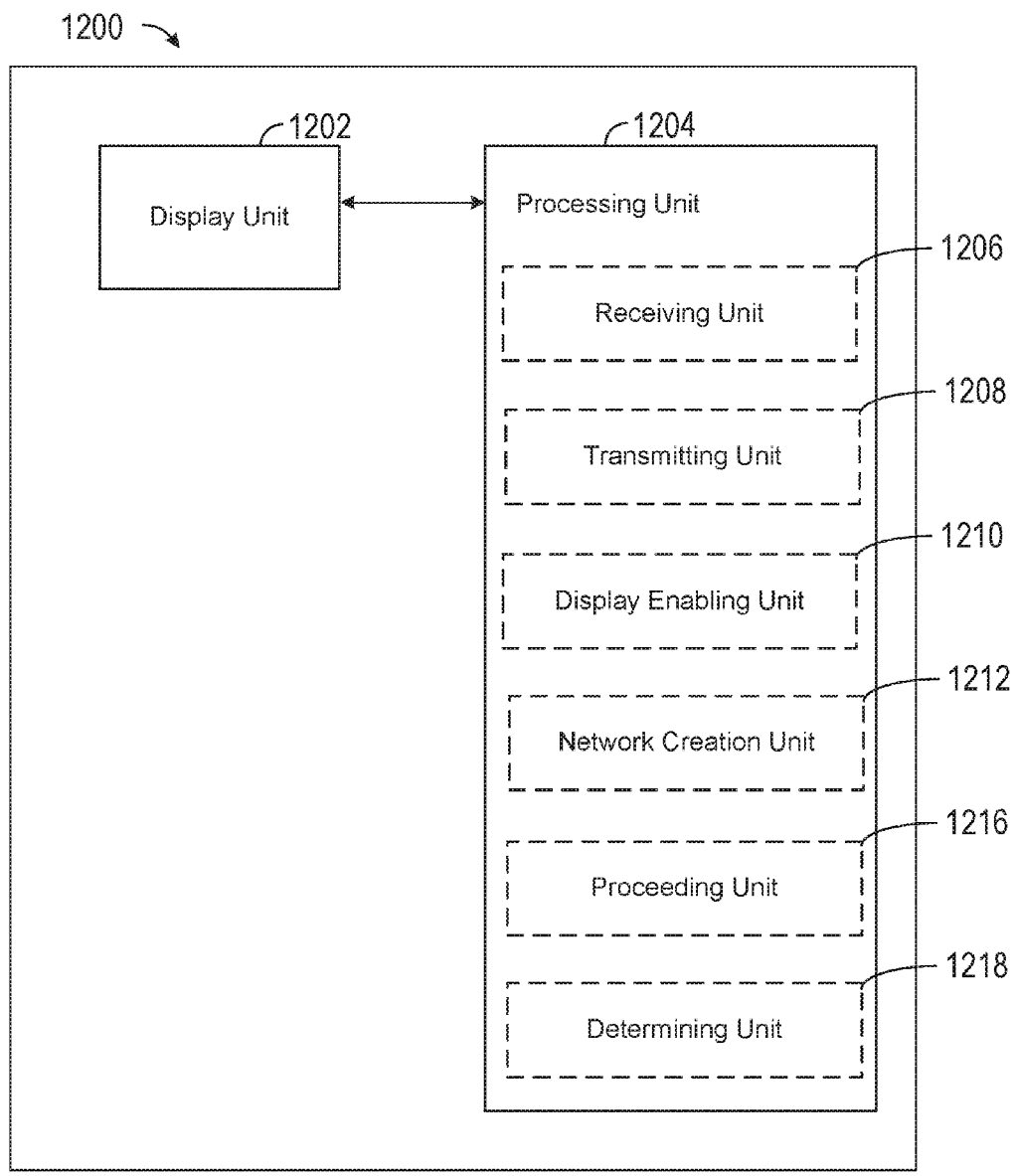
FIG. 12 is a functional block diagram of an electronic requesting device in accordance with some embodiments.

In accordance with some embodiments, FIG. 12 shows an exemplary functional block diagram of a requesting device 1200 configured in accordance with the principles of the various described embodiments. In accordance with some embodiments, the functional blocks of requesting device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, a requesting device 1200 includes a display unit 1202 configured to display a graphic user interface, and a processing unit 1204 coupled to the display unit 1202. In some embodiments, the processing unit 1204 includes a receiving unit 1206, a transmitting unit 1208, a display enabling unit 1210, a network creation unit 1212, a proceeding unit 1216, and a determining unit 1218.

The processing unit 1204 is configured to receive (e.g., with receiving unit 1206) selection of one or more options. The processing unit 1204 is further configured to receive (e.g., with receiving unit 1206) selection of an option to proceed with an action associated with the selected one or more options. The processing unit 1204 is further configured to transmit (e.g., with transmitting unit 1208) a request to proceed with the action, wherein the request includes information about the selected one or more options. The processing unit 1204 is further configured to receive (e.g., with receiving unit 1206) the response to the request to proceed with the action. The processing unit 1204 is further configured to, in accordance with a determination (e.g., using determining unit 1218) that the response to the request to proceed with the action indicates that the authorization at the authenticating device was successful, enable display of (e.g., with display enabling unit 1210) on display unit 1202 an indication that the authorization was successful. The processing unit 1204 is further configured to, in accordance with a determination (e.g., using determining unit 1218) that the response to the request to proceed with the action indicates that the authorization at the authenticating device was not successful, enable display of (e.g., with display enabling unit 1210), on display unit 1202, an indication that the authorization was not successful.

In some embodiments, the action is creating (e.g., using network creation unit 1212) a secure network connection between the requesting device 1200 and a remote server. The processing unit 1204 is further configured to receive (e.g., with receiving unit 1206) a token from the authenticating device. The processing unit 1204 is further configured to proceed (e.g., with proceeding unit 1216) with the action using a token received from the authenticating device.

In some embodiments, the requesting device 1200 is signed into a service using an account when transmitting (e.g., using transmitting unit 1208) the request to proceed with the action.

In some embodiments, the action is proceeding (e.g., using proceeding unit 1216) with a payment transaction. The processing unit 1204 is further configured to receive (e.g., with receiving unit 1206) payment information from the authenticating device. The processing unit 1204 is further configured to proceed (e.g., using proceeding unit 1216) with the action using the payment information received from the authenticating device.

In some embodiments, the processing unit 1204 is configured to transmit (e.g., with transmitting unit 1208) a token to a server, wherein the server uses the token to obtain a resource associated with the token.

In some embodiments, the processing unit 1204 is further configured to transmit (e.g., with transmitting unit 1208) the payment information to a payment transaction server, wherein the payment transaction server uses the payment information to obtain a resource associated with the payment information.

In some embodiments, the requesting device 1200 is a television device. In some embodiments, the requesting device 1200 is a computer.

In some embodiments, proceeding with the payment transaction includes transmitting (e.g., with transmitting unit 1208) the payment information to a payment transaction server to engage in the payment transaction.

The operations described above with reference to FIGS. 9A-9D are, optionally, implemented by components depicted in FIG. 1A-1B or FIG. 12. For example, receiving operation 902 and displaying operation 910 are, optionally, implemented by event recognizer 180 and event handler 190. Similarly, it would be clear to a person having ordinary skill in the art how other processes can be implemented based on the components depicted in FIGS. 1A-1B.

Figure 13:
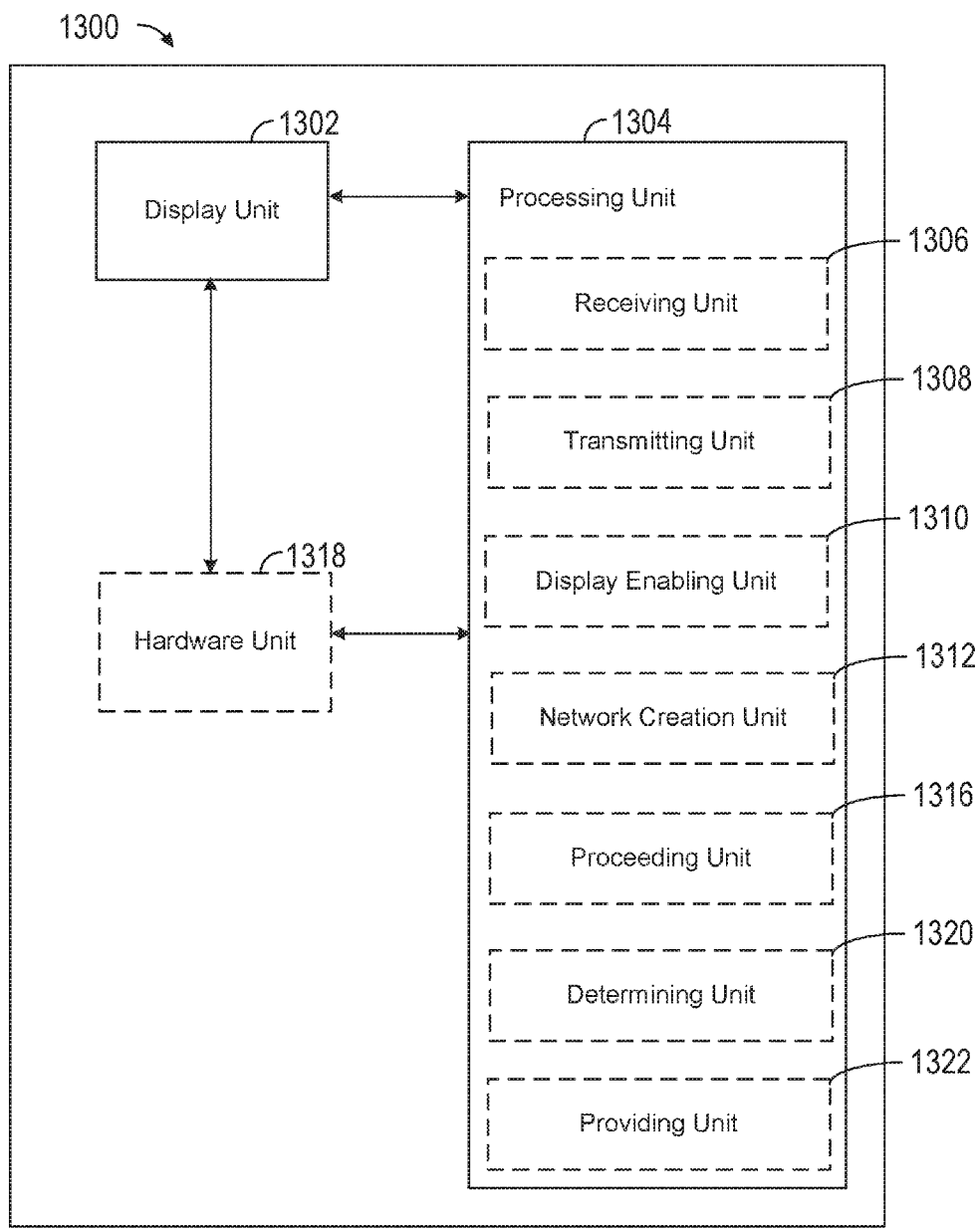
FIG. 13 is a functional block diagram of an electronic authenticating device in accordance with some embodiments.

In accordance with some embodiments, FIG. 13 shows an exemplary functional block diagram of an authenticating device 1300 configured in accordance with the principles of the various described embodiments. In accordance with some embodiments, the functional blocks of authenticating device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, an authenticating device 1300 includes a display unit 1302 configured to display a graphic user interface, a hardware unit 1318, a processing unit 1304 coupled to the display unit 1302 and, optionally, the hardware unit 1318. In some embodiments, the processing unit 1304 includes a receiving unit 1306, a transmitting unit 1308, a display enabling unit 1310, a network creation unit 1312, a proceeding unit 1316, a determining unit 1320, and a locking unit 1322.

The processing unit 1304 is configured to receive (e.g., with receiving unit 1306) the request to proceed with the action. The processing unit 1304 is further configured to concurrently enable display of (e.g., using display enabling unit 1310), on the display unit 1302, an indication of the request to proceed with the action, the information about the selected one or more options, and an indication of the requesting device. The processing unit 1304 is further configured to enable display of (e.g., using display enabling unit 1310), on the display unit 1302, a request for authorization to proceed with the action. The processing unit 1304 is further configured to receive (e.g., using receiving unit 1306) an input that is responsive to the request for authorization to proceed with the action. The processing unit 1304 is further configured to transmit (e.g., using transmitting unit 1308) a response to the request to proceed with the action, the response to the request to proceed with the action based on the input that is responsive to the request for authorization to proceed with the action.

In some embodiments, the authenticating device 1300 includes hardware unit 1318 configured to respond to the input that is responsive to the request for authorization to proceed with the action and wherein the requesting device does not include the hardware. The action is creating (e.g., using network creation unit 1312) a secure network connection between the authenticating device 1300 and a remote server. The processing unit 1304 is configured to, in response to determining (e.g., using determining unit 1320) that the input that is responsive to the request for authorization to proceed with the action is consistent with input authorized to proceed with the action, proceeding (e.g., using proceeding unit 1316) with the action using the hardware unit 1318 configured to respond to the input that is responsive to the request for authorization to proceed with the action.

In some embodiments, the action is creating (e.g., using network creation unit 1312) a secure network connection between the requesting device and a remote server. The processing unit 1304 is configured to, in response to determining (e.g., using determining unit 1320) that the input that is responsive to the request for authorization to proceed with the action is consistent with input authorized to proceed with the action, transmit (e.g., using transmitting unit 1308) a token to the requesting device, the token generated using hardware unit 1318 configured to respond to the input that is responsive to the request for authorization to proceed with the action.

In some embodiments, the indication of the requesting device includes a graphical representation of the requesting device.

In some embodiments, the authenticating device 1300 is in a locked state when receiving (e.g., using receiving unit 1306) the input that is responsive to the request for authorization to proceed with the action. The processing unit 1304 is configured to, in response to determining (e.g., using determining unit 1320) that the input that is responsive to the request for authorization to proceed with the action is consistent with input authorized to proceed with the action, maintaining (e.g., using locking unit 1322) the authenticating device 1300 in the locked state while transmitting (e.g., using transmitting unit 1308) the response to the request to proceed with the action, the response to the request to proceed with the action based on the input.

In some embodiments, the authenticating device 1300 is signed into the service using the account when receiving the request to proceed with the action.

In some embodiments, the action is proceeding (e.g., using proceeding unit 1316) with a payment transaction. The processing unit 1304 is configured to, in response to determining (e.g., using determining unit 1320) that the input that is responsive to the request for authorization to proceed with the action is consistent with input authorized to proceed with the action, proceeding (e.g., using proceeding unit 1316) with the action using hardware unit 1318 configured to respond to the input that is responsive to the request for authorization to proceed with the action.

In some embodiments, the action is proceeding (e.g., using proceeding unit 1316) with a payment transaction. The processing unit 1304 is configured to, in response to determining (e.g., using determining unit 1320) that the input that is responsive to the request for authorization to proceed with the action is consistent with input authorized to proceed with the action, transmitting (e.g., using transmitting unit 1308) payment information to the requesting device, the payment information generated using hardware unit 1318 configured to respond to the input that is responsive to the request for authorization to proceed with the action.

In some embodiments, the processing unit 1304 is configured to transmit (e.g., using transmitting unit 1308) a token to a server, wherein the server uses the token to obtain a resource associated with the token.

In some embodiments, the processing unit 1304 is configured to transmit (e.g., using transmitting unit 1308) the payment information to a payment transaction server, wherein the payment transaction server uses the payment information to obtain a resource associated with the payment information.

In some embodiments, the action is proceeding with a payment transaction and wherein the authenticating device 1300 includes hardware unit 1318 for authorizing payment transactions.

In some embodiments, the action is proceeding (e.g., using proceeding unit 1316) with a payment transaction. The processing unit 1304 is configured to, subsequent to determining (e.g., using determining unit 1320) that the input that is responsive to the request for authorization to proceed with the action is consistent with input authorized to proceed with the action, proceed (e.g., using proceeding unit 1316) with the action without further input from the requesting device.

In some embodiments, the authenticating device 1300 is a phone. In some embodiments, the authenticating device 1300 is a wearable device.

In some embodiments, an electronic wallet of the authenticating device 1300 includes one or more payment accounts associated with a user of the authenticating device 1300 and the payment information is based on a payment account of the one or more payment accounts.

In some embodiments, proceeding (e.g., using proceeding unit 1316) with the payment transaction includes transmitting (e.g., using transmitting unit 1308) the payment information to a payment transaction server to engage in the payment transaction.

The operations described above with reference to FIGS. 9A-9D are, optionally, implemented by components depicted in FIG. 1A-1B or FIG. 13. For example, receiving operation 908 and displaying operation 912 are, optionally, implemented by event recognizer 180 and event handler 190. Similarly, it would be clear to a person having ordinary skill in the art how other processes can be implemented based on the components depicted in FIGS. 1A-1B.

Figure 14:
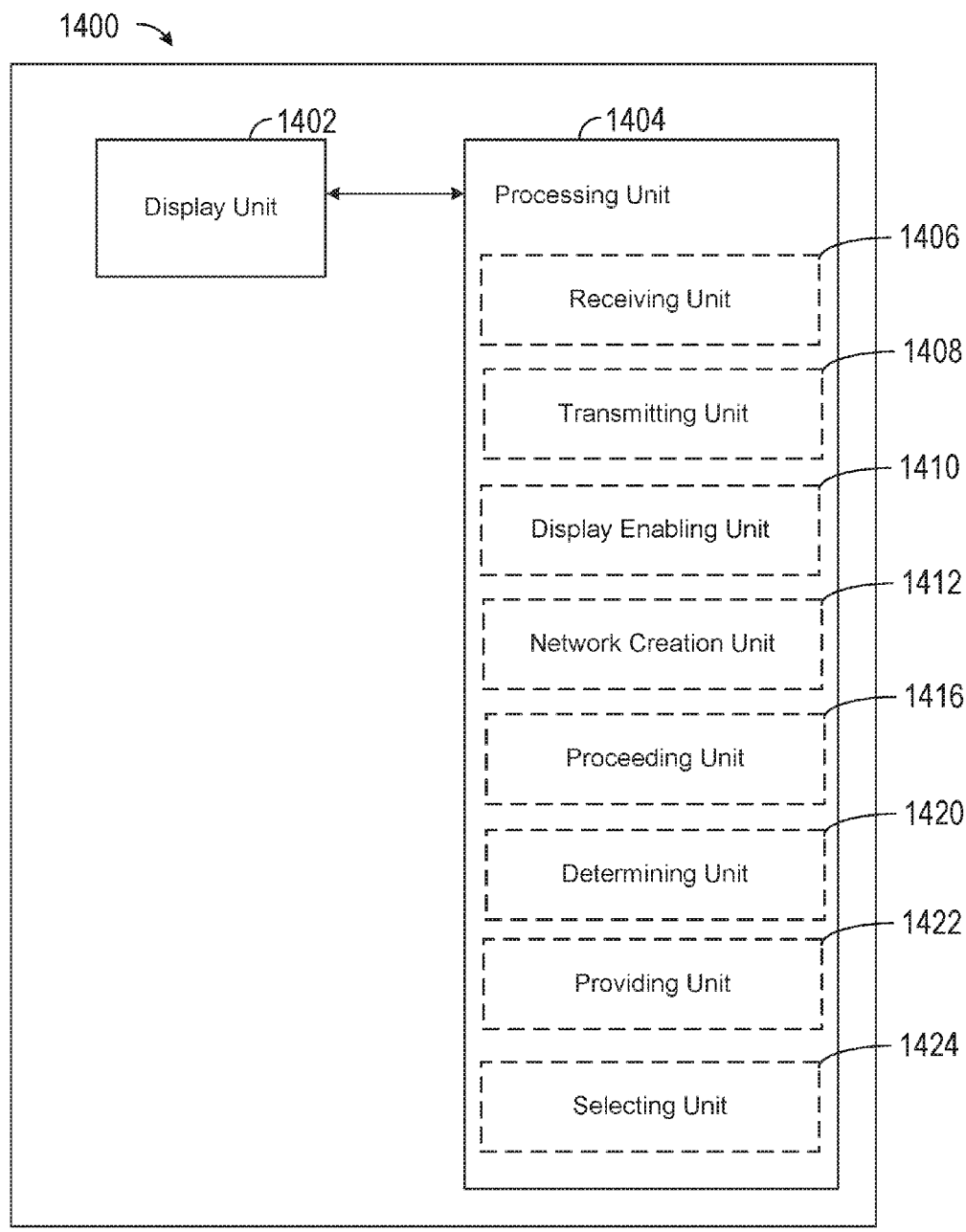
FIG. 14 is a functional block diagram of an electronic requesting device in accordance with some embodiments.

In accordance with some embodiments, FIG. 14 shows an exemplary functional block diagram of a requesting device 1400 configured in accordance with the principles of the various described embodiments. In accordance with some embodiments, the functional blocks of requesting device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, a requesting device 1400 includes a display unit 1402 configured to display a graphic user interface, and a processing unit 1404 coupled to the display unit 1402. In some embodiments, the processing unit 1404 includes a receiving unit 1406, a transmitting unit 1408, a display enabling unit 1410, a network creation unit 1412, a proceeding unit 1416, a determining unit 1420, a providing unit 1422, and a selecting unit 1424.

The processing unit 1404 is configured to receive (e.g., using receiving unit 1406) selection of one or more options associated with an action. The processing unit 1404 is further configured to receive (e.g., using receiving unit 1406) selection of an option to proceed with the action associated with the selected one or more options. The processing unit 1404 is further configured to transmit (e.g., using transmitting unit 1408), to an authenticating device, a request to proceed with the action, wherein the request includes information about the selected one or more options, the information about the selected one or more options for display by the authenticating device. The processing unit 1404 is further configured to receive (e.g., using receiving unit 1406), from the authenticating device, a response to the request to proceed with the action, wherein the response to the request to proceed with the action is indicative of an input at the authenticating device. The processing unit 1404 is further configured to, in accordance with a determination (e.g., using determining unit 1420) that the response to the request to proceed with the action indicates that an authorization at the authenticating device was successful, enable display of (e.g., using display enabling unit 1410), on the display unit 1402, an indication that the authorization was successful.

In some embodiments, the processing unit 1404 is configured to, in accordance with a determination (e.g., using determining unit 1420) that the response to the request to proceed with the action indicates that the authorization at the authenticating device was not successful, enable display of (e.g., using display enabling unit 1410), on the display unit 1402, an indication that the authorization was not successful.

In some embodiments, the action is creating (e.g., using network creation unit 1412) a secure network connection between the requesting device and a remote server by transmitting (e.g., using transmitting unit 1408) a token to the remote server.

In some embodiments, the processing unit 1404 is configured to receive (e.g., using receiving unit 1406) a token from the authenticating device. The processing unit 1404 is further configured to proceed (e.g., using proceeding unit 1416) with the action using the token received from the authenticating device.

In some embodiments, the action is proceeding (e.g., using proceeding unit 1416) with a payment transaction.

In some embodiments, the processing unit 1404 is configured to receive (e.g., using receiving unit 1406) payment information from the authenticating device. The processing unit 1404 is further configured to proceed (e.g., using proceeding unit 1416) with the action using the payment information received from the authenticating device.

In some embodiments, proceeding with the payment transaction includes transmitting (e.g., using transmitting unit 1408) at least a portion of the payment information to a merchant.

In some embodiments, the requesting device 1400 is signed into a service using an account and the authenticating device is signed into the service using the account.

In some embodiments, the processing unit 1404 is configured to receive (e.g., using receiving unit 1406) an indication that the action was successful. The processing unit 1404 is further configured to present (e.g., using presenting unit 1418) a notification at the requesting device that the action was successful.

In some embodiments, the processing unit 1404 is configured to, prior to transmitting the request to proceed with the action: determine (e.g., using determining unit 1420) whether a set of one or more conditions that indicate whether the device is capable of authorizing the request is met, wherein transmitting the request to an authenticating device occurs in accordance with a determination that the set of one or more conditions is not met.

In some embodiments, the set of one or more conditions is met when hardware configured to generate payment information is available at the requesting device.

In some embodiments, the request to proceed with the action includes one or more payment transactions details.

In some embodiments, the processing unit 1404 is configured to, prior to transmitting to the authenticating device the request to proceed with the action: provide (e.g., using providing unit 1422) options corresponding to a plurality of authenticating devices, the plurality of authenticating devices including the authenticating device; receive (e.g., using receiving unit 1406) input selecting an option corresponding to the authenticating device; and wherein transmitting to the authenticating device the request to proceed with the action is in accordance with receiving the input selecting the authenticating device from among the plurality of authenticating devices.

In some embodiments, the processing unit 1404 is configured to, prior to transmitting to the authenticating device the request to proceed with the action: select (e.g., using the selecting unit 1424) the authenticating device from among a plurality of authenticating devices based on one or more of the proximity of the authenticating device to the requesting device 1400, the recency of use of the authenticating device, a user-defined preference for the authenticating device, and a prioritization scheme of the plurality of authenticating devices, wherein transmitting (e.g., using transmitting unit 1408) to the authenticating device the request to proceed with the action is in accordance with selecting the authenticating device from among the plurality of authenticating devices.

In some embodiments, the processing unit 1404 is configured to, prior to transmitting, by the requesting device 1400 to the authenticating device the request to proceed with the action: select (e.g., using selecting unit 1424) the authenticating device from among a plurality of authenticating devices based on availability of a selected payment account on the authenticating device, wherein transmitting, by the requesting device 1400, to the authenticating device the request to proceed with the action is in accordance with selecting the authenticating device from among the plurality of authenticating devices.

In some embodiments, the processing unit 1404 is configured to, in accordance with transmitting (e.g., using transmitting unit 1408), by the requesting device 1400, to the authenticating device the request to proceed with the action, forgoing transmitting (e.g., using transmitting device 1408) to another authenticating device of a plurality of authenticating devices the request to proceed with the action.

In some embodiments, the processing unit 1404 is configured to transmit (e.g., using transmitting unit 1408), by the requesting device 1400, to a second authenticating device the request to proceed with the action.

In some embodiments, the processing unit 1404 is configured to, prior to transmitting the request to proceed with the action: determine (e.g., using determining unit 1420) whether a set of one or more conditions is met, wherein the set of one or more conditions is met when hardware configured to generate payment information is available at the requesting device 1400; and in accordance with a determination that the set of one or more conditions is not met, provide (e.g., using providing unit 1422) options corresponding to a plurality of authenticating devices, the plurality of authenticating devices including the authenticating device.

In some embodiments, the processing unit 1404 is configured to, subsequent to transmitting (e.g., using transmitting unit 1408) the request to proceed with the action: receive (e.g., using receiving unit 1406) user input changing at least one of the selected one or more options associated with the action; transmit (e.g., using transmitting unit 1408), by the requesting device 1400 to the authenticating device, a revised request to proceed with the action; and receive (e.g., using receiving unit 1406), from the authenticating device, a confirmation of receipt of the revised request to proceed with the action; and wherein enabling display (e.g., using display enabling unit 1410), on the display unit 1402 of the requesting device 1400, the indication that the authorization was successful is in accordance with a determination (e.g., using determining unit 1420) that the confirmation of receipt of the revised request to proceed with the action was received.

In some embodiments, the processing unit 1404 is configured to, prior to transmitting the request to proceed with the action: enabling display (e.g., using display enabling unit), on the display unit 1402, the selected one or more options associated with the action. The processing unit 1404 is further configured to, subsequent to transmitting the request to proceed with the action: receive (e.g., using receiving unit 1406), from the authenticating device, changes to at least one of the selected one or more options associated with the action; and in response to receiving, from the authenticating device, the changes to the at least one of the selected one or more options associated with the action, update (e.g., using display enabling unit) the display in accordance with the received changes to the at least one of the selected one or more options associated with the action.

In some embodiments, the processing unit 1404 is configured to, subsequent to transmitting the request to proceed with the action: receive (e.g., using receiving unit 1406) selection of an option to cancel the action; and in response to receiving selection of the option to cancel the action, transmit (e.g., using transmitting unit 1408), by the requesting device 1400 to the authenticating device, a request to cancel the action.

In some embodiments, the processing unit 1404 is configured to enable display of (e.g., using display enabling unit 1410), on the display unit 1402, the one or more options associated with the action in a third-party user interface; and enable display of (e.g., using display enabling unit 1410), on the display unit 1402 of the requesting device, the option to proceed with the action in a first-party user interface.

In some embodiments, the processing unit 1404 is configured to enable display of (e.g., using display enabling unit 1410), on the display unit 1402 of the requesting device 1400, the option to proceed with the action in a first-party user interface.

In some embodiments, the processing unit 1404 is configured to determine (e.g., using determining unit 1420) whether one or more authenticating devices are available for authentication. The processing unit 1404 is further configured to, in accordance with a determination that one or more authenticating devices are available for authentication, enable display of (e.g., using display enabling unit 1410), on the display unit 1402 of the requesting device 1400, the option to proceed with the action. The processing unit 1404 is further configured to, in accordance with a determination that one or more authenticating devices are not available for authentication, forgoing enabling display (e.g., using display enabling unit 1410), on the display unit 1402 of the requesting device 1400, the option to proceed with the action.

In some embodiments, the processing unit 1404 is configured to, prior to transmitting, by the requesting device 1400 to the authenticating device, the request to proceed with the action: receive (e.g., using receiving unit 1406) selection of one or more options associated with a second action; and wherein the request to proceed with the action is a request to proceed with both the action and the second action and wherein the request further includes information about the selected one or more options associated with the second action, the information about the selected one or more options associated with the second action for display by the authenticating device.

In some embodiments, the processing unit 1404 is configured to, prior to receiving selection of the option to proceed with the action associated with the selected one or more options: receive (e.g., using receiving unit 1406) selection of a payment option; and in response to receiving selection of the payment option, enabling display (e.g., using display enabling unit 1410) options for a plurality of payment accounts associated with corresponding authenticating devices.

In some embodiments, the processing unit 1404 is configured to, prior to receiving selection of the option to proceed with the action associated with the selected one or more options: receive (e.g., using receiving unit 1406) selection of an option corresponding to a respective payment account from among the options for the plurality of payment accounts; and in response to receiving selection of the option corresponding to the respective payment account, select (e.g., using selecting unit 1424) the respective authenticating device based on the selected option corresponding to the respective payment account.

In some embodiments, the processing unit 1404 is configured to, prior to receiving selection of the option to proceed with the action associated with the selected one or more options: enable display of (e.g., using display enabling unit 1410) options for a plurality of payment accounts that are associated with corresponding authenticating devices; and receive (e.g., using receiving unit 1406) selection of an option corresponding to a respective payment account; and in response to receiving selection of the option corresponding to the respective payment account, select (e.g., using selecting unit 1424) the respective authenticating device based on the selected option corresponding to the respective payment account.

In some embodiments, the processing unit 1404 is configured to, subsequent to receiving selection of the option corresponding to the respective payment account, concurrently enable display (e.g., using display enabling unit) of: the option to proceed with the action associated with the selected one or more options; and an indication of the authenticating device.

In some embodiments, the indication of the authenticating device includes a graphical representation of the authenticating device.

In some embodiments, the options for the plurality of payment accounts includes payment accounts linked to devices of a first type regardless of whether the devices of the first type are currently in a locked state or unlocked state; and the options for the plurality of payment accounts includes payment accounts linked to devices of a second type based on being in an unlocked state.

In some embodiments, the authenticating device is a phone and the requesting device is a television device. In some embodiments, the authenticating device is a phone and the requesting device is a computer. In some embodiments, the authenticating device is a wearable device and the requesting device is a television device. In some embodiments, the authenticating device is a wearable device and the requesting device is a computer.

In some embodiments, an electronic wallet of the authenticating device includes one or more payment accounts associated with a user of the authenticating device and the payment information is based on a payment account of the one or more payment accounts.

In some embodiments, proceeding with the payment transaction includes transmitting the payment information to a payment transaction server to engage in the payment transaction.

The operations described above with reference to FIGS. 10A-10B are, optionally, implemented by components depicted in FIG. 1A-1B or FIG. 14. For example, receiving operation 1002 and displaying operation 1010 are, optionally, implemented by event recognizer 180 and event handler 190. Similarly, it would be clear to a person having ordinary skill in the art how other processes can be implemented based on the components depicted in FIGS. 1A-1B.

Figure 15:
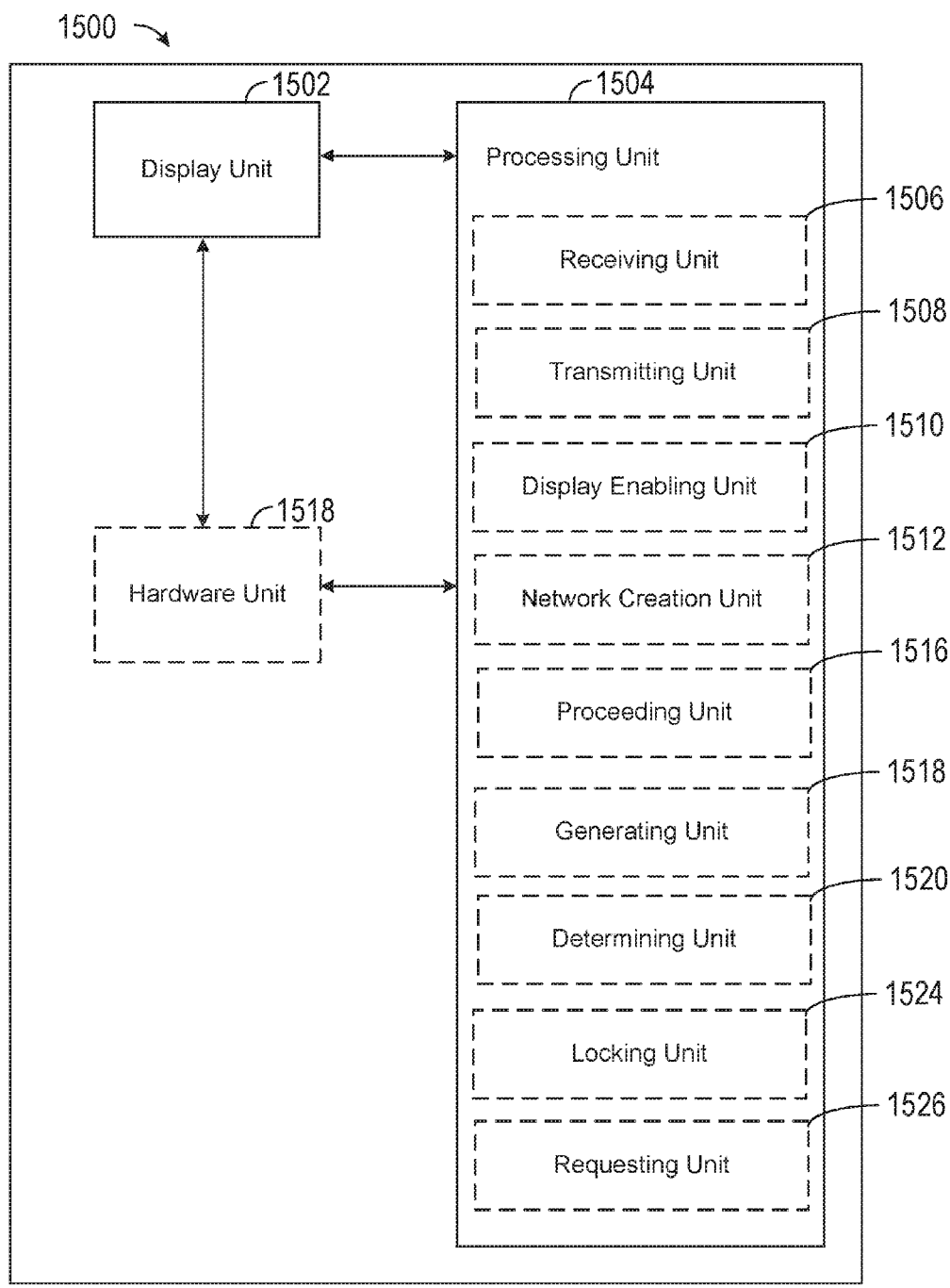
FIG. 15 is a functional block diagram of an electronic authenticating device in accordance with some embodiments.

In accordance with some embodiments, FIG. 15 shows an exemplary functional block diagram of an authenticating device 1500 configured in accordance with the principles of the various described embodiments. In accordance with some embodiments, the functional blocks of authenticating device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, an authenticating device 1500 includes a display unit 1502 configured to display a graphic user interface, optionally, a hardware unit 1518, and a processing unit 1504 coupled to the display unit 1502 and, optionally, to the hardware unit 1518. In some embodiments, the processing unit 1504 includes a receiving unit 1506, a transmitting unit 1508, a display enabling unit 1510, a network creation unit 1512, a proceeding unit 1516, a generating unit 1518, determining unit 1520, a locking unit 1524, and a requesting unit 1526.

The processing unit 1504 is configured to receive (e.g., using receiving unit 1506), from a requesting device, a request to proceed with an action, wherein the request includes information regarding the action and wherein the requesting device and the authenticating device are both signed into a service using the same account. The processing unit 1504 is further configured to concurrently enable display (e.g., using display enabling unit 1510), on the display unit 1502: an indication of the request to proceed with the action, the information regarding the action, and an indication of the requesting device. The processing unit 1504 is further configured to enable display (e.g., using display enabling unit 1510), on the display unit 1502 a request for authorization to proceed with the action. The processing unit 1504 is further configured to receive (e.g., using receiving unit 1506) an input that is responsive to the request for authorization to proceed with the action.

In some embodiments, the action is creating (e.g., using network creation unit 1512) a secure network connection between the requesting device and a remote server. The processing unit 1504 is configured to, in response to determining (e.g., using determining unit 1520) that the input that is responsive to the request for authorization to proceed with the action is consistent with input authorized to proceed with the action, transmit (e.g., using transmitting unit 1508) token information to the requesting device.

In some embodiments, the processing unit 1504 is configured to concurrently enable display (e.g., using display enabling unit 1510), on the display unit 1502, the indication of the request to proceed with the action, the information regarding the action, and the indication of the requesting device is in response to receiving the request to proceed with the action.

In some embodiments, the authenticating device 1500 includes hardware unit 1518 configured to respond to the input that is responsive to the request for authorization to proceed with the action and wherein the requesting device does not include the hardware.

In some embodiments, the action is proceeding (e.g., using proceeding unit 1516) with a payment transaction. The processing unit 1504 is configured to generate (e.g., using generating unit 1518) payment information. The processing unit 1504 is further configured to, in response to determining that the input that is responsive to the request for authorization to proceed with the action is consistent with input authorized to proceed with the action, transmit (e.g., using transmitting unit 1508) payment information.

In some embodiments, the indication of the requesting device includes a graphical representation of the requesting device.

In some embodiments, the authenticating device 1500 is in a locked state when receiving the input that is responsive to the request for authorization to proceed with the action. The processing unit 1504 is configured to, in response to determining that the input that is responsive to the request for authorization to proceed with the action is consistent with input authorized to proceed with the action: maintain (e.g., using the locking unit 1524) the authenticating device in the locked state while transmitting the response to the request to proceed with the action, the response to the request to proceed with the action based on the input.

In some embodiments, the requesting device is signed into a service using an account and the authenticating device is signed into the service using the account.

In some embodiments, the authenticating device 1500 is in a locked state when receiving the request to proceed with the action. The processing unit 1504 is configured to, in response to receiving the request to proceed with the action: enable display of (e.g., using display enabling unit 1510), on the display unit 1502, a request notification. The processing unit 1504 is configured to, prior to concurrently enabling display of, on the display, the indication of the request to proceed with the action, the information regarding the action, and the indication of the requesting device: receive (e.g., using receiving unit 1506) input activating the request notification; request (e.g., using requesting unit 1526) authorization to unlock the authenticating device; receive (e.g., using receiving unit 1506) authorization to unlock the authenticating device. The processing unit 1504 is configured to, in response to receiving authorization to unlock the authenticating device: unlocking (e.g., using locking unit 1525) the authenticating device. Wherein concurrently enabling display, on the display unit 1502, the indication of the request to proceed with the action, the information regarding the action, and the indication of the requesting device is in response to receiving authorization to unlock the authenticating device.

In some embodiments, the processing unit 1504 is configured to, in response to receiving the request to proceed with the action: enable display of (e.g., using display enabling unit 1510), on the display unit 1502, a request notification. The processing unit 1504 is further configured to, prior to concurrently enabling display, on the display unit

1502, the indication of the request to proceed with the action, the information regarding the action, and the indication of the requesting device: receive (e.g., using requesting unit 1526) input activating the request notification, wherein concurrently enabling display, on the display unit 1502, the indication of the request to proceed with the action, the information regarding the action, and the indication of the requesting device is in response to receiving input activating the request notification.

In some embodiments, the authenticating device 1500 is in a locked state when receiving the request to proceed with the action. The processing unit 1504 is further configured to, in response to receiving the request to proceed with the action: enable display (e.g., using display enabling unit 1510), on the display unit 1502, of a request notification. The processing unit 1504 is further configured to, prior to concurrently enabling display (e.g., using display enabling unit 1510), on the display unit 1502, of the indication of the request to proceed with the action, the information regarding the action, and the indication of the requesting device: receive (e.g., using requesting unit 1526) input activating the request notification; wherein concurrently enabling displaying, on the display unit 1502, the indication of the request to proceed with the action, the information regarding the action, and the indication of the requesting device is in response to receiving input activating the request notification; and wherein determining that the input that is responsive to the request for authorization to proceed with the action is consistent with input authorized to proceed with the action does not transition the requesting device to an unlocked state.

In some embodiments, the authenticating device 1500 is in an unlocked state when receiving the request to proceed with the action. the requesting device includes a hardware button, and receiving the input that is responsive to the request for authorization to proceed with the action comprises detecting a double-press of the hardware button while in the unlocked state.

In some embodiments, the information regarding the action includes one or more options associated with the action. The processing unit 1504 is further configured to, subsequent to concurrently enabling display, on the display unit 1502, the indication of the request to proceed with the action, the information regarding the action, and the indication of the requesting device: receive (e.g., using receiving unit 1506) user input requesting a change to at least one of the one or more options associated with the action; transmit (e.g., using transmitting unit 1508) an updated request to the requesting device, the updated request including the change to the at least one of the one or more options associated with the action; enable display (e.g., using display enabling unit 1510), on the display unit 1502, of an indication that a confirmation of receipt of the updated request has not been received from the requesting device; receive (e.g., using receiving unit 1506) confirmation of receipt of the updated request from the requesting device; and in response to receiving confirmation of receipt of the updated request from the requesting device, ceasing to enable display (e.g., using display enabling unit 1510), on the display unit 1502, of the indication that the confirmation of receipt of the updated request has not been received from the requesting device.

In some embodiments, the processing unit 1504 is configured to, subsequent to receiving the request to proceed with the action and prior to receiving the input that is responsive to the request for authorization to proceed with the action: receive (e.g., using receiving unit 1506), from the requesting device, a request to cancel the action. The processing unit 1504 is further configured to, in response to receiving the request to cancel the action and in accordance with receiving the input that is responsive to the request for authorization to proceed with the action: forgo proceeding (e.g., using proceeding unit 1516) with the action.

In some embodiments, the processing unit 1504 is configured to, subsequent to receiving the request to proceed with the action and prior to receiving the input that is responsive to the request for authorization to proceed with the action: receive (e.g., using receiving unit 1506), from the requesting device, a request to cancel the action; and in response to receiving the request to cancel the action, forgo receiving (e.g., using receiving unit 1506) input that is responsive to the request for authorization to proceed with the action.

In some embodiments, the processing unit 1504 is configured to, subsequent to determining, at the authenticating device, that the input that is responsive to the request for authorization to proceed with the action is consistent with input authorized to proceed with the action, proceed (e.g., using proceeding unit 1516), by the authenticating device 1500, with the action without further input.

In some embodiments, the processing unit 1504 is configured to receive (e.g., using receiving unit 1506) a second request to proceed with a second action. The processing unit 1504 is further configured to concurrently enable display (e.g., using display enabling unit 1510), on the display unit 1502, of a second indication of the request to proceed with the action and an indication of whether the action was successful. The processing unit 1504 is further configured to concurrently enable display (e.g., using display enabling unit 1510), on the display unit 1502, of a third indication of the second request to proceed with the second action and an indication of whether the second action was successful.

In some embodiments, the authenticating device 1500 is a phone and the requesting device is a television device. In some embodiments, the authenticating device 1500 is a phone and the requesting device is a computer. In some embodiments, the authenticating device 1500 is a wearable device and the requesting device is a television device. In some embodiments, the authenticating device 1500 is a wearable device and the requesting device is a computer.

In some embodiments, an electronic wallet of the authenticating device 1500 includes one or more payment accounts associated with a user of the authenticating device and the payment information is based on a payment account of the one or more payment accounts.

In some embodiments, proceeding with the payment transaction includes transmitting the payment information to a payment transaction server to engage in the payment transaction.

The operations described above with reference to FIG. 11 are, optionally, implemented by components depicted in FIG. 1A-1B or FIG. 15. For example, receiving operation 1102 and displaying operation 1108 are, optionally, implemented by event recognizer 180 and event handler 190. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method, comprising:
    receiving, at a requesting device with a display, selection of one or more options;
    receiving, at the requesting device, selection of an option to proceed with an action associated with the selected one or more options;
    transmitting, by the requesting device, a request to proceed with the action, wherein the request includes information about the selected one or more options;
    receiving, by an authenticating device with a display, the request to proceed with the action;
    concurrently displaying, on the display of the authenticating device:
        an indication of the request to proceed with the action,
        the information about the selected one or more options, and
        an indication of the requesting device;
    displaying, on the display of the authenticating device, a request for authorization to proceed with the action;
    receiving, at the authenticating device, an input that is responsive to the request for authorization to proceed with the action;
    transmitting, by the authenticating device, a response to the request to proceed with the action, the response to the request to proceed with the action based on the input that is responsive to the request for authorization to proceed with the action;
    receiving, by the requesting device, the response to the request to proceed with the action;
    in accordance with a determination, at the requesting device, that the response to the request to proceed with the action indicates that the authorization at the authenticating device was successful, displaying, on the display of the requesting device, an indication that the authorization was successful; and
    in accordance with a determination, at the requesting device, that the response to the request to proceed with the action indicates that the authorization at the authenticating device was not successful, displaying, on the display of the requesting device, an indication that the authorization was not successful.

2. The method of claim 1, wherein the authenticating device includes hardware configured to respond to the input that is responsive to the request for authorization to proceed with the action and wherein the requesting device does not include the hardware.

3. The method of claim 2, wherein the action is creating a secure network connection between the authenticating device and a remote server, the method further comprising:
    in response to determining, at the authenticating device, that the input that is responsive to the request for authorization to proceed with the action is consistent with input authorized to proceed with the action, proceeding, by the authenticating device, with the action using the hardware configured to respond to the input that is responsive to the request for authorization to proceed with the action.

4. The method of claim 2, wherein the action is creating a secure network connection between the requesting device and a remote server, the method further comprising:
in response to determining, at the authenticating device, that the input that is responsive to the request for authorization to proceed with the action is consistent with input authorized to proceed with the action, transmitting, by the authenticating device, a token to the requesting device, the token generated using hardware configured to respond to the input that is responsive to the request for authorization to proceed with the action;
receiving, at the requesting device, the token from the authenticating device; and
proceeding, by the requesting device, with the action using the token received from the authenticating device.

5. The method of claim 1, wherein the indication of the requesting device includes a graphical representation of the requesting device.

6. The method of claim 1, wherein the authenticating device is in a locked state when receiving, at the authenticating device, the input that is responsive to the request for authorization to proceed with the action, the method further comprising:
in response to determining, at the authenticating device, that the input that is responsive to the request for authorization to proceed with the action is consistent with input authorized to proceed with the action,
maintaining the authenticating device in the locked state while transmitting, by the authenticating device, the response to the request to proceed with the action, the response to the request to proceed with the action based on the input.

7. The method of claim 1, wherein the requesting device is signed into a service using an account when transmitting the request to proceed with the action and the authenticating device is signed into the service using the account when receiving the request to proceed with the action.

8. The method of claim 1, further comprising:
transmitting, by the authenticating device, a token to a server, wherein the server uses the token to obtain a resource associated with the token.

9. The method of claim 1, further comprising:
transmitting, by the requesting device, a token to a server, wherein the server uses the token to obtain a resource associated with the token.

10. The method of claim 1, wherein the authenticating device is a phone and the requesting device is a television device.

11. The method of claim 1, wherein the authenticating device is a phone and the requesting device is a computer.

12. The method of claim 1, wherein the authenticating device is a wearable device and the requesting device is a television device.

13. The method of claim 1, wherein the authenticating device is a wearable device and the requesting device is a computer.

14. A system, comprising:
a requesting device, including:
a display;
one or more processors; and
memory storing one or more programs, wherein the one or more programs are configured to be executed by the one or more processors, the one or more programs including instructions for:
receiving selection of one or more options;
receiving selection of an option to proceed with an action associated with the selected one or more options;
transmitting a request to proceed with the action, wherein the request includes information about the selected one or more options;
receiving a response to the request to proceed with the action;
in accordance with a determination that the response to the request to proceed with the action indicates that the authorization at the authenticating device was successful, displaying, on the display, an indication that the authorization was successful; and
in accordance with a determination that the response to the request to proceed with the action indicates that the authorization at the authenticating device was not successful, displaying, on the display, an indication that the authorization was not successful; and
an authenticating device, including:
a display;
one or more processors; and
memory storing one or more programs, wherein the one or more programs are configured to be executed by the one or more processors, the one or more programs including instructions for:
receiving the request to proceed with the action;
concurrently displaying, on the display:
an indication of the request to proceed with the action,
the information about the selected one or more options, and
an indication of the requesting device;
displaying, on the display, a request for authorization to proceed with the action;
receiving an input that is responsive to the request for authorization to proceed with the action; and
transmitting the response to the request to proceed with the action, the response to the request to proceed with the action based on the input that is responsive to the request for authorization to proceed with the action.

15. The system of claim 14, wherein the authenticating device includes hardware configured to respond to the input that is responsive to the request for authorization to proceed with the action and wherein the requesting device does not include the hardware.

16. The system of claim 15, wherein the action is creating a secure network connection between the authenticating device and a remote server, the system further comprising:
in response to determining, at the authenticating device, that the input that is responsive to the request for authorization to proceed with the action is consistent with input authorized to proceed with the action, proceeding, by the authenticating device, with the action using the hardware configured to respond to the input that is responsive to the request for authorization to proceed with the action.

17. The system of claim 15, wherein the action is creating a secure network connection between the requesting device and a remote server, the system further comprising:
in response to determining, at the authenticating device, that the input that is responsive to the request for authorization to proceed with the action is consistent with input authorized to proceed with the action, transmitting, by the authenticating device, a token to the requesting device, the token generated using hardware configured to respond to the input that is responsive to the request for authorization to proceed with the action;

receiving, at the requesting device, the token from the authenticating device; and proceeding, by the requesting device, with the action using the token received from the authenticating device.

18. The system of claim 14, wherein the indication of the requesting device includes a graphical representation of the requesting device.

19. The system of claim 14, wherein the authenticating device is in a locked state when receiving, at the authenticating device, the input that is responsive to the request for authorization to proceed with the action, the system further comprising:

in response to determining, at the authenticating device, that the input that is responsive to the request for authorization to proceed with the action is consistent with input authorized to proceed with the action, maintaining the authenticating device in the locked state while transmitting, by the authenticating device, the response to the request to proceed with the action, the response to the request to proceed with the action based on the input.

20. The system of claim 14, wherein the requesting device is signed into a service using an account when transmitting the request to proceed with the action and the authenticating device is signed into the service using the account when receiving the request to proceed with the action.

21. The system of claim 14, further comprising:

transmitting, by the authenticating device, a token to a server, wherein the server uses the token to obtain a resource associated with the token.

22. The system of claim 14, further comprising:

transmitting, by the requesting device, a token to a server, wherein the server uses the token to obtain a resource associated with the token.

23. The system of claim 14, wherein the authenticating device is a phone and the requesting device is a television device.

24. The system of claim 14, wherein the authenticating device is a phone and the requesting device is a computer.

25. The system of claim 14, wherein the authenticating device is a wearable device and the requesting device is a television device.

26. The system of claim 14, wherein the authenticating device is a wearable device and the requesting device is a computer.

* * * * *